US012674029B2

(12) United States Patent
Koebel

(10) Patent No.: US 12,674,029 B2
(45) Date of Patent: Jul. 7, 2026

(54) FUNCTIONALIZED Q-T-SILOXANE-BASED POLYMERIC MATERIALS WITH LOW SILOXANE RING CONTENT, SPECIFIC DEGREE OF POLYMERIZATION, AND METHOD FOR PREPARING SAME

(71) Applicant: SILOXENE AG, Bruttisellen (CH)

(72) Inventor: Matthias Koebel, Bruttisellen (CH)

(73) Assignee: SILOXENE AG, Bruttisellen (CH)

( * ) Notice: Subject to any disclaimer, the term of this patent is extended or adjusted under 35 U.S.C. 154(b) by 545 days.

(21) Appl. No.: 18/245,679

(22) PCT Filed: Jun. 15, 2021

(86) PCT No.: PCT/EP2021/066046
§ 371 (c)(1),
(2) Date: Mar. 16, 2023

(87) PCT Pub. No.: WO2022/058059
PCT Pub. Date: Mar. 24, 2022

(65) Prior Publication Data

US 2023/0416467 A1 Dec. 28, 2023

(30) Foreign Application Priority Data

Sep. 16, 2020 (WO) ................. PCT/EP2020/075890
Dec. 10, 2020 (WO) ................. PCT/EP2020/085619

(51) Int. Cl.
*C08G 77/18* (2006.01)
*C08G 77/00* (2006.01)
(Continued)

(52) U.S. Cl.
CPC ............. *C08G 77/18* (2013.01); *C08G 77/08* (2013.01); *C08G 77/30* (2013.01); *C08G 77/70* (2013.01);
(Continued)

(58) Field of Classification Search
CPC .......... C08G 77/18; C08G 77/70; C08L 83/04
(Continued)

(56) References Cited

U.S. PATENT DOCUMENTS 5,733,644 A 3/1998 Tanaka et al.
10,208,164 B2 * 2/2019 Dogen ................. H10H 20/854
(Continued)

FOREIGN PATENT DOCUMENTS

CN 104327269 A 2/2015
CN 110606990 A 12/2019
(Continued)

OTHER PUBLICATIONS

Chruscie, JJ., et al., Synthesis, Characterization and Microstructure of New Liquid Poly(methylhydrosiloxanes) Containing Branching Units SiO 4/2, Polymers 2018, 10, 484, Apr. 28, 2018.
(Continued)

*Primary Examiner* — Margaret G Moore
(74) *Attorney, Agent, or Firm* — Bryan D. Zerhusen; Nicholas R. Herrel; CANTOR COLBURN LLP

(57) ABSTRACT

The present invention pertains to a functionalized polymeric liquid polysiloxane material comprising non-organofunctional Q-type siloxane moieties and mono-organofunctional T-type siloxane moieties, wherein the material comprises a limited low amount of four-membered $Q^2$-type and/or $Q^3$-type siloxane ring species relative to the total Q-type siloxane species, and has a functionalization-specific degree of polymerization as well as T- to Q-type ratio. The present invention further pertains to methods for producing the polymeric liquid polysiloxane material as well as associated uses of the material.

20 Claims, 4 Drawing Sheets

(51) Int. Cl.

| | |
|---|---|
| ***C08G 77/08*** | (2006.01) |
| ***C08G 77/30*** | (2006.01) |
| ***C08G 83/00*** | (2006.01) |
| ***C08L 83/04*** | (2006.01) |
| ***C08L 83/06*** | (2006.01) |
| ***C08L 83/08*** | (2006.01) |
| ***C09D 183/06*** | (2006.01) |
| ***C09D 183/08*** | (2006.01) |
| ***C09J 183/06*** | (2006.01) |
| ***C09J 183/08*** | (2006.01) |
| *C08G 77/26* | (2006.01) |
| *C08G 77/28* | (2006.01) |

(52) U.S. Cl.
CPC ............ *C08G 83/005* (2013.01); *C08L 83/04* (2013.01); *C08L 83/06* (2013.01); *C08L 83/08* (2013.01); *C09D 183/06* (2013.01); *C09D 183/08* (2013.01); *C09J 183/06* (2013.01); *C09J 183/08* (2013.01); *C08G 77/26* (2013.01); *C08G 77/28* (2013.01)

(58) Field of Classification Search
USPC ........................................................... 528/39
See application file for complete search history.

(56) References Cited

U.S. PATENT DOCUMENTS

| | | | | |
|---|---|---|---|---|
| 11,965,063 | B2 * | 4/2024 | Koebel | C08G 77/24 |
| 2006/0154069 | A1 | 7/2006 | Lin et al. | |
| 2008/0290472 | A1 | 11/2008 | Yagihashi et al. | |
| 2016/0075918 | A1 * | 3/2016 | Bögershausen | C09D 183/06 524/588 |
| 2017/0313726 | A1 * | 11/2017 | Wolter | C07F 7/04 |
| 2019/0153169 | A1 * | 5/2019 | Huang | C08G 77/34 |
| 2019/0292320 | A1 | 9/2019 | Watanabe et al. | |
| 2020/0010725 | A1 * | 1/2020 | Kotake | C09D 7/70 |
| 2023/0037620 | A1 * | 2/2023 | Koebel | C08G 77/30 |
| 2023/0047845 | A1 * | 2/2023 | Fu | C09D 183/04 |
| 2023/0348285 | A1 * | 11/2023 | Numrich | C01B 33/152 |

FOREIGN PATENT DOCUMENTS

| | | | |
|---|---|---|---|
| CN | 112625244 | A | 4/2021 |
| EP | 0728793 | A1 | 8/1996 |
| EP | 0518057 | B1 | 7/1998 |
| EP | 1510520 | A1 | 3/2005 |
| EP | 1978055 | A1 | 10/2008 |
| EP | 3498671 | A1 | 6/2019 |
| EP | 3578591 | A1 | 12/2019 |
| JP | H0718221 | A | 1/1995 |
| JP | 2003012803 | A | 1/2003 |
| JP | 2003049113 | A | 2/2003 |
| JP | 2012184297 | A | 9/2012 |
| JP | 5306338 | B2 | 7/2013 |
| JP | 2017132879 | A | 8/2017 |
| WO | 2000040640 | A1 | 7/2000 |
| WO | 2004058859 | A1 | 7/2004 |
| WO | 2012077770 | A1 | 6/2012 |
| WO | 2014187972 | A1 | 11/2014 |
| WO | 2019234062 | A1 | 12/2019 |
| WO | 2021115646 | A1 | 6/2021 |
| WO | 2022058059 | A1 | 3/2022 |

OTHER PUBLICATIONS

Lei, X., et al., Hyperbranched polysiloxane (HBPSi)-based polyimide films with ultralow dielectric permittivity, desirable mechanical and thermal properties, J. Mater. Chem. C, 2016, 4, 2134-2146, Jan. 11, 2016.

Banerjee, M., et al., Enhanced antibacterial activity of bimetallic gold-silver core-shell anoparticles at low silver concentration, Nanoscale, Sep. 2011, vol. 3 pp. 5120-5125.

Bradley, BN., et al., Niobium and Tantalum Mixed Alkoxides, J. Chem. Soc., Jan. 1958, 99-101.

International Search Report and Written Opinion for PCT/EP2021/066046 dated Sep. 15, 2021.

Jaumann, M., et al., Hyperbranched Polyalkoxysiloxanes via AB3-Type Monomers, Macromol. Chem Phys, Feb. 2003, vol. 2004, pp. 1014-1026.

Schartl, W., Current directions in core-shell nanoparticle design, Nanoscale, Mar. 2010, vol. 2, pp. 829-843.

Zhu, Xiaomin et al., One-Pot Synthesis of Hyperbranched Polyethoxysiloxanes, Macromolecules, Feb. 11, 2006, pp. 1701-1708, vol. 39.

* cited by examiner

20 $Q_{type}$ Si atoms

DP $Q_{type}$ = 2.25

30 accessible $R^1O$

7 $Q_{type}$ Si atoms

DP $Q_{type}$ = 1.57

15 accessible $R^1O$

FUNCTIONALIZED Q-T-SILOXANE-BASED POLYMERIC MATERIALS WITH LOW SILOXANE RING CONTENT, SPECIFIC DEGREE OF POLYMERIZATION, AND METHOD FOR PREPARING SAME

CROSS-REFERENCE TO RELATED APPLICATIONS

The present application claims priority to, and the benefit of, International Patent Application No. PCT/EP2021/066046, filed 15 Jun. 2021 and titled FUNCTIONALIZED Q-T-SILOXANE-BASED POLYMERIC MATERIALS WITH LOW SILOXANE RING CONTENT, SPECIFIC DEGREE OF POLYMERIZATION, AND METHOD FOR PREPARING SAME, which claims priority to, and the benefit of, International Patent Application No. PCT/EP2020/075890, filed 16 Sep. 2020, and International Patent Application No. PCT/EP2020/085619, filed 10 Dec. 2020, each of which is incorporate by reference herein in its entirety for all purposes.

SUMMARY

The present invention pertains to a functionalized polymeric liquid polysiloxane material comprising non-organofunctional Q-type siloxane moieties and mono-organofunctional T-type siloxane moieties, wherein the material comprises a limited low amount of four-membered $Q^2$-type and/or $Q^3$-type siloxane ring species relative to the total Q-type siloxane species, and has a functionalization-specific degree of polymerization as well as T- to Q-type ratio. The present invention further pertains to methods for producing the polymeric liquid polysiloxane material as well as associated uses of the material.

In nanotechnology, organic/inorganic hybrid materials can be obtained through a rich variety of preparative techniques. Sol-gel based techniques for example operate in liquid solution, starting from a colloidal suspension of molecular or oligomeric precursors resulting in the spontaneous formation of nanoparticle building blocks. Sols are either prepared in situ from olation and condensation reactions of oligomeric polyhydroxymetallates or by hydrolysis of alkoxysilanes in water-alcohol mixtures. When a low degree of condensation is desired, only small amounts of water reactant are used which leads to branched siloxane compounds with low molecular weight. An example of such a preparation technique employing acid catalyzed hydrolysis in a neat system (solvent free) is described in EP 1 510 520 A1. Generally, hydrolysis with such low amounts of water of monomeric alkoxysilane yields oligomers. Many of the single component compounds are commercial, for example, for the case of Q-type Tetraethoxysilane (TEOS) there exist ethylsilicate commercial oligomer mixtures with a silicate content of 40 or even up to 50%, commonly referred to as ethylsilicate 40, ethylsilicate 50 or also know by their brand names e.g. Dynasylan 40 or Dynasylan Silbond 50 (Evonik Industries).

Hyperbranched polyethoxysiloxanes (PEOS) are small molecular building blocks with typical molecular weights ranging from 500 to 50'000 Dalton, spanning a size range from several Angstöms to single digit nanometers. The word hyperbranched also means that those compounds feature a significant fraction of linear species, although they also contain siloxane rings to different extents. Preferred synthetic routes are water-free or "non-hydrolytic" reaction conditions. This is why in general, the preparation of hyperbranched siloxane polymers is far more versatile and offers better control over the final reaction products than the above-mentioned hydrolytic routes because the condensation reactions can be controlled by stoichiometric addition of the reactants. Furthermore, the synthesis can be carried out "neat", that means in absence of additional cosolvents such as alcohols. As a result of their highly dendritic structure, with a higher degree of polymerization in the center and a lower degree of the linear chain arms at their perimeter, PEOSs exhibit lower melt viscosities and a much greater solubility in themselves but also in other organic solvents than their linear chain siloxane analogues.

Hyperbranched PEOS can be an intriguing class of molecular precursor for all sorts of hybrid molecular building blocks, readily accessible by "non-hydrolytic" methods such as:

1) Condensation of metal hydroxides obtained by reaction of a metal alkoxide with an alkali hydroxide (silanol route);
2) Condensation of metal chlorides with metal alkoxides (chloride route);
3) Condensation of a single metal alkoxide with itself by ether elimination;
4) Condensation of a mixed acetoxy-alkoxy-metallate with itself by elimination of the corresponding acetic acid ester (acetoxy route); or
5) Condensation of metal alkoxides by reaction with acetic anhydride in presence of a suitable catalyst by acetic acid ester elimination (anhydride route).

Method 2) is described in EP0728793A1, where the preparation of hyperbranched polysiloxanes proceeds through heterocondensation of chloro- and alkoxysilanes through alkyl halide elimination. The reaction is catalyzed by Ti-, V- and Zr-containing organometallic compounds.

Method 3) is not well studied but postulated to enable condensation of various transition metal oxides following the pioneering works of Bradley et al. on alkoxy rearrangement mechanisms (J. Chem. Soc., 1958, 99-101].

Method 4) generally uses rather costly acetoxysilanes. WO 00/40640 A1 describes the preparation of lightly branched organosilicon compounds through acetoxy derivatization starting from dimethylsiloxane prepolymers which are crosslinked using trifunctional silanes. WO 00/40640 A1 describes the usefulness of the classic acetoxy route when only a few condensation bonds need to be made i.e. when connecting monomeric with oligomeric/polymeric building blocks to create larger macromolecules. This can be done for example by refluxing silanol terminated prepolymers with alkoxy terminated crosslinkers in the presence of acetic acid under refluxing at elevated temperature or directly with acetoxy-terminated crosslinkers (e.g. triacetoxysilanes).

Method 5) was published by Moeller et al. (e.g. Macromolecules 2006, 39, 1701-1708) and is a more advanced technique for polyalkylmetallate (PAM) preparation in terms of scalability, process safety and ease of implementation compared to methods 1) through 4). WO 2004/058859 A1 describes the preparation of single component PAMs using the anhydride route.

WO 2019/234062 A1 discloses a process for manufacturing a core-shell PEOS-core with an organofunctional silane shell material. WO 2019/234062 A1 describes the preparation of a hyperbranched ethylsilicate "core" by means of non-hydrolytic acetic anhydride condensation chemistry and then the grafting of a shell, made preferentially from a selection of organofunctional T-type trialkoxysilanes in a second temporally separated step to create a hybrid organofunctional core-shell molecular building block. Both steps are preferably carried out in the presence of a tetraalkoxytitanate rearrangement catalyst.

PCT/EP2020/075890 describes hyperbranched polyalkoxysiloxane materials comprising Q- and M-, D- and/or T-type functionality within the same macromolecule.

It is the objective of the present invention to provide improved and functionalized organofunctional hyperbranched polyalkoxysiloxane materials comprising Q- and T- and optionally M- and D-type functionality within the same macromolecule, methods for producing the same and various applications thereof.

In a first aspect, the present invention is directed to a polymeric liquid polysiloxane material comprising or consisting of:

(i) non-organofunctional Q-type siloxane moieties selected from the group consisting of:

Q1

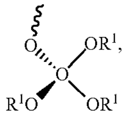

Q2

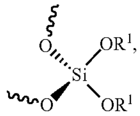

Q3

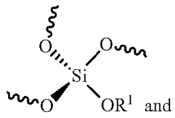

and

Q4

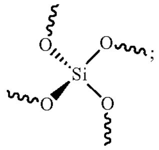

(ii) optionally tri-organofunctional M-type siloxane moieties selected from the group consisting of:

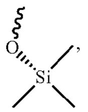

(iii) optionally di-organofunctional D-type siloxane moieties selected from the group consisting of:

D1

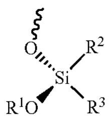

and

-continued

D2

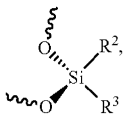

and (iv) mono-organofunctional T-type siloxane moieties selected from the group consisting of:

T1

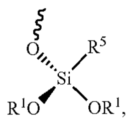

T2

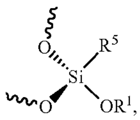

and

T3

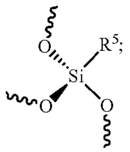

wherein indicates a covalent siloxane bond to a silicon atom of another Q-, M-, D- and/or T-type moiety as defined in (i), (ii), (iii) and/or (iv);

$R^1$ is selected from the group consisting of methyl, ethyl, propyl, —P(═O)(OR$^{1'}$)(OH), —P(OR$^{1'}$)$_2$, —P(═O)(OH)$_2$, optionally methyl and ethyl;

$R^{1'}$ is selected from methyl, ethyl, propyl and butyl, and optionally phenyl or substituted phenyl for $R^{1'}$ in the following moiety:

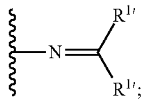

$R^2$ is selected from methyl, vinyl and phenyl;

$R^3$ is selected from methyl, vinyl and phenyl and optionally -L-$Z^1$;

$R^5$ is selected from the group consisting of $R^{5N}$, $R^{5U}$ and $R^{5S}$, wherein $R^{5N}$ is selected from the group consisting of methyl, ethyl, n-propyl, isopropyl, n-butyl, t-butyl, linear, branched or cyclic $C_{5-16}$ alkyl residues, optionally linear or branched hexyl, octyl, dodecyl, hexadecyl, (3,3,3-trifluoro)propyl, (1H,1H, 2H, 2H-perfluoro)octyl, cyclohexyl, cyclopentadienyl, cyclopentyl, (1H,1H, 2H, 2H-perfluoro)dodecyl and (1H,1H, 2H, 2H-perfluoro) hexadecyl;

$R^{5U}$ is selected from -L-$Z^1$, -L-$Z^2$ and —$Z^3$, wherein

L is an aliphatic linker selected from the group consisting of —$CH_2$—, —$CH_2CH_2$—, $-CH_2CH_2CH_2-$, $-C_6H_4-$, $-C_6H_4-CH_2-$, and $-CH_2-CH_2-C_6H_4-CH_2$;

$Z^1$ is a moiety selected from the group consisting of $-SH$, $-NH_2$,

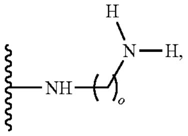
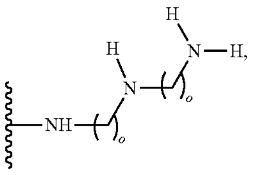
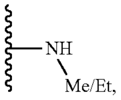
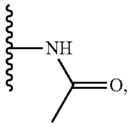
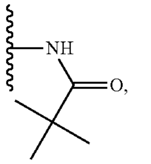
and
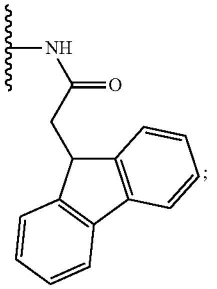

$Z^2$ is a moiety selected from the group consisting of

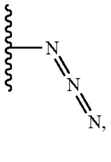
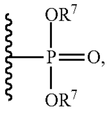
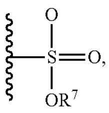
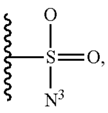
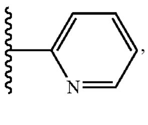
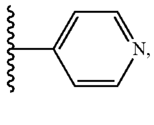
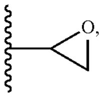
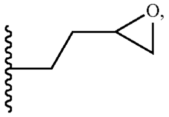
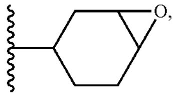
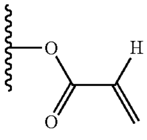
and
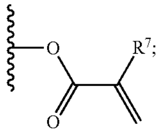

wherein $R^7$ is independently selected from the group consisting of methyl, ethyl and n-butyl and o is an integer from 1 to 3, and $Z^3$ is selected from vinyl, phenyl,

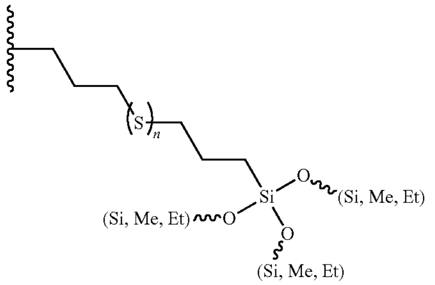
and
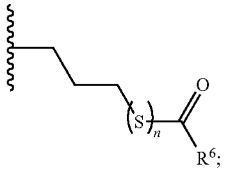

wherein n is an integer selected from the group consisting of 1, 2, 3, 4 and 5, and $R^6$ is selected from the group consisting of methyl, ethyl, n-butyl, linear or branched $C_{5-14}$ alkyl residues, optionally $-(CH_2)_5CH_3$, $-(CH_2)_6CH_3$, $-(CH_2)_7CH_3$, $-(CH_2)_8CH_3$, $-(CH_2)_9CH_3$, $-(CH_2)_{11}CH_3$ and $-(CH_2)_{13}CH_3$;

$R^{5S}$ is selected from the group consisting of $-L'-Y^1$, $-L'-Y^2$, and $-Y^3$, wherein m is an integer selected from the group consisting of 1, 2, 3 and 4;

$R^8$ is selected from the group consisting of $-Cl$, $-Br$, $-I$, $-F$, $-CN$, $-SCN$, $-N_3$, $-NO_2$, $-OH$, $-SO_2OR^{1'}$, and $-O-C(=O)R^{12}$;

$R^9$ is selected from the group consisting of $-Cl$, $-Br$, $-I$, $-F$, $-CN$, $-COOH$, $-COOR^{1'}$, phenyl, o-, m-, and p-vinylphenyl;

$R^{9'}$ is selected from the group consisting of $-COOH$ and $-COOR^{1'}$;

L' is an aliphatic linker selected from the group consisting of $-CH_2-$, $-CH_2CH_2-$, and $-CH_2CH_2CH_2-$; and $Y^1$ is a moiety selected from the group consisting of

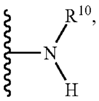
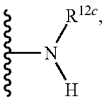
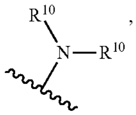
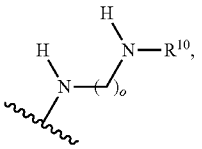
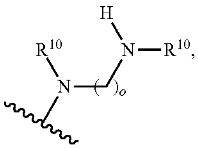
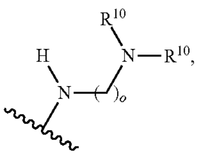
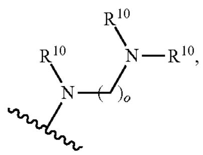

-continued
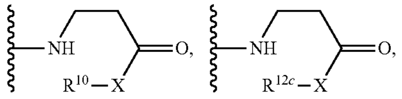
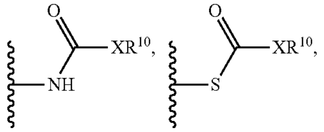
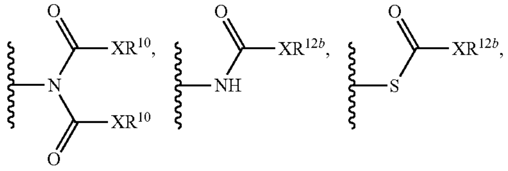
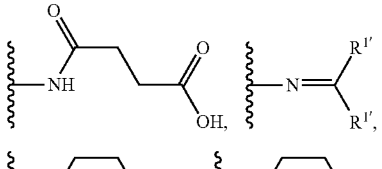
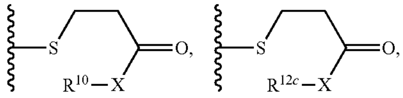
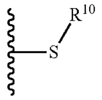
and
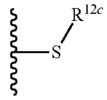
wherein o is an integer from 1 to 3;
$Y^2$ is a moiety selected from the group consisting of
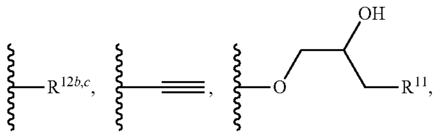
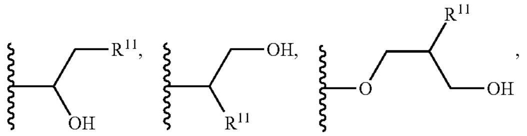
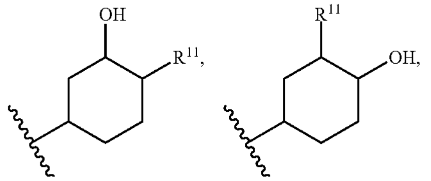
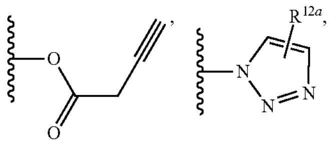
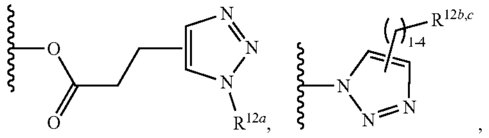
-continued
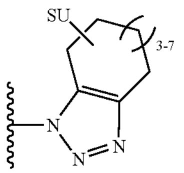
and
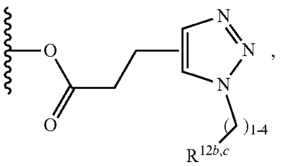
wherein SU indicates substituted or non-substituted;
$Y^3$ is a moiety selected from the group consisting of
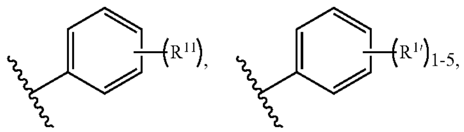
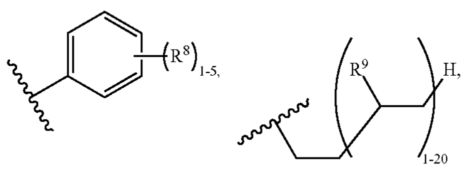
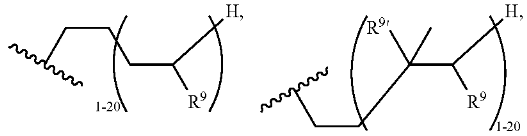
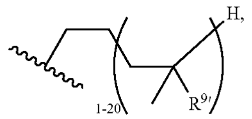
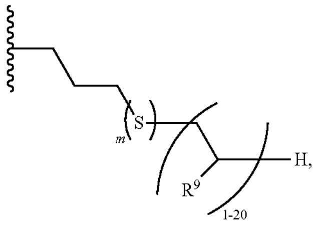
and
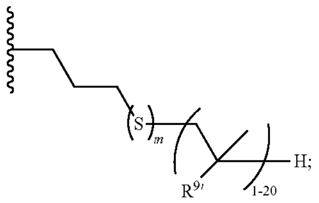
wherein
X is absent, —(NH)— or —O—;
$R^{10}$ is selected from the group consisting of $R^{10a}$, $R^{10b}$, $R^{10c}$, $R^{10d}$, $R^{12a}$ and
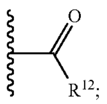

$R^{10a}$ is selected from the group consisting of
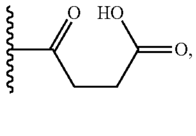
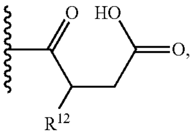
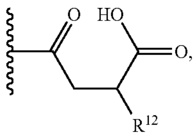
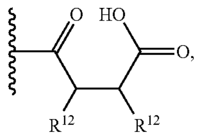
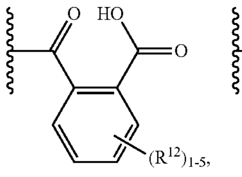
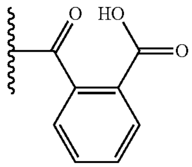
,
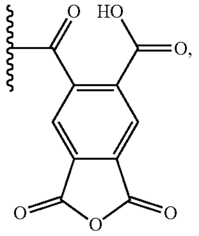
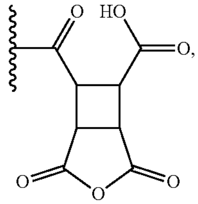
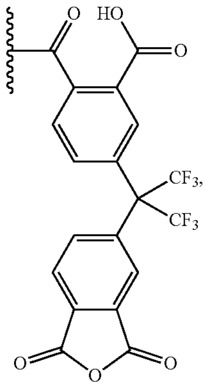
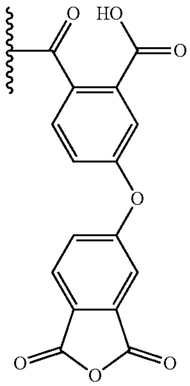
,
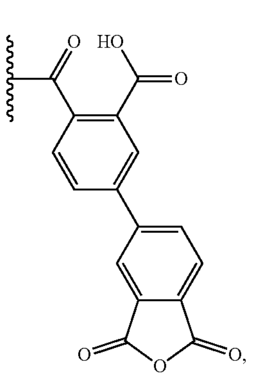
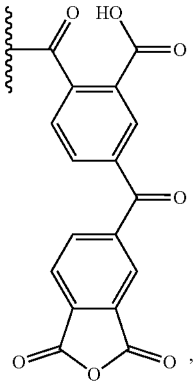
, and
-continued
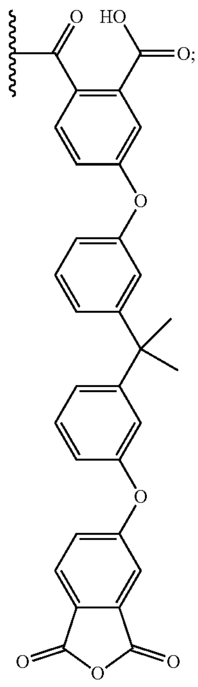 [SMILES: *C(=O)c1ccc(Oc2cccc(C(C)(C)c3cccc(Oc4ccc5c(c4)C(=O)OC5=O)c3)c2)cc1C(=O)O]
$R^{10b}$ is selected from the group consisting of:
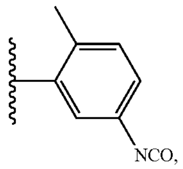
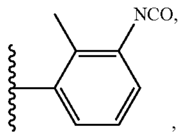
,
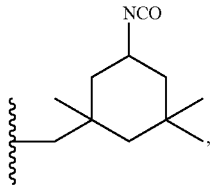
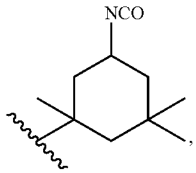
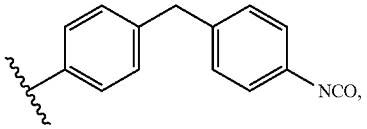
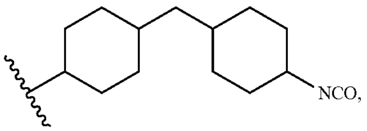
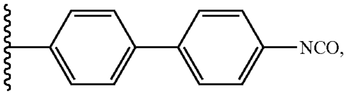
and
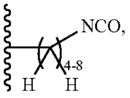
in monomeric, biuret and triisocyanurate form;

$R^{10c}$ is selected from the group consisting of:
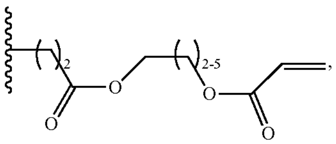
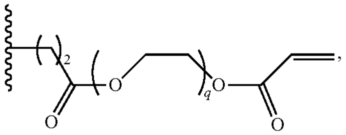
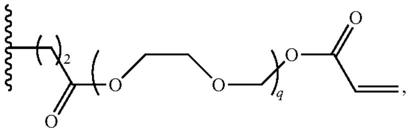
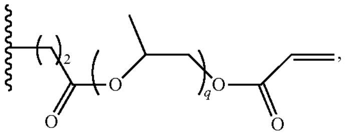
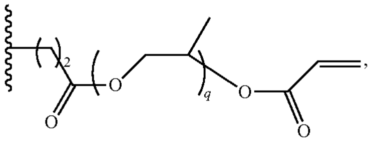
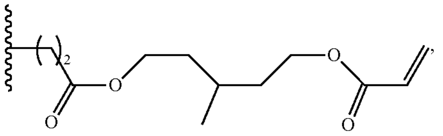
wherein q is an integer from 1 to 25,
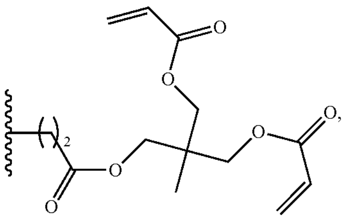
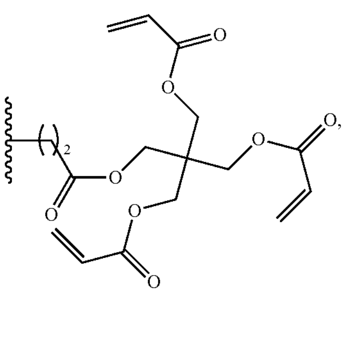
-continued
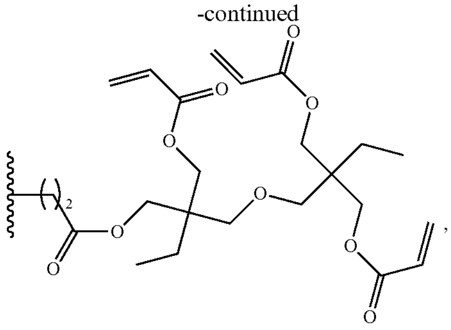
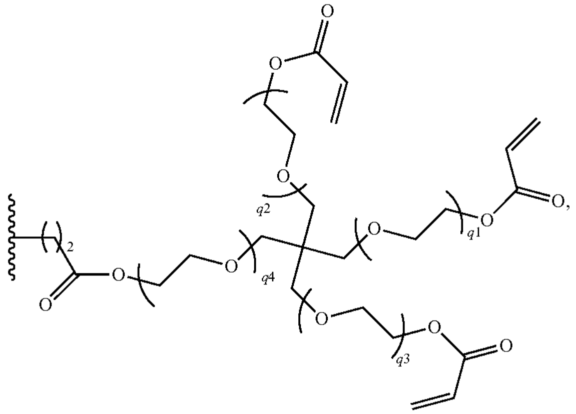
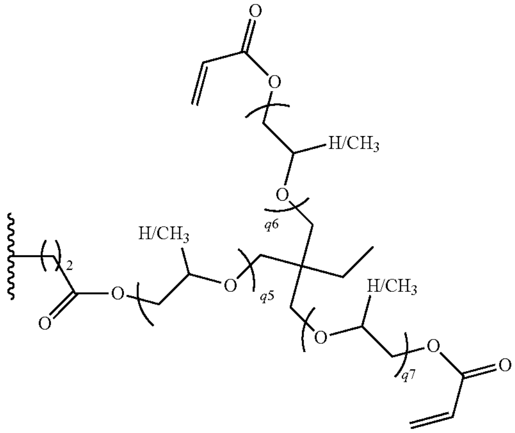
and
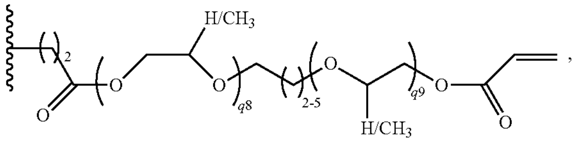
wherein each of q1 to q4 are integers from 0 to 8 and the sum of (q1+q2+q3+q4) is from 4 to 8, wherein each of q5 to q7 are integers from 0 to 24 and the sum of (q5+q6+q7) is from 3 to 24, wherein each of q8 and q9 are integers from 0 to 6 and the sum of (q8+q9) is from 2 to 6;

$R^{10d}$ is selected from the group consisting of:

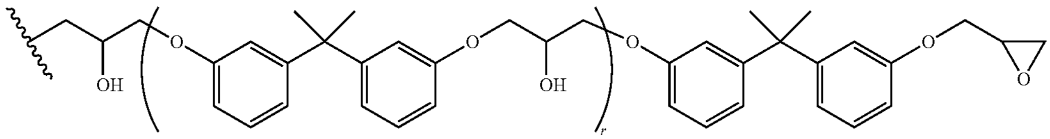
,

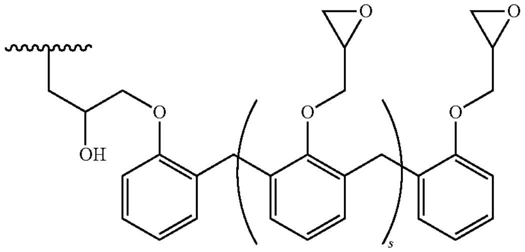
,

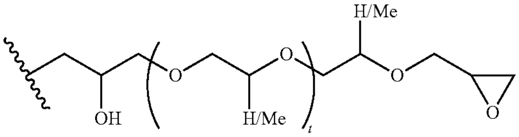
,

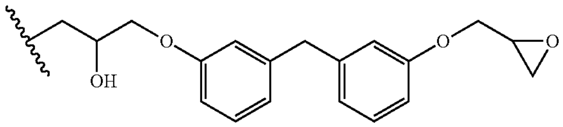
,

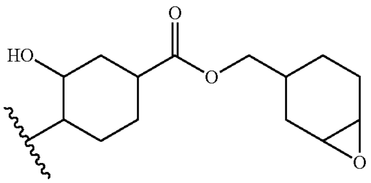
,

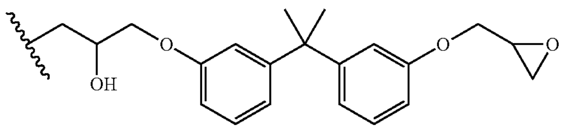
,

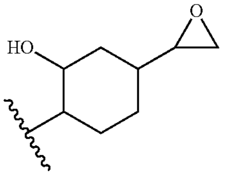
,

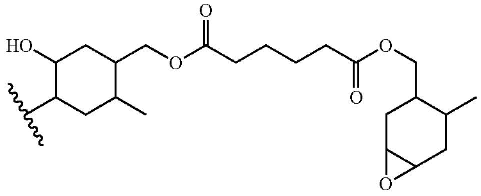
, and

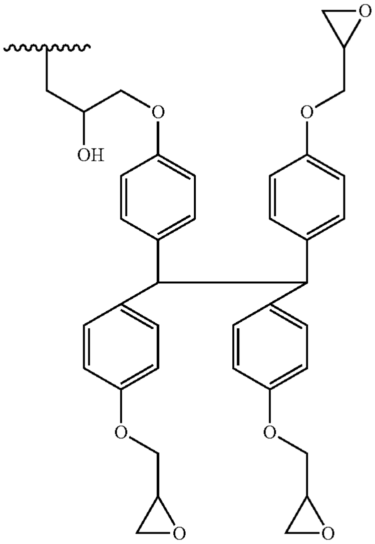
, wherein r is an integer from 1 to 100, s is an integer from 1 to 15 and t is an integer from 1 to 10;

$R^{11}$ is selected from the group consisting of $R^8$, —X—$R^{1'}$ and $R^{12c}$; and $R^{12}$ is selected from the group consisting of $R^{12a}$, $R^{12b}$ and $R^{12c}$, wherein $R^{12a}$ is selected from the group consisting of linear or branched, substituted or non-substituted $C_{1-18}$ alkyl, $C_{2-18}$ alkenyl and $C_{2-18}$ alkynyl, and cyclic, substituted or non-substituted $C_{3-18}$ alkyl, $C_{5-18}$ alkenyl and $C_{8-18}$ alkynyl;

$R^{12b}$ is selected from the group consisting of linear or branched, substituted or non-substituted alkyl ether, alkenyl ether, alkynyl ether up to a molecular weight of 5000 g/mol, and cyclic, substituted or non-substituted alkyl ether and alkenyl ether up to a molecular weight of 5000 g/mol, optionally substituted or unsubstituted poly(ethylene oxide), poly(propylene oxide) and polytetrahydrofuran;

unsubstituted polydimethylsiloxane and polydivinylsiloxane; and poly- and oligosaccharides up to a molecular weight of 5000 g/mol, optionally poly D-glucose, Oligo-D-glucose, chitosan, deacetylated oligo-chitin, oligo-beta-D-galactopyranuronic acid, poly alginic acid, oligo-alginic acid, poly amylose, oligo amylose, poly-galactose, and oligo-galactose with a molecular weight up to 5000 g/mol; and $R^{12c}$ is selected from the group consisting of amino acids, oligo- and poly-peptides up to a molecular weight of 5000 g/mol; optionally oligo- and poly-peptides made of naturally occurring amino acids up to a molecular weight of 5000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, epoxidized fatty acids, epoxidized castor oil, soybean oil, sunflower oil, optionally ring opened epoxidized fatty acid based polyols, optionally natural oil based polyols (NOPs), optionally castor oil, soybean oil, or sunflower oil triglycerides.

with the proviso that $R^{5S}$ is not

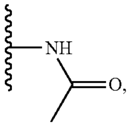,
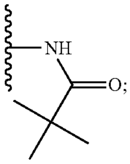;

wherein the degree of polymerization of the D-type alkoxy-terminated siloxane moieties $DP_{D\text{-}type}$ is in the range of 1.0 to 1.9;

the degree of polymerization of the T-type alkoxy-terminated siloxane moieties $DP_{T\text{-}type}$ is in the range of 1.1 to 2.7;

the total content of tri-organofunctional M-type siloxane moieties (ii) in the polysiloxane material does not exceed 20 mol-%, optionally does not exceed 10 mol-% optionally does not exceed 5 mol-%;

the total content of di-organofunctional D-type siloxane moieties (iii) in the polysiloxane material does not exceed 5, 10, or 15 mol-%;

the material has a viscosity in the range of 2 to 100'000 cP, optionally about 5 bis 50'000 cP, optionally 5 to 1'000 cP;

the material comprises less than 5, 2.5, 2, 1.5, 1 or 0.5 mol-% silanol groups (Si—OH); and further wherein the polysiloxane material comprises less than 45, optionally less than 37, optionally less than 30 or less than 25 mol-% four-membered combined $Q^{2r}$-type and $Q^{3s,d}$-type siloxane ring species relative to the total Q-type siloxane species; and/or the polysiloxane material comprises less than 70, optionally less than 63, optionally less than 56 or less than 50 mol-% four-membered combined $Q^{3s,3d}$-type siloxane ring species relative to all $Q^3$-type siloxane species; and/or the polysiloxane material comprises less than 4.5, optionally less than 4.0, optionally less than 3.5 or less than 3.0 mol-% double four-membered $Q^{3d}$-type siloxane ring species relative to the total $Q^3$-type siloxane species; and/or the polysiloxane material comprises less than 25, optionally less than 20, optionally less than 17 or less than 14 mol-% double four-membered $Q^{3d}$-type siloxane ring species relative to all $Q^3$-type siloxane species, characterized in that when all of the $R^5$ residues, optionally at least 65 mol-%, 75 mol-% or 85 mol-% of all $R^5$ residues of the T-type siloxane moieties in the polysiloxane material are $R^{5N}$, the degree of polymerization of the Q-type alkoxy-terminated moieties $DP_{Q\text{-}type}$ is in the range of 1.65 to 2.35, optionally 1.8 to 2.25, and the atomic ratio of T- to Q-species in the material is in the range of 0.05:1 to 0.45:1, optionally 0.10:1 to 0.30:1;

when the sum of all -L-$Z^1$ and -L'-$Y^1$ residues amounts to at least 80 mol-%, 90 mol-% or 95 mol-% of all $R^5$ residues of the T-type siloxane moieties in the polysiloxane material, the degree of polymerization of the Q-type alkoxy-terminated moieties $DP_{Q\text{-}type}$ is in the range of 1.75 to 2.25, optionally 1.85 to 2.2:1, and the atomic ratio of T- to Q-species in the material is in the range of 0.02:1 to 0.3:1, optionally 0.04:1 to 0.25:1;

when the sum of all $Z^3$ and $Y^3$ and/or the sum of all -L-$Z^2$ and -L'-$Y^2$ amounts to at least 50 mol-%, 60 mol-% or 70 mol-% of all $R^5$ residues of the T-type siloxane moieties in the polysiloxane material, and the material optionally further comprises $R^5$ residues being -L-$Z^1$, optionally the sum of $R^5$ residues being -L'-$Y^1$ and -L-$Z^1$ being less than 20 mol-%, the degree of polymerization of the Q-type alkoxy-terminated moieties $DP_{Q\text{-}type}$ is in the range of 1.85 to 2.2, optionally 1.9 to 2.2:1, and the atomic ratio of T- to 0-species in the material is in the range of 0.02:1 to 0.3:1, optionally 0.04:1 to 0.25:1 or 0.04:1 to 0.20:1;

when the sum of all -L-$Z^1$, -L'-$Y^1$ and $R^{5N}$ amounts to at least 90 mol-%, 95 mol-% or 99 mol-% of all $R^5$ residues of the T-type siloxane moieties in the polysiloxane material, optionally at least 30 mol-% of the $R^5$ residues of the material being -L-$Z^1$ and/or -L'-$Y^1$ and at least 10 mol-% of the $R^5$ residues of the material being $R^{5N}$, the degree of polymerization of the Q-type alkoxy-terminated moieties $DP_{Q\text{-}type}$ is in the range of 1.8 to 2.4, optionally 1.85 to 2.3:1, and the atomic ratio of T- to Q-species in the material is in the range of 0.05:1 to 0.4:1, optionally 0.07:1 to 0.35:1; and when the sum of all $R^{5N}$, $Z^3$, $Y^3$, -L'-$Y^2$ and -L-$Z^2$ amounts to at least 90 mol-%, 95 mol-% or 99 mol-% of all $R^5$ residues of the T-type siloxane moieties in the polysiloxane material, optionally the sum of all $Z^3$, $Y^3$, -L'-$Y^2$ and -L-$Z^2$ amounts to at least 20 mol-% of the $R^5$ residues of the material, optionally at least 20 mol-% of the $R^5$ residues of the material are $R^{5N}$, the degree of polymerization of the Q-type alkoxy-terminated moieties $DP_{Q\text{-}type}$ is in the range of 1.7 to 2.25, optionally 1.85 to 2.2:1, and the atomic ratio of T- to Q-species in the material is in the range of 0.05:1 to 0.25:1, optionally 0.06:1 to 0.22:1.

The terminology of a double four membered siloxane ring species and $Q^{2r}$, $Q^{3s}$, as well as $Q^{3d}$ is explained further below.

For example, the polymeric liquid polysiloxane material described herein for all aspects can be of a core-shell structure, wherein the core is composed of a majority of Q-type moieties and has a different composition than the shell, which is composed primarily of T-type moieties, and optionally further comprises M- and D-type moieties. Herein, the core is also referred to as the "precursor (material)". Alternatively, the polymeric liquid material can also comprise a "core-only" material, meaning that there is no shell and that Q- and T-type moieties are essentially randomly distributed within said core. The term "core-shell", as used herein, is commonly understood in the art (see, e.g., Nanoscale, 2010, 2, 829-843 or Nanoscale, 2011, 3, 5120-5125). Concerning core-shell products, the interface between core and shell must be understood as a diffuse shell rather than a sharp boundary at which composition changes abruptly. This diffuse shell layer architecture, where the concentration of the functional shell species varies over a few bond lengths or Angstroms, is a direct result of the condensation chemistry, that is, the grafting of a functional silane shell onto a preformed polysiloxane core. Because the outer arms of the dendritic polysiloxane core are highly permeable to smaller silane monomers and oligomers, it is clear that the extent of grafting of the shell is highest on the periphery but there is no sharp cutoff. Nevertheless, the term core-shell still applies as grafting in the center of the core is highly hindered for both, steric reasons and reduced availability of reactive alkoxy groups, because the average connectivity (number of bridging oxygen linkages (Si—O—Si bonds) per silicon center) in the center of the core is higher than at the core perimeter. Consequently, the term core-shell will be used in the context of polymeric liquid materials in the sense of a polysiloxane core with a diffuse shell as described herein.

If $R^5$ comprises silane moieties, the resulting moieties are referred to as "bipodal silanes".

The polysiloxane materials described herein are highly dendritic linear and liquid species due to the low number of four-membered $Q^{2r}$-type and/or $Q^{3s,d}$-type siloxane ring species.

For example, a typical material according to the present invention may also comprise Q-, T-, D- and/or M-type silane monomers ($Q^0$, $T^0$, $D^0$, $M^0$), e.g. in smaller molar quantities compared to the $Q^n$, $T^n$, $D^n$ and $M^n$, with n≥1, moieties, in other words, the total molar siloxane content must be higher than the total molar silane monomer content, excluding HMDSO which may be present in any amounts, also as a monomer, e.g. also as a solvent or co-solvent. Similarly, the material may optionally contain substantial fractions of smaller oligomers, for example a mixture of oligomers that spans a range from, e.g. dimer to pentamer polysiloxanes, optionally also featuring mixed Q-T and optionally Q-D bonding modes.

The material of the present invention comprises less than 5, 2.5, 2, 1.5, 1 or 0.5 mol-% silanol groups (Si—OH), this means that the OR' moieties of Q-, T- or D-type silanes are —OH groups to this extent.

It was surprisingly found that the material described herein can be prepared, e.g. by using a rearrangement catalyst as described herein, without the need for any active condensation reagents such as acetic anhydride and that M-, D- and/or T-type silanes react with the Q-type precursor or core material in a nucleophilic substitution/condensation ("rearrangement") reaction. It was also found that the range of improved technical properties were found to materialize within the disclosed and specific range of $DP_{Qtype}$ which translates into a rather sizable "core" material, essentially making up the majority of the dendritic polysiloxane backbone structure. The functional T-type moieties grafted on the Q-type rich core give it its functionality, however it is further surprising that the $DP_{T\text{-}type}$ value is secondary in determining product properties and that the stoichiometric ratio of Q-type non-organofunctional to T-type monoorganofunctional species is primarily determining the dendritic "macro"-crosslinking reactivity of these functional polymeric liquid materials.

Without wishing to be bound by theory, it is believed that one of the driving forces for this substitution reaction (also called "grafting") results from the ring strain of four-membered $Q^{2r}$-type and/or $Q^{3s,d}$-type siloxane ring species in the Q-type precursor material used for preparing the polysiloxane materials described herein. The release of ring tension in the Q-type core material is sufficient for efficiently adding, i.e. grafting, M-, D- and/or T-type silanes onto the Q-type core material without the need for further chemical reagents such as acetic anhydride and, if the reaction time can be extended considerably, essentially also without the need for a rearrangement catalyst as defined herein. An exemplary structural formula (2D representation) of such a core material is shown in FIG. 1, where selected general $R^1$ alkoxy ligands are shown and the effect of a smaller (FIG. 1_b_) versus a larger (FIG. 1_a_) polysiloxane molecule can be seen in terms of surface to volume ratio and the relative amount of accessible $R^1$ groups for $T^0$-grafting (circled).

Furthermore, a similar structural exemplary representation of a material described herein is shown in FIG. 2_a_, again as a general case with various organofunctional T, D and M functionalities with partial $R^{5S}$ T-type functionalization. More specific cases are drawn in FIG. 2_b_ and FIG. 2_c_.

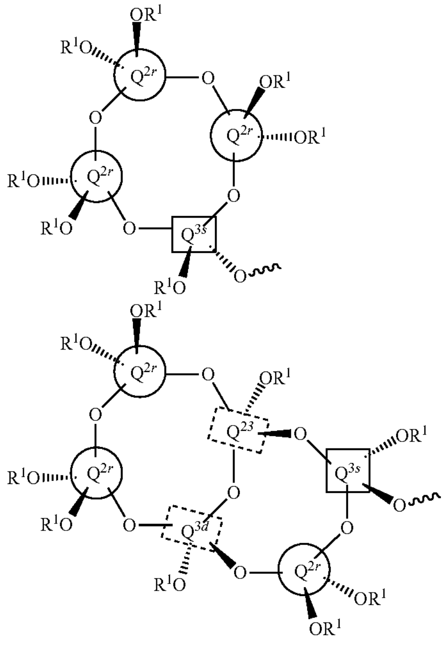

The term "four-membered" ring or polysiloxane ring or Q-type ring species as referred to herein always refers to an ensemble of all $Q^{2r}$ and $Q^{3s,d}$-type moieties comprised in the material which are part of a four membered polysiloxane ring structure. Two representative examples of such typical configurations of moieties in single and double four-membered ring structures are shown in the above formulas. $Q^{2r}$ ring moieties occur in both, "single" and "double" ring structures and comprise two siloxane bonds on each $Q^{2r}$ which are both part of the ring structure and two alkoxy group (—OR') substituents. In the example on the left of a single four-membered siloxane ring, only $Q^{2r}$ ring (circle) and "single ring" $Q^{3s}$ (square) species are possible. In the second example of two connected four-membered siloxane rings (a bi-cyclic structure) shown on the right, in addition to $Q^{2r}$ ring species (circle) and "single ring" $Q^{3s}$ (square) species, also "double ring" $Q^{3d}$ (rectangle, dashed line) moieties are possible, which are located at the bridge sites connecting the two rings. It is noted that in these $Q^{3d}$ species, all siloxane bonds are part of the double ring network. Also, it is noted that the wiggly lines on the oxygen atoms connected to $Q^{3s}$ moieties represent a siloxane bond to any other possible $Q^n$, $T^n$, $D^n$ or $M^n$ moiety with n≥=1. It must further be understood, that in the above examples for typical configurations, moieties are of Q-type but that these are only examples for assisting the skilled person's understanding but in reality there is no restriction to Q-type moieties. In fact it is within the scope of this disclosure and very much expected that in such four-membered polysiloxane ring structures also T-type and/or D-type moieties will be present.

Herein, $Q^2$ species in any four membered siloxane ring structures are termed "$Q^{2r}$" and "$Q^3$" species in single ring structures and in double ring structures are termed "$Q^{3s}$" and "$Q^{3d}$", respectively.

For quantification purposes, there are different indicators that can be used to define or constrict the above mentioned four membered polysiloxane ring species. A first indicator is to be defined as the total number of $Q^{2r}$ and $Q^{3s,d}$ ring species over the total Q species in the material:

$$\%\ (Q^{2r}\ \&\ Q^{3s,d})\text{ ring species} = 100\cdot\Sigma(A_{Q2rings}+A_{Q3rings})/\Sigma(A_{Qn}) = 100\cdot(A_{Q2r}+A_{Q3s}+A_{Q3r})/(A_{Q0}+A_{Q1}+A_{Q2}+A_{Q3}+A_{Q4});$$

A second indicator is to be defined as the total number of $Q^{3s,d}$ ring species over all $Q^3$ species in the material:

$$\%\ (Q^{3s,d})\text{ ring species within } Q^3 = 100\cdot\Sigma(A_{Q3rings})/A_{Q3} = 100\cdot(A_{Q3s}+A_{Q3d})/A_{Q3} = 100(1-(A_{Q3|}/A_{Q3}))$$

A third indicator is to be defined as the total number of $Q^{3d}$ ring species over the total Q species in the material:

$$\%\ (Q^{3d})\text{ ring species} = 100\cdot A_{Q3d}/\Sigma(A_{Qn}) = 100\cdot A_{Q3d}/(A_{Q0}+A_{Q1}+A_{Q2}+A_{Q3}+A_{Q4});$$

A fourth indicator is to be defined as the total number of $Q^{3d}$ ring species over all $Q^3$ species in the material:

$$\%\ (Q^{3d})\text{ring species within } Q^3=100\cdot A_{Q3d}/A_{Q3};$$

All mol-% numbers described herein—unless specifically mentioned otherwise—are defined by the sum of all D-, M- or T-type silicon atoms divided by the sum of all silicon atoms in the material, e.g. as measured by means of quantitative $^{29}$Si-NMR. The variable A is the spectral peak area as defined further below.

The mol-% of four-membered $Q^2$-type and/or $Q^3$-type siloxane ring species relative to the total Q-type siloxane species can be determined by $^{29}$Si-NMR analysis, as demonstrated below in the examples. The polysiloxane material described herein comprises less than the stated mol-% four-membered ($Q^{2r}$& $Q^{3s,d}$) and/or ($Q^{2r}$) and/or ($Q^{3s}$ single) and/or ($Q^{3d}$ double) ring species relative to the total Q-type siloxane species. This means that the material comprises either less than the stated mol-% four-membered $Q^{2r}$-type siloxane ring species, less than the stated mol-% four-membered $Q^{3s,d}$-type siloxane ring species and/or less than the stated mol-% four-membered $Q^{2r}$-type and $Q^{3s,d}$-type siloxane ring species, cumulatively. For all embodiments described herein, the four-membered $Q^{3s,d}$-type siloxane ring species includes $Q^{3s,d}$-type siloxane species, wherein one $Q^{3s,d}$-type siloxane is part of one or two four-membered rings.

It was further surprisingly found that the degree of polymerization $DP_{Qtype}$ together with the T- to Q-type atomic ratio in the material are the primarily responsible factors to determine the observed reactivity and properties. If the $DP_{Qtype}$ value is chosen to be small (for example below the values disclosed herein), the average "core" is rather limited in size and a large amount of T-type silane would be needed to obtain a surface coverage with T-type moieties large enough to truly impart significant $R^5$ functionality emanating from said grafted T-type units to the material. As the $DP_{Qtype}$ increases (for example above a value disclosed herein), the surface to volume ratio is rapidly decreased, which means that a lower amount of T type moieties (a lower T:Q type molar ratio) is needed to impart significant $R^5$ functionality to the material. This argument holds over the entire range of $DP_{Qtype}$ above a certain minimum limit for essentially all materials and the macromolecular or dendritic character of the material (or in other words the efficiency of use for the T-type functional moieties) keeps increasing as the core size increases. With increasing DP-$Q_{type}$, however, the material viscosity increases in a steep, strongly non-linear manner and may lead to gelation or a significant viscosity increase which at some point makes practical use difficult. As it turns out, the $DP_{Qtype}$ minimal and maximal values also depend on the type of T-type silane moieties which are grafted onto its periphery and depending on their nature also affects the ideal range of application relevant properties. Furthermore it is contrary to ones expectations that the atomic or molar ratio of T- to Q species in the material primarily determines its surface functional properties, and only to a lesser extent the $DP_{Qtype}$, as the latter does not correlate at all with an amount of T-type moieties in relation to Q but rather represents the grafting "efficiency".

If a material exhibits M-type moieties, this generally leads to an increase in $DP_{Qtype}$. Therefore, the limit of $DP_{Qtype}$ in all materials disclosed herein is to be raised by 0.05 or optionally 0.1 DP units if the amount of M-type modification exceeds 5 mol-% or optionally 10 mol-%.

Optionally, the polymeric liquid hyperbranched polysiloxane material described herein is one, wherein at least 65 mol-% of all $R^5$ residues of the T-type siloxane moieties in the polysiloxane material are $R^{5N}$, the degree of polymerization of the Q-type alkoxy-terminated moieties $DP_{Qtype}$ is in the range of 1.65 to 2.35 and optionally 1.8 to 2.25 and the atomic ratio of T- to Q-species in the material is in the range of 0.05:1 to 0.45:1 and optionally 0.10:1 to 0.30:1;

the sum of all -L-$Z^1$ and -L'-$Y^1$ residues amounts to at least 80 mol-% of all $R^5$ residues of the T-type siloxane moieties in the polysiloxane material, the degree of polymerization of the Q-type alkoxy-terminated moieties $DP_{Qtype}$ is in the range of 1.75 to 2.25, optionally 1.85 to 2.2:1, and the atomic ratio of T- to Q-species in the material is in the range of 0.02:1 to 0.3:1, optionally 0.04:1 to 0.25:1;

the sum of all $Z^3$ and $Y^3$ and/or the sum of all -L-$Z^2$ and -L'-$Y^2$ amounts to at least 50 mol-% of all $R^5$ residues of the T-type siloxane moieties in the polysiloxane material, and the material optionally further comprises $R^5$ residues being -L-$Z^1$, optionally the sum of $R^5$ residues being -L'-$Y^1$ and -L-$Z^1$ being less than 20 mol-%, the degree of polymerization of the Q-type alkoxy-terminated moieties $DP_{Qtype}$ is in the range of 1.85 to 2.2, optionally 1.9 to 2.2:1, and the atomic ratio of T- to Q-species in the material is in the range of 0.02:1 to 0.3:1, optionally 0.04:1 to 0.25:1 or 0.04:1 to 0.20:1;

the sum of all -L-$Z^1$, -L'-$Y^1$ and $R^{5N}$ amounts to at least 90 mol-% of all $R^5$ residues of the T-type siloxane moieties in the polysiloxane material, optionally at least 30 mol-% of the $R^5$ residues of the material are -L-$Z^1$ and/or -L'-$Y^1$ and at least 10 mol-% of the $R^5$ residues of the material are $R^{5N}$, the degree of polymerization of the Q-type alkoxy-terminated moieties $DP_{Q\text{-}type}$ is in the range of 1.8 to 2.4, optionally 1.85 to 2.3:1, and the atomic ratio of T- to Q-species in the material is in the range of 0.05:1 to 0.4:1, optionally 0.07:1 to 0.35:1; and/or the sum of all $R^{5N}$, $Z^3$, $Y^3$, -L'-$Y^2$ and -L-$Z^2$ amounts to at least 90 mol-% of all $R^5$ residues of the T-type siloxane moieties in the polysiloxane material, optionally the sum of all $Z^3$, $Y^3$, -L'-$Y^2$ and -L-$Z^2$ amounts to at least 20 mol-% of the $R^5$ residues of the material, optionally at least 20 mol-% of the $R^5$ residues of the material being $R^{5N}$, the degree of polymerization of the Q-type alkoxy-terminated moieties $DP_{Q\text{-}type}$ is in the range of 1.7 to 2.25, optionally 1.85 to 2.2:1, and the atomic ratio of T- to Q-species in the material is in the range of 0.05:1 to 0.25:1, optionally 0.06:1 to 0.22:1.

The atomic ratio of T- to Q-species in the material is the ratio between the silicon atoms of all T-type species ($T^0$, $T^1$, $T^2$ and $T^3$) and the silicon atoms of all Q-type species ($Q^0$, $Q^1$, $Q^2$, $Q^3$ and $Q^4$).

The polymeric liquid polysiloxane material described herein is optionally $R^{5S}$-functionalized, e.g. at least 1 mol-%, optionally at least 3 mol-%, optionally at least 5 mol-% optionally at least 7 mol-% of the sum of all $R^{5U}$ and $R^{5S}$ moieties in the material are $R^{5S}$ moieties, wherein $R^{5S}$ is considered a functionalized moiety. The $R^{5S}$-functionalization may be introduced into the polysiloxane material by either selecting T-type silane or siloxane moieties which are already $R^{5S}$-functionalized (i.e. are pre-$R^{5S}$-functionalized $T^0$ or T-type oligomer precursors used for rearrangement grafting) for the manufacture of the polysiloxane material, i.e. T-type monomer or oligomer compounds which comprise $R^{5S}$ moieties, e.g. to the extent as defined herein, or alternatively to a lesser extent, i.e. less than 1 mol-%. If the T-type siloxane or silane moieties in a material otherwise corresponding to that disclosed herein comprise no or less than 1 mol-% $R^{5S}$ (relative to the total mol number the sum of all $R^{5U}$ and $R^{5S}$ T-type substituents), the T-type siloxane moieties can be $R^{5S}$-functionalized either by functionalizing $R^{5U}$ on already grafted T-type siloxane moieties or by grafting further, pre-$R^{5S}$-functionalized T-type silanes or oligomers comprising $R^{5S}$ moieties. The functionalization of $R^{5U}$ moieties can be done by known chemical methods and is described in the context of the present method. It is noted that the $R^{5S}$-functionalization, as described herein, is a specific form of functionalization, whereas the general term "organofunctional silane or siloxane" refers to a silane/siloxane generally bearing an organic residue directly bound to the silicon atom.

Optionally for all aspects and embodiments described herein, 0 mol-% of all $R^5$ moieties in the material are $R^{5S}$ moieties.

In the context of $R^{5U}$ being selected from -L-$Z^1$, it is understood that the following residues may have to be deprotected by standard chemical reaction if a functionalization thereof is desired:

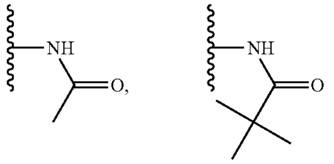

and

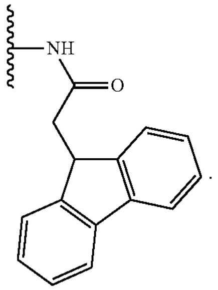

If $R^{5U}$ moieties of grafted T-type siloxanes are functionalized, it is within the scope of the present invention that in cases where some reactivity or comparable reactivity or even no chemical selectivity difference between $R^{5U}$ and $R^2$, $R^3$, $R^4$ substituents can be expected, some, e.g. 5 to 95 mol-% or e.g. 25 to 90% of $R^2$, $R^3$ and/or $R^4$ moieties relative to $R^{5U}$ are functionalized if $R^2$, $R^3$ and/or $R^4$ are selected from phenyl and vinyl. The functionalization of $R^2$, $R^3$ and/or $R^4$ moieties may lead to the following exemplary chemical entities:

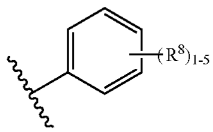

,

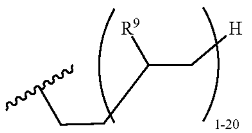

,

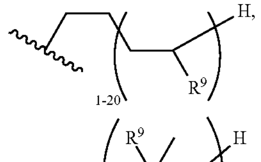

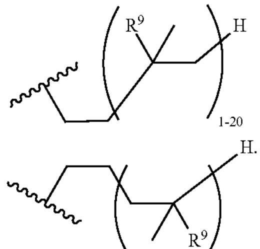

and

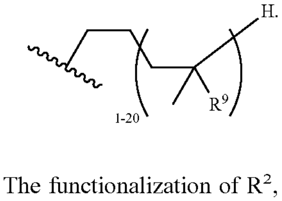

The functionalization of $R^2$, $R^3$, $R^4$ and $R^5$ can be identified and quantified by known spectroscopic means, e.g. by nuclear magnetic resonance spectroscopy, e.g. by $^{1}$H—, $^{13}$C—, and optionally $^{15}$N or $^{33}$S or $^{31}$P-NMR, optionally with isotope enrichment for analytical verification of these functionalization reactions. Specifically, during these types of organic reactions, e.g. addition or substitution or radical reactions, proton and carbon signatures experience a shift in their NMR response due to the change in electronic structure and structural environment and its resulting impact on the magnetic couplings. Typically, a signature from a proton or group of protons or carbon(s) will disappear when such an organic reaction takes place and a new peak appears further up or downfield in the spectrum depending on how the functionalization reaction impacted the magnetic couplings of these species in question. Thus, both the disappearance of the old chemical signature and the appearance of the new signature can be followed quantitatively with NMR spectroscopy. Quantitative reaction monitoring of organic reactions is common general knowledge and does not need further description.

The term “in monomeric, biuret or tri-isocyanurate form” means that the depicted chemical entities from which $R^{10b}$ is chosen may be in their monomeric form, i.e. correspond to the entity depicted, in their biuret form, i.e. correspond to three or optionally up to five, of the depicted monomers coupled by the diamide formed from isocyanate functionalities, or in their tri-isocyanurate from, i.e. correspond to three of the depicted monomers coupled by a cyclic isocyanurate group formed from isocyanate functionalities.

Generally, the biuret form is as shown below:

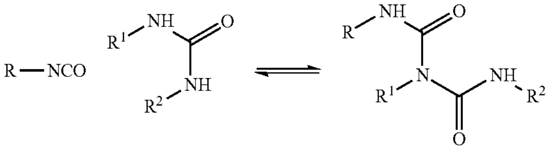

Biuret

For example, the biuret form of the monomer

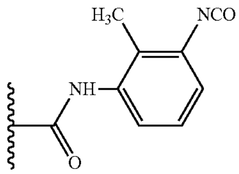

is

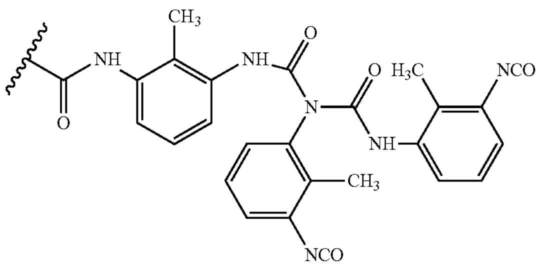

and the corresponding tri-isocyanurate form is

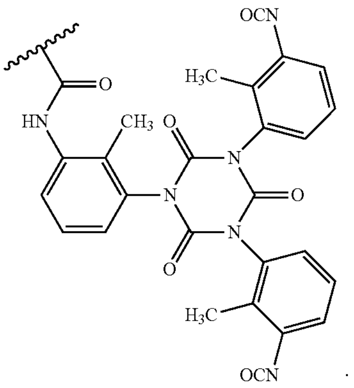

The same applies independent of whether the isocyanate-bearing entity is attached to the siloxane moiety via a —NC(═O)N— (e.g. for

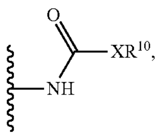

X═N and $R^{10}$═$R^{10b}$), —NC(═O)O— (e.g. for

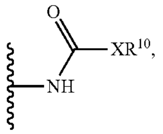

X═O and $R^{10}$═$R^{10b}$), or —NC(═O)C— (e.g. for

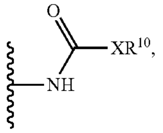

X=absent and $R^{10}$═$R^{10b}$) bond or directly, e.g. via a N—C-bond (e.g. for

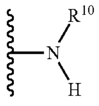

and $R^{10}$═$R^{10b}$).

The term “non-substituted” as used herein shall mean substituted only with hydrogen. The term “substituted” as used herein, means that any one or more hydrogens on the designated atom or group is replaced, independently, with an atom different from hydrogen, optionally by a halogen, optionally by fluorine, chlorine, bromine, iodine, a thiol, a carboxyl, an acrylato, a cyano, a nitro, an alkyl (optionally $C_1$-$C_{10}$), aryl (optionally phenyl, benzyl or benzoyl), an alkoxy group, a sulfonyl group, by a tertiary or quaternary amine or by a selection from the indicated substituents, provided that the designated atom's normal valence is not exceeded, and that the substitution results in a stable compound, i.e., a compound that can be isolated and characterized using conventional means. Optionally, the substitution occurs on the beta position or the omega (opposite terminal hydrocarbon, if the $R^{5S}$ substituent linkage is through the alpha position) of the hydrocarbon chain or optionally on the beta or gamma position of the hydrocarbon chain (next or next-next neighboring carbons from substituent attachment carbon). In the case of unsaturated hydrocarbons, the substitution occurs optionally on the beta or omega position of the hydrocarbon chain or optionally on the carbon being part of a double or triple bond or on its directly adjacent carbon.

In the context of the present invention it is understood that antecedent terms such as "linear, branched or cyclic", "substituted or non-substituted" indicate that each one of the subsequent terms is to be interpreted as being modified by said antecedent term. For example, the scope of the term "linear, branched or cyclic, substituted or non-substituted alkyl, alkenyl, alkynyl, carbocycle" encompasses linear, branched or cyclic, substituted or non-substituted alkyl; linear, branched or cyclic, substituted or non-substituted alkenyl; linear, branched or cyclic, substituted or non-substituted alkynyl; linear, branched or cyclic, substituted or non-substituted alkylidene; and linear, branched or cyclic, substituted or non-substituted carbocycle. For example, the term "$C_{1-18}$ alkyl, $C_{2-18}$ alkenyl and $C_{2-18}$ alkynyl" indicates the group of compounds having 1 or 2 to 18 carbons and alkyl, alkenyl or alkynyl functionality.

The expression "alkyl" refers to a saturated, straight-chain or branched hydrocarbon group that contains the number of carbon items indicated, e.g. linear, branched or cyclic "($C_{1-18}$)alkyl" denotes a hydrocarbon residue containing from 1 to 18 carbon atoms, e.g. a methyl, ethyl, propyl, iso-propyl, n-butyl, iso-butyl, sec-butyl, tert-butyl, n-pentyl, iso-pentyl, n-hexyl, 2,2-dimethylbutyl, cyclopropane, cyclobutane, cyclopentane, cyclohexane, cycloheptane, cyclooctane, cyclononane, cylcodecane, etc.

If an alkyl chain is characterized by a name that allows for linear or branched isomers, all linear or branched isomers are encompassed by that name. For example, "butyl" encompasses n-butyl, iso-butyl, sec-butyl and tert-butyl.

The expression "alkenyl" refers to an at least partially unsaturated, substituted or non-substituted straight-chain or branched hydrocarbon group that contains the number of carbon atoms indicated, e.g. "($C_{2-18}$)alkenyl" denotes a hydrocarbon residue containing from 2 to 18 carbon atoms, for example an ethenyl (vinyl), propenyl (allyl), iso-propenyl, butenyl, iso-prenyl or hex-2-enyl group, or, for example, a hydrocarbon group comprising a methylene chain interrupted by one double bond as, for example, found in monounsaturated fatty acids or a hydrocarbon group comprising methylene-interrupted polyenes, e.g. hydrocarbon groups comprising two or more of the following structural unit $—[CH=CH—CH_2]—$, as, for example, found in polyunsaturated fatty acids.

The expression "alkynyl" refers to at least partially unsaturated, substituted or non-substituted straight-chain or branched hydrocarbon groups that may contain, e.g. from 2 to 18 carbon atoms, for example an ethinyl, propinyl, butinyl, acetylenyl, or propargyl group.

The expressions "alkyl ether" refers to a saturated or non-saturated, straight-chain or branched hydrocarbon group that contains the number of atoms that result in a molecular weight of up to 5000 g/mol. Alkyl ether groups as used herein, shall be understood to mean any linear or branched, substituted or non-substituted alkyl chain comprising an oxygen atom as an ether motif, i.e. an oxygen bound by two methylene groups. Exemplary alkyl ethers are polyethylene glycol (PEG), poly(propylene oxide), polypropylene glycol (PPG) and polytetrahydrofuran chains. The ether residue is attached to the Formula provided in the present invention via the oxygen atom of the ether residue. Optionally, if the ether residue is substituted at a carbon atom with a nucleophilic substituent, e.g. an amine or a thiol, the ether residue can be attached to the Formula provided in the present invention via the nucleophilic substituent.

As used herein, a wording defining the limits of a range of length such as, e.g., "from 1 to 5" or "($C_{1-5}$)" means any integer from 1 to 5, i.e. 1, 2, 3, 4 and 5. In other words, any range defined by two integers explicitly mentioned is meant to comprise and disclose any integer defining said limits and any integer comprised in said range.

As used herein, when referring to a polyol residue, the skilled person is aware that the attachment of, e.g., a linear diol to the polysiloxane material will effectively lead to said diol becoming a "mono-ol" residue because one of the alcohol functionalities forms the coupling bond. In other words, the term polyol as used herein also includes diol reactants that form a "mono-ol" residue once bound to the polysiloxane material. With multiple such groups being grafted onto a polymeric liquid polysiloxane material, still a multifunctional macro-polyol is obtained.

The scope of the present invention includes those analogs of the compounds as described above and in the claims that feature the exchange of one or more carbon-bonded hydrogens, optionally one or more aromatic carbon-bonded hydrogens, with halogen atoms such as F, Cl, or Br, optionally F.

If a residue or group described herein is characterized in having two further residues of the same name, e.g. in $R^{10a}$ being

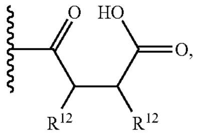

each of these further residues (in this example $R^{12}$) can be independently selected from the definitions of this residue (in this example $R^{12}$) given herein.

The skilled person is aware that any combination of residues or moieties, e.g. $R^{1'}$, $R^8$, $R^9$, $R^{9'}$, L', Y, X, $R^{10}$, $R^{11}$ and $R^{12}$, for forming $R^{5S}$ must lead to a stable compound, i.e., a compound that can be isolated and characterized using conventional means. The skilled person can determine from his common general knowledge which compound, i.e. combination of the residues or moieties, e.g. $R^{1'}$, $R^8$, $R^9$, $R^{9'}$, L', Y, X, $R^{10}$, $R^{11}$ and $R^{12}$, is not stable and specifically which linker chemistries are possible and do not interfere with other chemical functionalities in the polymeric liquid material. Any combination of moieties or residues, e.g. $R^{1'}$, $R^8$, $R^9$, $R^{9'}$, L', Y, X, $R^{10}$, $R^{11}$ and $R^{12}$, that would result in a not stable compound is excluded from the scope of the claims.

For example, poly- and oligosaccharides in the context of $R^{12b}$ are connected to the respective moiety (e.g. to $R^8$, Y, $R^{10}$, or $R^{11}$) via an oxygen atom or optionally via a nitrogen atom (e.g. chitosan).

For example, amino acids, oligo- or polypeptides in the context of $R^{12c}$ are connected to o the respective moiety (e.g. to $R^8$, $Y^{1-3}$, $R^{10}$ or $R^{11}$) via their amine or via the carbonyl carbon, or via a thiol (e.g. in the case of cysteine containing $R^{12b}$)

Fatty acids in the context of $R^{12c}$ are, for example, connected to o the respective moiety (e.g. to $R^8$, $Y^{1-3}$, $R^{10}$, or $R^{11}$) via a hydroxyl group (e.g. for castor oil) or via the carboxylic acid functionality or optionally for unsaturated fatty acids through the double bond group(s), e.g. via radical polymerization chemistry. Also, the fatty acids may be connected by opening an/reaction with an epoxide in the case of, e.g., epoxidized fatty acids or epoxidized fatty acid based polyols.

Triglycerides or polyols derived from fatty acids by epoxidation and ring opening with for example an alkali hydroxide base can also be connected via the hydroxyl functionality, either directly by means of ether linkages or esterification or optionally by secondary substitution e.g. by brominating or oxidation to the ketone and e.g. subsequent further substitution or optionally by reaction with isocyanate terminated $R^{5S}$ groups.

In an embodiment, the polymeric liquid hyperbranched polysiloxane material of the present invention is one, wherein $R^{5N}$ is selected from the group consisting of methyl, ethyl, n-propyl, isopropyl, n-butyl, t-butyl, linear, branched or cyclic $C_{5-16}$ alkyl residues, optionally linear or branched hexyl, octyl, dodecyl, hexadecyl, (3,3,3-trifluoro)propyl, cyclohexyl, cyclopentadienyl, and cyclopentyl;

$Z^1$ is a moiety selected from the group consisting of —SH,

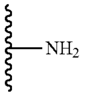,
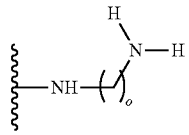,
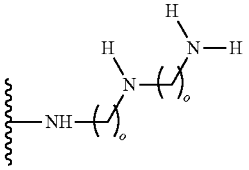
and
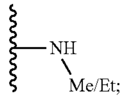;

$R^8$ is selected from the group consisting of —Cl, —Br, —I, —CN, —SCN, and —$N_3$;

$Y^1$ is selected from the group consisting of

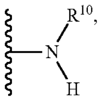
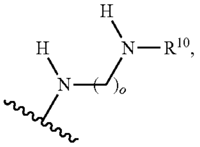
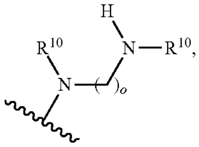
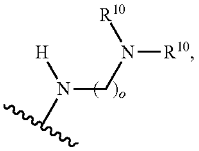
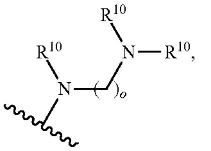

-continued

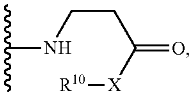
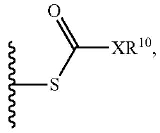
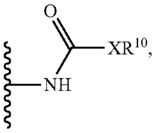
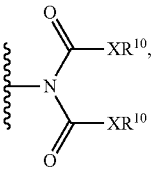
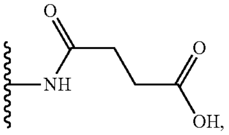
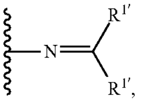
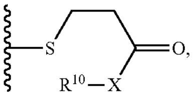
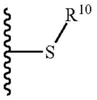
and
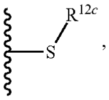, wherein o is an integer from 1 to 3;

$Y^2$ is a moiety selected from the group consisting of

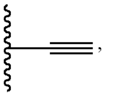
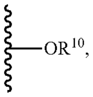
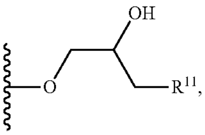
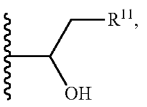
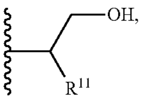
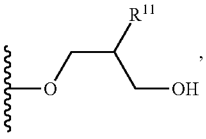
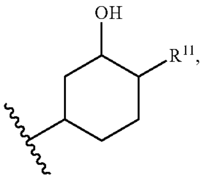
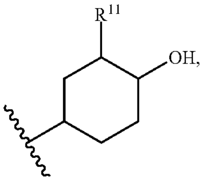
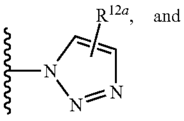
and
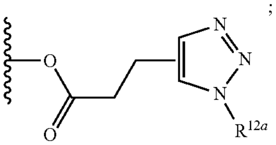;

$Y^3$ is a moiety selected from the group consisting of

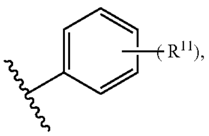
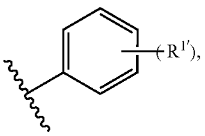
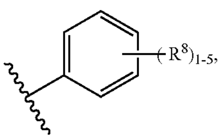
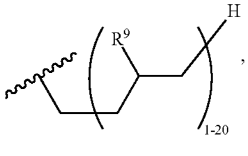,

-continued
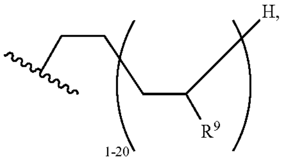
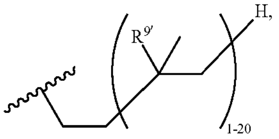
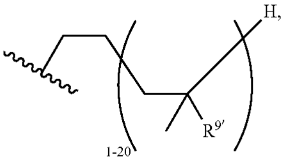
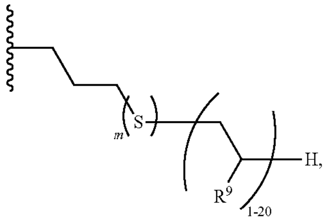
and
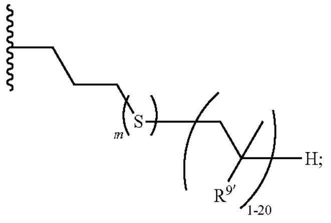
wherein
X is absent, —(NH)— or —O—;
$R^{10}$ is selected from the group consisting of $R^{10a}$, $R^{10b}$, $R^{10c}$, $R^{10d}$ and $R^{12a}$;
$R^{10a}$ is selected from the group consisting of
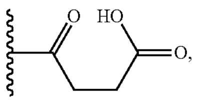
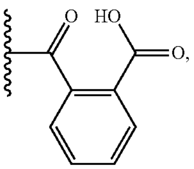
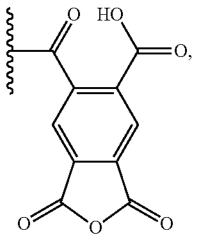
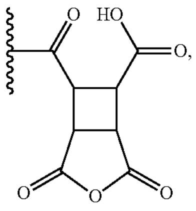
-continued
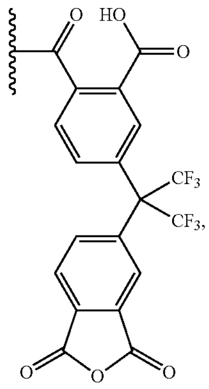
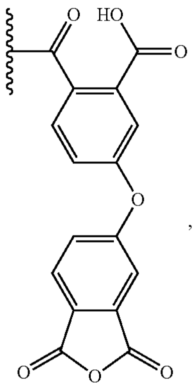
,
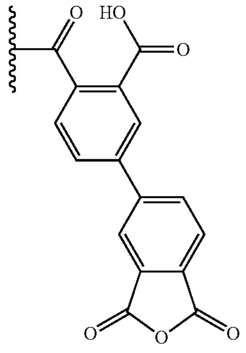
and
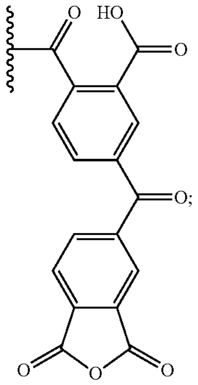
$R^{10b}$ is selected from the group consisting of
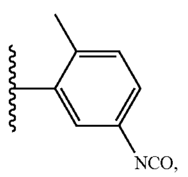
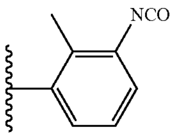
,
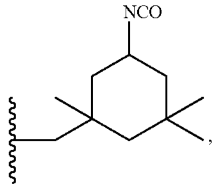
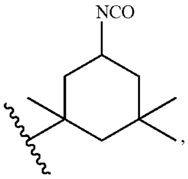
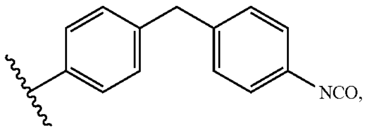
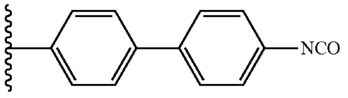
and
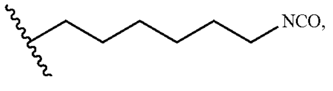
and X is N;

$R^{10c}$ is selected from the group consisting of
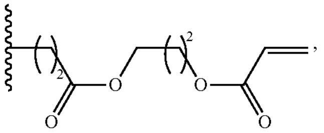
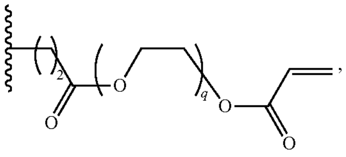
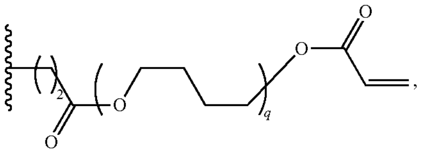
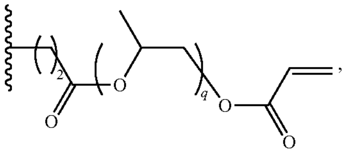
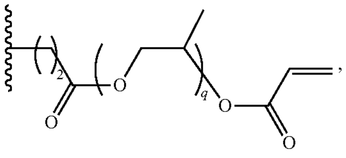
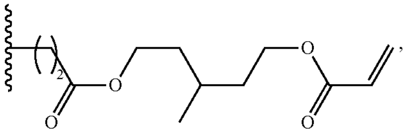
wherein q is an integer from 1 to 10,
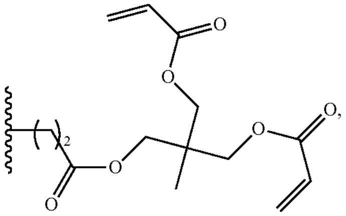
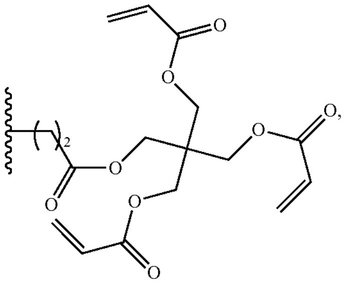
-continued
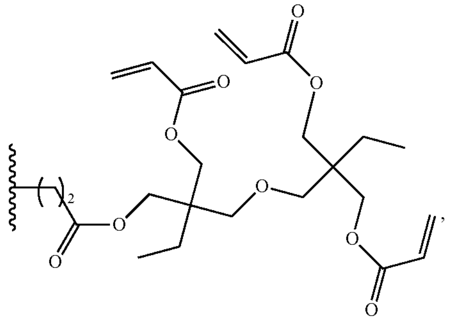
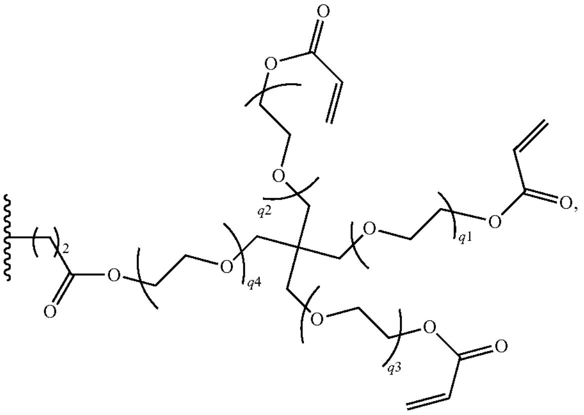
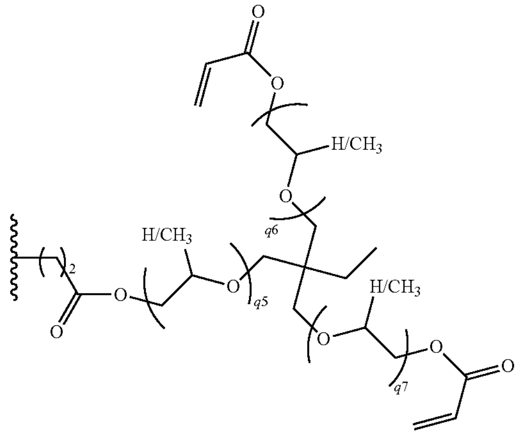
and
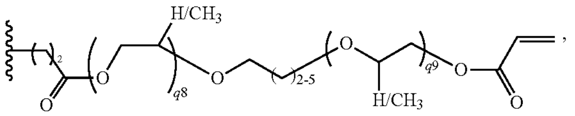
wherein each of q1 to q4 are integers from 0 to 8 and the sum of (q1+q2+q3+q4) is from 4 to 8, wherein each of q5 to q7 are integers from 0 to 24 and the sum of (q5+q6+q7) is from 3 to 24, wherein each of q8 and q9 are integers from 0 to 6 and the sum of (q8+q9) is from 2 to 6;

$R^{10d}$ is selected from the group consisting of

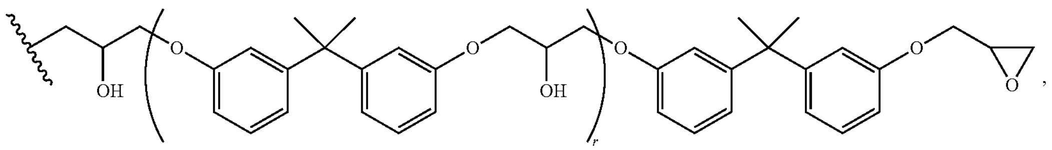

,

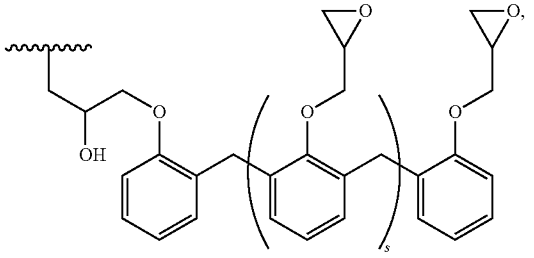

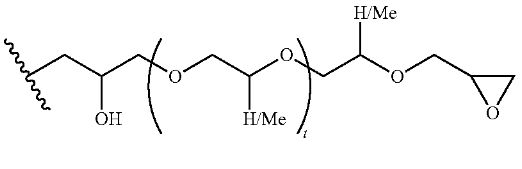

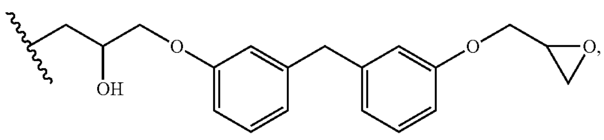

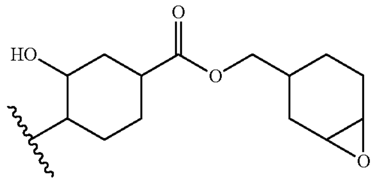

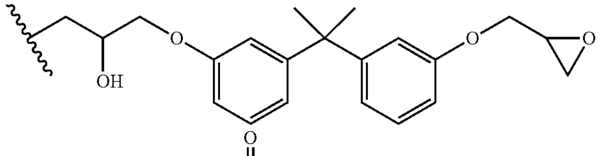

and

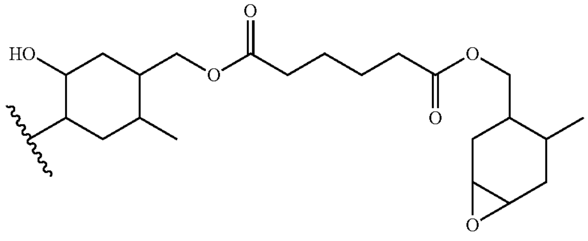

, wherein r is an integer from 1 to 25, s is an integer from 1 to 10 and t is an integer from 1 to 10;

$R^{11}$ is selected from $R^8$ and optionally $R^{12c}$; and $R^{12}$ is selected from the group consisting of $R^{12a}$, $R^{12b}$ and $R^{12c}$, wherein $R^{12a}$ is selected from the group consisting of linear or branched, substituted or non-substituted $C_{1-18}$ alkyl and $C_{2-18}$ alkenyl;

$R^{12c}$ is selected from the group consisting of amino acids and oligo- or poly-peptides up to a molecular weight of 2000 g/mol; optionally oligo- and poly-peptides made of naturally occurring amino acids up to a molecular weight of 2000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids, optionally epoxidized castor oil, soybean oil, sunflower oil, optionally ring opened epoxidized fatty acid based polyols, optionally natural oil based polyols (NOPs), optionally castor oil, soybean oil, or sunflower oil triglycerides.

In another embodiment, the polymeric liquid hyperbranched polysiloxane material according to the present invention is one, wherein $R^1$ is selected from the group consisting of methyl, ethyl, propyl, optionally methyl and ethyl;

$R^{5N}$ is selected from the group consisting of methyl, ethyl, n-propyl, isopropyl, n-butyl, t-butyl, linear, branched or cyclic $C_{5-16}$ alkyl residues, optionally linear or branched hexyl, octyl, dodecyl, and hexadecyl;

L is an aliphatic linker selected from the group consisting of $-CH_2-$, $-CH_2CH_2-$, $-CH_2CH_2CH_2-$, and $-C_6H_4-$;

$Z^1$ is a moiety selected from the group consisting of —SH,

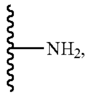

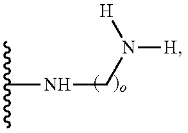

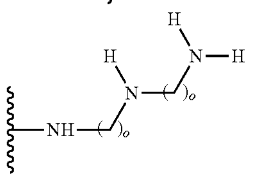

and

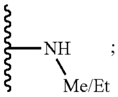

;

$Z^2$ is a moiety selected from the group consisting of

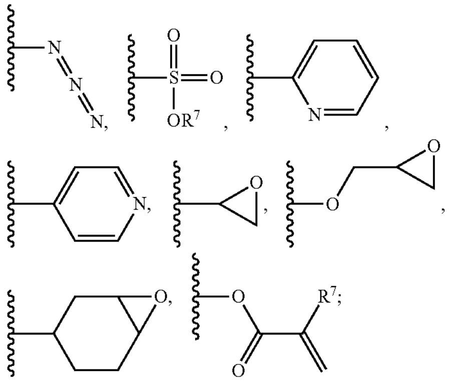

wherein $R^7$ is independently selected from the group consisting of methyl, ethyl;

$Z^3$ is selected from vinyl, phenyl;

$R^8$ is selected from the group consisting of —Cl, —Br, —I, —CN, —$N_3$;

$R^9$ is selected from the group consisting of —Cl, —CN, —COOH, —$COOR^{1'}$ and phenyl;

$Y^1$ is selected from the group consisting of

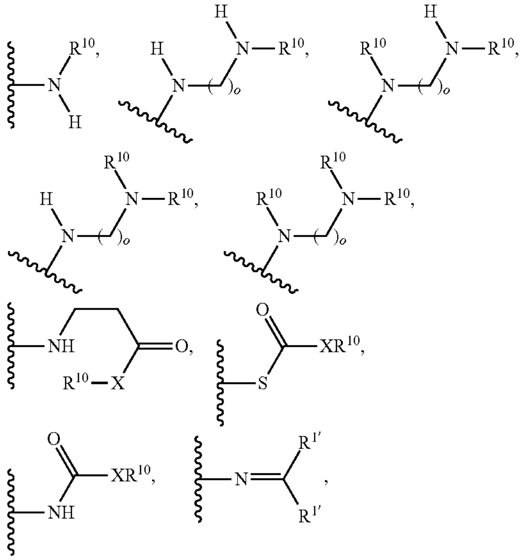

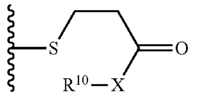

and

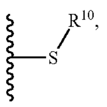

wherein o is an integer from 2 to 3;

$Y^2$ is a moiety selected from the group consisting of

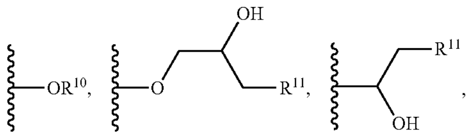

-continued

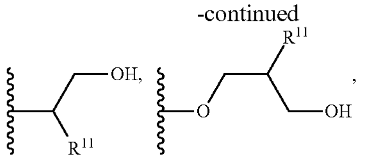

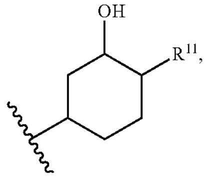

and

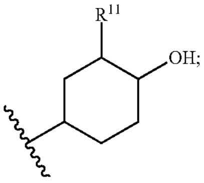

$Y^3$ is a moiety selected from the group consisting of

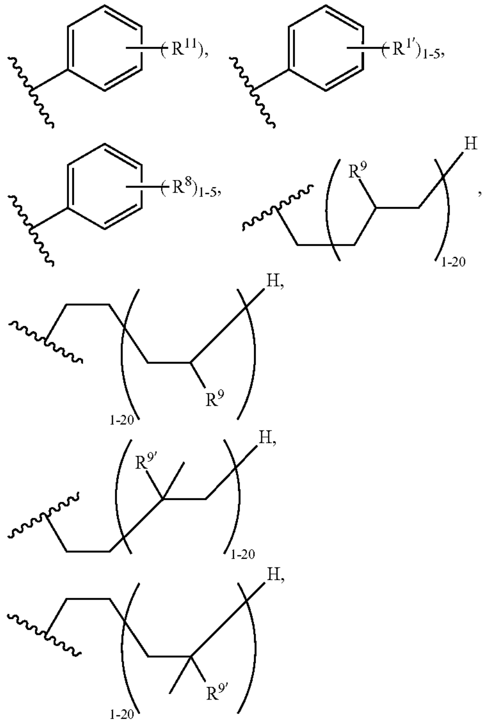

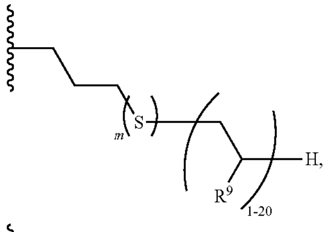

and

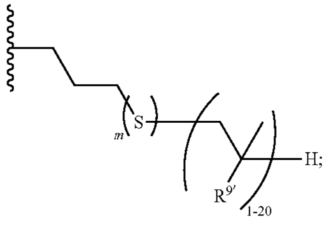

wherein

X is absent, —(NH)— or —O—;

$R^{10}$ is selected from the group consisting of $R^{10a}$, $R^{10b}$, $R^{10c}$, and $R^{10d}$;

$R^{10a}$ is selected from the group consisting of
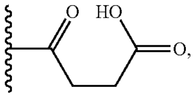
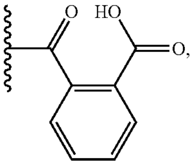
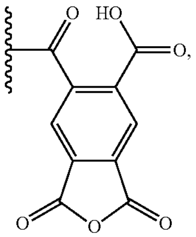
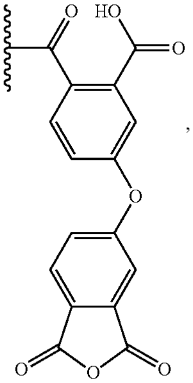
, and
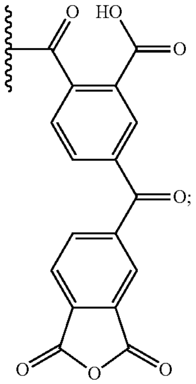
$R^{10b}$ is selected from the group consisting of
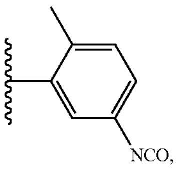
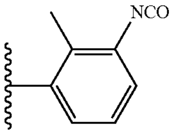
,
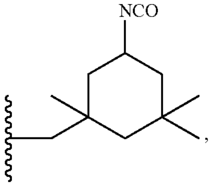
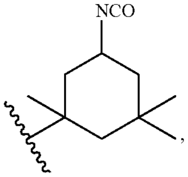
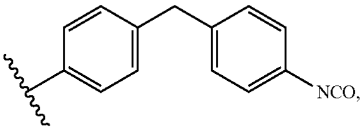
and
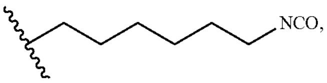
and X is N;
$R^{10c}$ is selected from the group consisting of
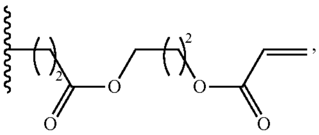
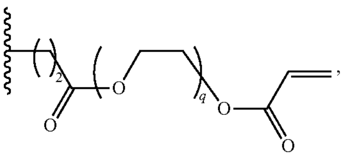
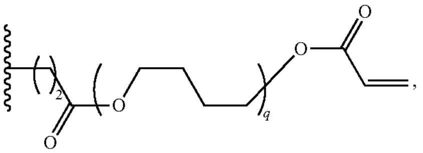
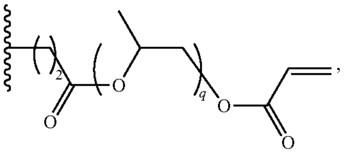
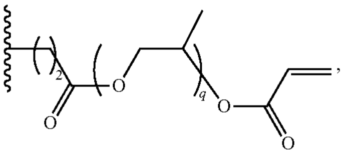
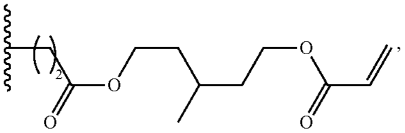
wherein q is an integer from 1 to 6,
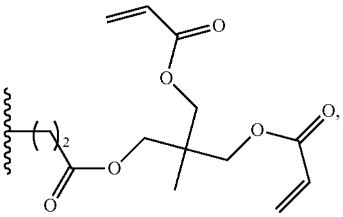
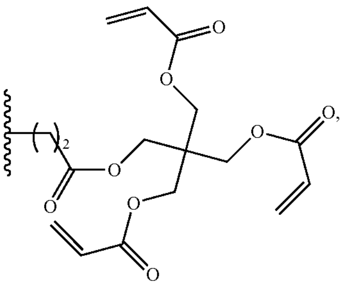

-continued
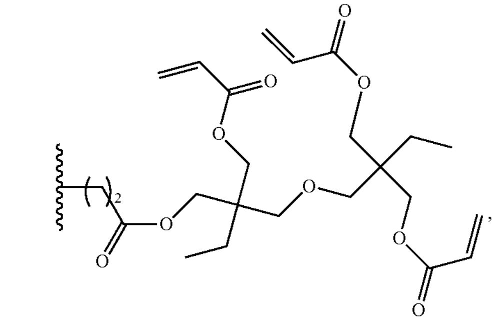
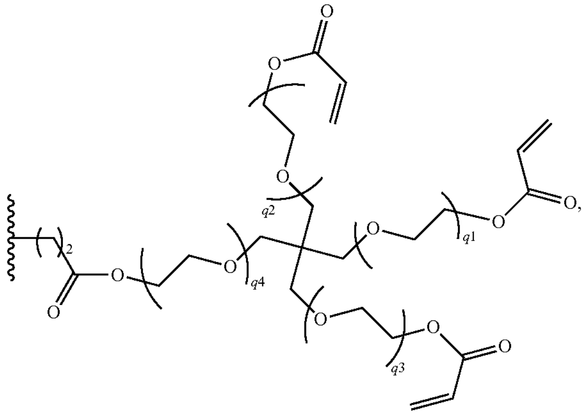
-continued
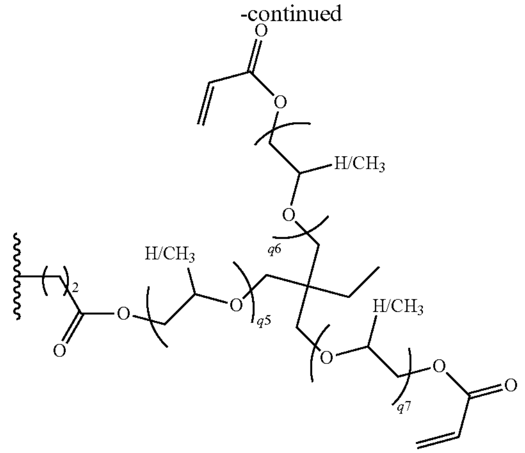
and
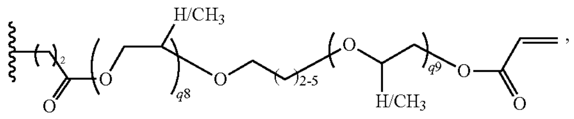
wherein each of q1 to q4 are integers from 0 to 8 and the sum of (q1+q2+q3+q4) is from 4 to 8, wherein each of q5 to q7 are integers from 0 to 8 and the sum of (q5+q6+q7) is from 3 to 12, wherein each of q8 and q9 are integers from 0 to 4 and the sum of (q8+q9) is from 2 to 4;
$R^{10d}$ is selected from the group consisting of
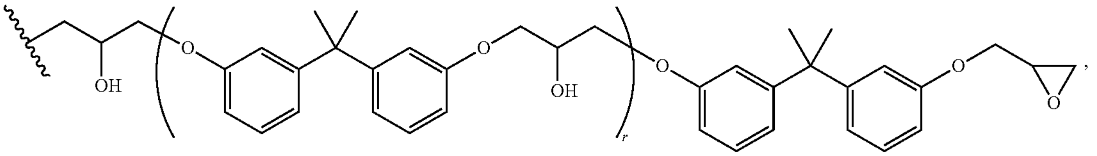
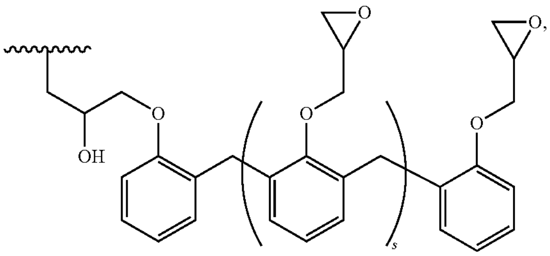
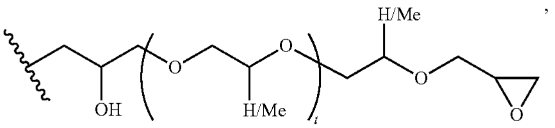
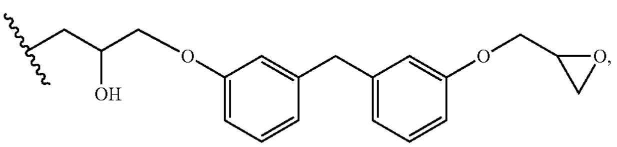
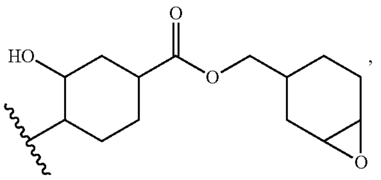
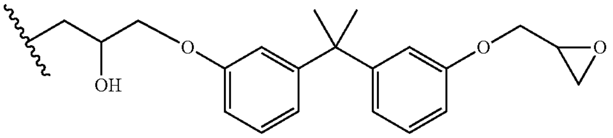
and -continued

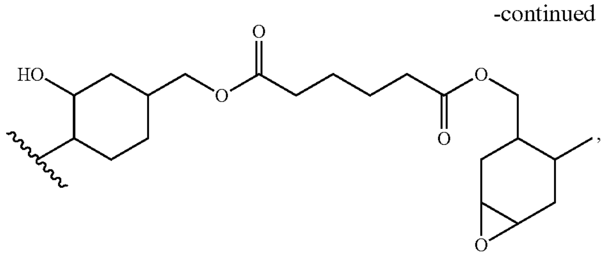

wherein r is an integer from 1 to 20, s is an integer from 1 to 8 and t is an integer from 1 to 10;

$R^{11}$ is selected from $R^8$ and optionally $R^{12c}$; and $R^{12c}$ is selected from the group consisting of amino acids and oligo- or poly-peptides up to a molecular weight of 1000 g/mol; optionally oligo- and poly-peptides made of naturally occurring amino acids up to a molecular weight of 1000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids, optionally epoxidized castor oil, soybean oil, sunflower oil, optionally ring opened epoxidized fatty acid based polyols, optionally natural oil based polyols (NOPs), optionally castor oil, soybean oil, or sunflower oil triglycerides.

In a further embodiment, the polymeric liquid hyperbranched polysiloxane material of the present invention is one, wherein the material comprises (v) at least two non-identically $R^5$-substituted mono-organofunctional T-type alkoxy-terminated siloxane populations, each population making up at least 3 mol-% of all mono-organofunctional T-type moieties in the material; and/or (vi) chiral mono-organofunctional $T^1$-type moieties in an amount of at least 3 mol-% relative to all mono-organofunctional T-type moieties in the material.

The term "population", as used herein, refers to a collection of moieties or a given organofunctional T-Type or D-type or, optionally M-Type moiety in the polymeric material. As an example, grafting or heterocondensation of two dissimilar T-type trialkoxysilanes such as vinyltrimethoxysilane and methyltriethoxysilane as two randomly chosen examples onto a Q-type polysiloxane precursor leads to two distinct populations ($T^0$=unreacted monomer), $T^1$, $T^2$ and $T^3$ bearing -methyl and -vinyl as organofunctional $R^5$ substituents, respectively, which can be resolved in a $^{29}$Si-NMR spectrum because of the $R^5$ substituent effect on the respective T-type central Si atom.

The at least two non-identically $R^5$-substituted mono-organofunctional T-type alkoxy-terminated siloxane populations described herein encompass any combination of $R^{5N}$, $R^{5U}$ and $R^{5S}$ for $R^5$, optionally with the condition that at least 1 mol-%, optionally at least 3 mol-%, optionally at least 5 mol-% optionally at least 7 mol-% of the sum of all $R^{5U}$ and $R^{5S}$ moieties in the polymeric liquid hyperbranched polysiloxane material are $R^{5S}$ moieties and optionally with the further condition that one of the conditions noted on the $DP_{Q\text{-}type}$ is met.

The first condition (v) shall be understood in the sense that the material comprises at least two populations of mono-organofunctional (T-type) alkoxy terminated siloxane moieties ($T^1$, $T^2$, $T^3$) which differ by their organofunctional substituent $R^5$. This means that the material features at least two different $R^5$ functionalities and that the minority species is present in a detectable amount (e.g. by $^{29}$Si-NMR).

The second condition (vi) is met by a $T^1$-type grafted siloxane moiety having four different substituents on its silicon atom, namely one Si—O—Si bond, one Si—C bond linking to the $R^5$ organofunctional group, and two different alkoxy substituents $R^1$, e.g. one ethoxy and one methoxy. This occurs already when only one population of $R^5$-functionalized T-type species is present in the material. Generally, non-identical $R^1$ alkoxy-groups can ligand-exchange among and T-type moieties.

In another embodiment, the polymeric liquid hyperbranched polysiloxane material according to the present invention is one, wherein (vii) the degree of polymerization of the Q-type alkoxy-terminated moieties $DP_{Q\text{-}type}$ is in the range of 1.6 to 2.4 and the atomic ratio of T- to 0-species in the material is in the range of 0.02:1 to 0.4:1 in all other cases than those defined above;

(viii) if the material comprises about or more than 5 mol-% M-type moieties, the degree of polymerization of the Q-type alkoxy-terminated moieties $DP_{Q\text{-}type}$ is in the range of 1.7 to 2.5 and the atomic ratio of T- to 0-species in the material is in the range of 0.02:1 to 0.4:1;

(ix) the degree of polymerization of the D-type alkoxy-terminated siloxane moieties $DP_{D\text{-}type}$ is in the range of 1.25 to 1.75; and/or (x) the degree of polymerization of the T-type alkoxy-terminated siloxane moieties $DP_{T\text{-}type}$ is in the range of 1.3 to 2.2.

The degree of polymerization DP for any non-crystalline silicon oxide material (for the polysiloxane material and for the corresponding methods and uses described herein) is defined here as the ratio of bridging oxygens BO (# of Si—O—Si bonds) to the total number of metal atoms $Si_{tot}$ in the system.

The term "alkoxy-terminated" for the Q-, T- and D-type siloxane moieties is understood to refer to the residual substituents of said moieties which are essentially alkoxy groups, because the polymeric liquid material is derived from alkoxy (ethoxy/methoxy) containing silane precursors in monomeric or oligomeric form. This implies that for a $Q^0$ monomer and $Q^1$, $Q^2$, $Q^3$ and $Q^4$ moiety, said "alkoxy termination" is comprised of 4, 3, 2, 1 and 0 alkoxy groups, respectively, and for a $T^0$ monomer and $T^1$, $T^2$ and $T^3$ moiety, said "alkoxy termination" is comprised of 3, 2, 1 and 0 alkoxy groups, respectively. Analogously, for a $D^0$ monomer and $D^1$ and $D^2$ moiety, said "alkoxy termination" is comprised of 2, 1 and 0 alkoxy groups, respectively.

$DP_{Q\text{-}type}$, $DP_{T\text{-}type}$ and $DP_{D\text{-}type}$ of the material can be directly obtained from quantitative $^{29}$Si-NMR data according to:

$$DP_{Q\text{-}type}=\Sigma(n\ A_{Qn})/\Sigma(A_{Qn})=(A_{Q1}+2A_{Q2}+3A_{Q3}+4A_{Q4})/(A_{Q0}+A_{Q1}+A_{Q2}+A_{Q3}+A_{Q4});$$

$$DP_{T\text{-}type}=\Sigma(n\ A_{Tn})/\Sigma(A_{Tn})=(A_{T1}+2A_{T2}+3A_{T3})/(A_{T0}+A_{T1}+A_{T2}+A_{T3})$$ for general $T$-type silanes;

$$DP_{T\text{-}type,bipodal\ silanes}=2\cdot\Sigma(n\ A_{Tn})/\Sigma(A_{Tn})=2(A_{T1}+2A_{T2}+3A_{T3})/(A_{T0}+A_{T1}+A_{T2}+A_{T3})$$ for bipodal $T$-type silanes; and $$DP_{D\text{-}type}=\Sigma(n\ A_{Dn})/\Sigma(A_{Dn})=(A_{D1}+2A_{D2})/(A_{D0}+A_{D1}+A_{D2})$$

In the above equation for $DP_{Q\text{-}type}$, the terms $A_{Qn}$ denote the quantitative $^{29}$Si-NMR peak area related to that $Q^n$ moiety (spectral signature), which is a Si atom coordinated by n siloxane bonds through bridging oxygen (BO) atoms, that connect it to its next-nearest-neighbor Si atoms and (4-n) non-bridging oxygen (NBO) atoms which are linked to terminal alkoxy groups Si—OR as defined herein. Analogously, $A_{Tn}$ and $A_{Dn}$ denote the $^{29}$Si-NMR peak areas corresponding to the respective T-type and D-type moieties (spectral signatures).

For the above definition of DP, $Q^2$ and $Q^3$ refer to all types of $Q^2$ and $Q^3$ species, including linear and single ring as well as double ring species.

Regarding the equation for $DP_{T\text{-}type}$ it is necessary to differentiate between the class of bipodal T-type silanes and all the other, "general" T-type silanes. The latter constitute the majority of commercially available T-type silanes and comprise only a single Si atom connected to three alkoxy and one organofunctional group. In contrast, bipodal silanes, which can be represented as $(RO)_3Si—(CH_2)—X—(CH_2)—Si(OR)_3$ contain a further trialkoxysilyl unit attached to the first one through a suitable linker group "X" and each spaced by at least one methylene ($—CH_2—$) group. The introduction of a modified definition for the degree of polymerization of bipodal silanes takes into account that a single connectivity to the polysiloxane network is sufficient to covalently attach the functional group and develop its targeted interface functionality. For example, simultaneous grafting through both trimethoxysilyl residues of a bipodal silane is counterproductive in a sense that it quickly leads to branching and attachment from one macromolecule to another, leading to unwanted gelation even at low surface coverage of dipodal T-type silanes. Hence it makes more sense to reference $DP_{T\text{-}type,\ bipodal\ silanes}$ in terms of single trialkoxysilyl-attachment modality, leading to the definition given above.

For organofunctional T type tri- and D-type di-alkoxysilanes, the $^{29}$Si spectral fingerprint regions are shifted progressively further downfield allowing a clear separation of the different non-organofunctional $Q^n$ from organofunctional $T^m$ and $D^l$ moieties.

Optionally, the total silicon to free hydrolysable alkoxy molar ratio in the material described herein is in the range of 1:1.0 to 1:3.0, optionally 1:1.2 to 1:2.5, optionally 1:1.3 to 1:2.2 if the total content of di-organofunctional D-type siloxane moieties (iii) in the polysiloxane material does not exceed 10 mol-%.

Optionally, the molar number of ethoxy terminating units ($—OCH_2CH_3$) in the material described herein is at least twice the number of methoxy terminating units ($—OCH_3$) and the material is essentially free of propoxy terminating units ($—OCH_2CH_2CH_3$), e.g. less than 3% of all alkoxy terminating units are propoxy terminating units.

Optionally, the molar number of methoxy terminating units ($—OCH_3$) in the material described herein is at least twice the number of ethoxy terminating units ($—OCH_2CH_3$) and the material is essentially free of propoxy terminating units ($—OCH_2CH_2CH_3$), e.g. less than 3% of all alkoxy terminating units are propoxy terminating units.

For any polymeric liquid material described herein, there exist different modes of interconnections, namely i) siloxane bonds with two Q-type partners (Q-Q homocondensation), ii) siloxane bonds with two T-type partners (T-T homocondensation), iii) siloxane bonds with two D-type partners (D-D homocondensation), and iii) Siloxane bonds with non-identical partners (Q-T, Q-D, T-D, Q-M, T-M, D-M heterocondensation).

The concept of heterocondensation applies to bonding states of both, statistical mixtures in core-only as well as in core-shell materials, respectively, and is exemplified in the equation below for Q-T-type siloxane bonding:

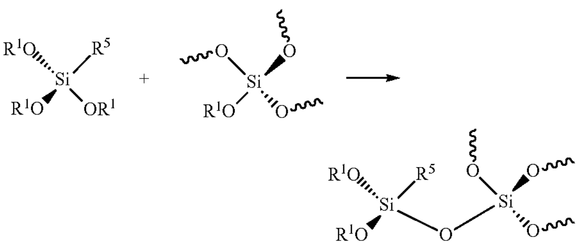

In the above example of a Q-T heterocondensation, the organofunctional trialkoxysilane is converted from $T^0$ to $T^1$ while the Q-type alkoxysilane on the left-hand side of the reaction (symbolized by the three wavy siloxane bonds) from $Q^3$ to $Q^4$, illustrating that each siloxane bond formed simultaneously increases $DP_{Q\text{-}type}$ and $DP_{T\text{-}type}$. There are obviously all sorts of other combinations of possible grafting reactions e.g. a $T^2$ species grafting onto a $Q^2$ yielding $T^3$ and $Q^3$, respectively, or $T^1$ species grafting onto a $Q^2$ yielding $T^2$ and $Q^3$ and similar combinations involving D-Type dialkoxysiloxane moieties.

$DP_{Q\text{-}type}$, $DP_{T\text{-}type}$ and $DP_{D\text{-}type}$ are the primary parameters that define the polymeric liquid material described herein, together with the atomic ratio of T-type to Q-type and, optionally, the total molar content of D-type species in the material. These parameters can all be determined from quantitative $^{29}$Si-NMR spectroscopy data with the special provisions given above for the calculation of $DP_{T\text{-}type}$ for bipodal silanes.

For materials comprising more than one T-type subgroup with non-identical $R^5$ organofunctional substituents, the quantification of those two T-type chemical species within the material can be done either directly from quantitative analysis of $^{29}$Si-NMR spectra, if the T-type moieties belonging to the two non-identical $R^5$ subgroups within the T-spectral window can be sufficiently resolved. Alternatively, e.g. when both methoxy/ethoxy $R^1$ groups are present in the material, non-identical $R^5$ bearing T-type subgroups can be analyzed independently by means of $^1$H- or $^{13}$C-NMR data, e.g. with fewer resolution restrictions compared to $^{29}$Si-NMR data.

Generally, parameters that define the polymeric liquid material described herein can be measured using standard analytical tools: The content of hydroxy groups in the material can be determined, e.g., using $^{29}$Si- and/or $^1$H-NMR spectroscopy and Karl Fischer titration. The molar ratio of ethoxy and methoxy terminal alkoxy units in the material are directly accessible from $^{13}$C-NMR and independently from $^{29}$Si-NMR data. The characterization of the reaction products in terms of viscosity is readily analyzed by means of standardized viscosity measurements such as a cylindrical rotation viscometer according to, e.g., ASTM E2975-15: "Standard Test Method for Calibration of Concentric Cylinder Rotational Viscometers". Other viscosity test methods are also possible such as, e.g., Staudinger-type capillary viscometers or modern, dynamic viscometry methods. The sample preparation is generally relevant in determining the true viscosity of the polymeric liquid material as already low percentage amounts of monomers and/or solvent residues significantly impact the measured values. For this purpose, a viscosity measurement is typically done on a polymeric sample material, i.e. a material essentially consisting of a polymeric material, which has previously been purified. Purification can be done, e.g. by means of a thin film evaporator setup at, e.g. 150° C., with a vacuum, e.g. $<10^{-1}$ mbar, which separates monomers and low molecular oligomers from the polymeric liquid material itself (see Macromolecules 2006, 39, 5, 1701-1708).

To determine, if a material is itself or comprises a polymeric liquid material as described herein, the following exemplary method of analysis can be used. First a sample of a material to be tested is subjected to a thin film evaporator purification step at 150° C. at $10^{-1}$ mbar vacuum level until the amount of low molecular volatiles no longer changes by more than 1%. The resulting purified material is then analyzed by means of $^{29}Si$ NMR spectroscopy. The corresponding $DP_{Qtype}$ and $DP_{Ttype}$ values are then calculated from the measured spectra as well as the Q:T atomic ratio and used to determine if they fall within the range specified herein. If this is the case the material at least comprises such a polymeric liquid material. Analysis of the native sample prior to the thin film evaporator purification step can then be taken and analyzed side by side. If the difference in measured $DP_{Qtype}$ values between original and purified samples is less than 5%, for the sake of this rapid test, the original sample itself shall qualify as a polymeric liquid material as described herein.

In a further embodiment, the polymeric liquid hyperbranched polysiloxane material according to the present invention is one, wherein the total content of di-organofunctional D-type siloxane and/or the total content tri-organofunctional M-type siloxane moieties is zero.

Optionally, the polymeric liquid hyperbranched polysiloxane material according to the present invention is one, wherein the mono-organofunctional T-type siloxane moieties comprise (xi) a first population of mono-organofunctional T-type alkoxy-terminated siloxane moieties, wherein $R^5$ is $R^{5N}$, and either (xii) a second population of mono-organofunctional T-type alkoxy-terminated siloxane moieties, wherein $R^5$ is $R^{5N}$, wherein the $R^5$ groups of the first and second populations are not identical, (xiii) mono-organofunctional T-type alkoxy-terminated siloxane moieties, wherein $R^5$ is $R^{5U}$, or (xiv) mono-organofunctional T-type alkoxy-terminated siloxane moieties, wherein $R^5$ is $R^{5S}$.

The above option is directed to a tailorable hydrophobic material for the combination of (x) and (xi) and a mixed hydrophobic/functional material for the combination of (x) and (xii).

For example by combining (x) and (xi), a polymeric liquid material can be created by using multiple hydrophobic $R^5$-organofunctional T-type moieties, which allows to control steric accessibility and hydrophobic properties of the material and thus its solubility and compatibility with polymers, solvents, inorganic and hybrid phases alike. This allows, e.g., tailoring of the polymeric liquid material to virtually any application specific formulation with a degree of freedom not attainable by today's commercial silane monomer and prehydrolysate systems.

For example, the combination of (x) and (xii) or (xiii), the combination of $R^5$ moieties bearing both hydrophobic properties and specific functionalities (see feature (xii)) then allows tailoring of the overall compatibility with an application-specific matrix while also introducing further chemical connectivity options. For example, a material exhibiting both hydrophobic $R^5$ selected from feature (x) while simultaneously bearing radical polymerizable groups such as methacrylate groups (selected from feature (xii)) could then control its interaction/compatibility through the hydrophobic component and its radical crosslinking reactivity essentially independently through the loading of said methacrylate component. The division of application-relevant system compatibility by selecting of a first type and loading of hydrophobic $R^5$ functionality and the selection of a second $R^5$ group to introduce a specific chemical function is expected to greatly improve performance and cost effectiveness of silane and siloxane technology. The advantage of this approach seems to further benefit from a core-shell type architecture, while different combinations are possible and could individually be selected depending on the application:

$R^5$ being as defined in feature (xii) within the core with a hydrophobic T-type siloxane (feature x) forming a shell, thus combining system compatibility with the ability to incorporate specific functions in the core. The Extension of such functionality options through $R^5$-substitution further extends the range of functionality considerably.

Hydrophobic (feature (x)) and functional (feature (xii)) $R^5$ moieties both present in a shell, creating an interplay between hydrophobic/matrix compatibility tailoring and functional group density and activity.

Hydrophobic (feature (x)) moieties distributed inside the core and functional (feature (xii)) moieties in the shell.

Additional combinations involving $R^{5S}$ (feature (xiii)).

For example, an advantage of the polymeric liquid materials according to the present invention is the fact that they are essentially free of silanol species (Si—OH). Specifically, their molar content with respect to the total number of Si atoms present in the material is less than about 5, 2.5, 2, 1.5, 1 or 0.5%, optionally less than about 0.2%. This provides, e.g., greatly improved stability and shelf life over conventional sol-gel (e.g. hydrolytically prepared) based hybrid materials and substantially more structural control. In practical applications, they can be used "as is" in non-polar organic solvents, blends etc. or directly incorporated into hydrophobic matrices such as polymer melts.

In a further embodiment, the polymeric liquid hyperbranched polysiloxane material according to the present invention is one, wherein if at least 5 mol-% of the $R^5$ residues of the material are $-L-Z^1$ and/or $L-Y^1$, excluding —SH,

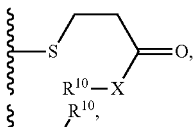 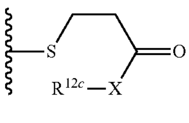 and

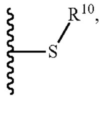

then the polysiloxane material comprises less than 750, 500 or 300 mol-ppm of a rearrangement catalyst;

- the polysiloxane material comprises 0 to 1500 mol-ppm of a rearrangement catalyst based on the total molar silicon content present in the material; and/or
- at least 1 mol-%, optionally at least 3 mol-%, optionally at least 5 mol-% optionally at least 7 mol-% of the sum of all $R^{5U}$ and $R^{5S}$ moieties in the material are $R^{5S}$ moieties.

The term “mol-ppm” as used herein stands for a content of one millionth of the total molar amount of silicon (Si) in a material (given by the sum of all Q, T, D, M type moieties and monomers).

In another aspect, the present invention is directed to a hydrolysis product obtainable by reacting at least one polymeric liquid material described herein with a predetermined amount of water or with a predetermined amount of a water-solvent mixture, optionally in the presence of at least one surfactant.

The predetermined amount of water or water-solvent mixture for hydrolysis or for emulsifying is determined, e.g. by the molar amount of water to total molar amount of Si in the system confined in typical formulations by upper and lower bound limits. A lower bound value defining the water to total Si molar ratio can be 0.02:1, optionally 0.1:1 or 0.5:1. An upper bound value defining the water to total Si molar ratio can be 5'000:1, optionally 500:1 or 50:1. The amount of cosolvent can be chosen independently and technically without limitation imposed by the water to Si molar ratios.

For example, solvents for hydrolysis can be selected from the group consisting of water-soluble organic solvents such as low-molecular weight alcohols, ethers, carboxylic acids, e.g.:

- alcohols of formula $R_x$—OH with $R_x$ being selected from the group consisting of —$CH_3$, —$C_2H_5$, —$C_3H_7$, —$C_4H_9$, —$C_5H_{11}$, and —$C_6H_{13}$;
- ketones of formula $R_x$, $R_y$—(C═O) with $R_x$, $R_y$ independently selected from the group consisting of —$CH_3$, —$C_2H_5$, and —$C_3H_7$;
- carboxylic acids of formula $R_x$—COOH with $R_x$ being selected from the group consisting of —$CH_3$, —$C_2H_5$, —$C_3H_7$, —$C_4H_9$, —$C_5H_{11}$, and —$C_6H_{13}$;
- low-molecular weight organic esters such as ethyl acetate, methyl acetate or ethyl formate, methyl formate; and/or
- ethers of formula $R_x$—O—$R_y$ with $R_x$, $R_y$ being independently selected from the group consisting of —$CH_3$, —$C_2H_5$, and —$C_3H_7$ or cyclic ethers such as tetrahydrofuran.

Together with the solvent, also an acid or a base can be used as a hydrolysis/condensation catalyst. Typical acids to be used are mineral inorganic acids and low-molecular organic carboxylic acids. Typical bases are alkali hydroxides, ammonia or aliphatic/aromatic primary, secondary or tertiary amines.

For example, surfactants for hydrolysis and/or emulsification can be selected from the group consisting of non-ionic surfactants such as polyethylene-oxide/polypropylene oxide block copolymers or similar polyether block copolymer surfactants;

- carboxylic acid based ionic surfactants, particularly fatty acids and related saturated or unsaturated linear and or branched aliphatic hydrocarbon-carboxylates such as lauric acid, stearic acid, oleic acid etc. and their corresponding alkali salts;
- sulfonic acid or phosphonic acid based ionic surfactants, particularly saturated or unsaturated linear and or branched aliphatic hydrocarbon-sulfonates such as dodecylsulfonic acid (SDS) and their corresponding alkali salts; and/or
- trialkylammonium salt based ionic surfactants such as cetyltrimethylammonium bromide (CTAB) or cetyltrimethylammonium chloride (CTAC).

In another aspect, the present invention is directed to an emulsion obtainable by emulsifying a polymeric liquid material as described herein with a predetermined amount of water, optionally in the presence of at least one surfactant.

In another aspect, the present invention is directed to a method for preparing a polymeric liquid material of the present invention, comprising the following steps:

- providing a polymeric liquid material as described herein, wherein at least 1 mol-%, optionally at least 3 mol-%, optionally at least 5 mol-%, optionally at least 10 mol-% optionally at least 20 mol-% of all $R^5$ moieties in the material are $R^{5U}$ moieties;
- functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to the sum of all $R^{5U}$ and $R^{5S}$ residues;
- retrieving, optionally isolating and optionally purifying the polymeric liquid material.

The term modifying or $R^{5S}$-functionalizing as used herein for obtaining $R^{5S}$ residues means that a chemical reaction is performed which is suitable for converting an $R^{5U}$ residue into an $R^{5S}$ residue. The suitable chemical reactions are known to the skilled person and are routinely chosen to obtain the desired $R^{5S}$ residue.

Suitable non-limiting chemical reactions are, for example, as listed below.

Michael additions, aza-Michael additions (e.g. amine or thiol with acrylates, alkenes, alkynes, carbonyl isocyanates, or unsaturated carbonyls); reactions with anhydrides (e.g. amine with maleic anhydride); reactions with acid chlorides (e.g. amine with a suitable —C(═O)Cl moiety); epoxide ring opening (e.g. with amines, thiols, CN—, or halogens); imine formation (primary amine with ketone); thiol substitution with a halogenoalkane; various nucleophilic substitutions (e.g. $S_N2$) on halogenoalkanes; elimination on a halogenoalkane to form a double bond; reaction of a halogenoalkane with sodium azide to form an alkyl azide, optionally followed by the reaction of the alkyl azide, e.g. in a click-chemistry reaction (azide-alkyne cycloaddition) or through conversion to an isocyanate; various functionalization reactions with di- and trisisocyanates; reaction of alkenes, such as a “thiol-ene” reaction with thiols, electrophilic addition of a halogen onto an alkene, e.g. vinyl, followed by elimination to the alkyne; tetrasulfide- or thiol or unsaturated compounds (e.g. vinyl, methacrylate) reactions with unsaturated aromatic or unsaturated aliphatic compounds in the presence of a radical source (e.g. radical initiator), organic and inorganic peroxides or in the presence of aliphatic or aromatic, linear or cyclic epoxides; Friedel-Crafts-alkylation or -acylation on aromatic rings, e.g. phenyl rings; or peptide bond formation through amine or carboxylic groups.

The skilled person know which type of reactions and/or reaction conditions are compatible with the presence of (small amounts) water and/or silanol groups. The skilled person will choose a suitable protocol for carrying out the individual synthesis steps in order to minimized undesired side reactions with water and/or silanol groups. $R^{5S}$-Functionalization reactions that are not compatible with the presence of water and/or silanol groups and must be carried out in their presence are optionally excluded from the scope of the present invention. A preferred protocol for $R^{5S}$-functionalization reactions that are sensitive to water and/or silanol groups includes to first carry out the functionalization on a $T^0$ monomer followed by grafting of the $T^0$ monomer onto the siloxane core, thus circumventing reactions in the presence of water and/or silanol groups by temporal separation of the $R^{5S}$-functionalization.

The polymeric liquid polysiloxane material prepared by the method described herein is optionally $R^{5S}$-functionalized, e.g. at least 1 mol-%, optionally at least 3 mol-%, optionally at least 5 mol-% optionally at least 7 mol-% of the sum of all $R^{5U}$ and $R^{5S}$ moieties in the material are $R^{5S}$ moieties, wherein $R^{5S}$ is considered a $R^{5S}$-functionalized moiety. The starting material for the method may be non-$R^{5S}$-functionalized (essentially 100 mol-% of the sum of all $R^{5U}$ and $R^{5S}$ moieties in the material are $R^{5U}$ moieties) or partly $R^{5S}$-functionalized (at least 3 mol-% of the sum of all $R^{5U}$ and $R^{5S}$ moieties in the material are $R^{5S}$ moieties). $R^{5S}$-Functionalization of the starting material may be done by functionalizing $R^{5U}$ of grafted T-type siloxane moieties or optionally by grafting further, pre-$R^{5S}$-functionalized T-type silanes comprising $R^{5S}$ moieties in mono- or oligomeric form. The $R^{5S}$-functionalization of $R^{5U}$ moieties can be done by known chemical methods. Retrieving, optionally isolating and optionally purifying the polymeric liquid material can be done as outlined in the context of step (g) of the method below.

In another aspect, the present invention is directed to a method for preparing a polymeric liquid material as described herein, comprising the following steps:

(a) providing a Q-type polymethoxy, polyethoxy, polypropoxy or mixed poly(methoxy/ethoxy/propoxy) polysiloxane precursor,
  optionally comprising
    (a1) di-organofunctional D-type siloxane moieties; and/or
    (a2) mono-organofunctional T-type siloxane moieties, wherein $R^5$ is selected from $R^{5N}$, $R^{5U}$ and $R^{5S}$;
    optionally comprising less than 12 mol-% of (a1) and (a2) combined relative to the total amount of all Q-type species;
  optionally further comprising a rearrangement catalyst and/or tri-organofunctional M-type siloxane moieties;
  wherein the precursor comprises at least 28, optionally at least 35, optionally at least 42 mol-% four-membered combined $Q^{2r}$-type and $Q^{3s,d}$-type siloxane ring species relative to the total Q-type siloxane species; and/or
  wherein the precursor comprises at least 60%, optionally at least 67%, optionally at least 75% four-membered combined $Q^{3s,3d}$-type siloxane ring species relative to all $Q^3$-type siloxane species; and
  wherein degree of polymerization of the Q-type polysiloxane $DP_{Q\text{-}type}$ is in the range of 1.5 to 2.5, optionally 1.6 to 2.4, optionally 1.65 to 2.35;
(b) adding at least one of a
  (b1) tri-organofunctional M-type silane $Si(OR^1)(Me)_3$; and/or
  (b2) di-organofunctional D-type silane $Si(OR^1)_2$ $(R^2)$ $(R^3)$; and/or
  (b3) mono-organofunctional T-type silane $Si(OR^1)_3$ $(R^5)$, wherein $R^5$ is selected from $R^{5N}$, $R^{5U}$ and $R^{5S}$;
  in mono- or oligomeric form to the polysiloxane of (a);
(c) optionally adding a rearrangement catalyst to the mixture of step (b);
(d) heating the mixture of (c), optionally in the absence of water;
(e) optionally repeating steps (b) to (d) at least once;
(f) optionally functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to the sum of all $R^{5U}$ and $R^{5S}$ residues;
(g) retrieving, optionally isolating and optionally purifying the polymeric liquid material; with the proviso that at least one of steps (a2) or (b3) is carried out, and with the proviso that a rearrangement catalyst is present in at least one of steps (a) or (c).

The Q-type polymethoxy, polyethoxy, polypropoxy or mixed poly(methoxy/ethoxy/propoxy) polysiloxane precursor of step (a) can be any, e.g. commercially available, Q-type polymethoxy, polyethoxy, polypropoxy or mixed poly(methoxy/ethoxy/propoxy) polysiloxane as long as it comprises the non-organofunctional $Q^1$- to $Q^4$-type siloxane moieties defined for the polysiloxane material herein, wherein at least 28, optionally at least 35, optionally at least 42 mol-% of all Q-type species are part of four-membered $Q^2$-type and $Q^3$-type siloxane ring species (including single and double rings), and/or wherein at least 60%, optionally at least 67%, optionally at least 75% of all $Q^3$-type species are part of four-membered $Q^{3s,3d}$-type siloxane rings, and as long as the degree of polymerization of the Q-type polysiloxane $DP_{Q\text{-}type}$ is in the range of 1.5 to 2.5, optionally 1.5 to 2.7, optionally 1.7 to 2.4. In the context of the present method, the four-membered $Q^3$-type siloxane ring species are those $Q^3$-type siloxane species which are part of one or two four-membered rings, respectively. The term "all Q-type species" in the context of the present method includes all $Q^1$ to $Q^4$ siloxane species as well as $Q^0$ silane monomer(s).

The Q-type polymethoxy, polyethoxy, polypropoxy or mixed poly(methoxy/ethoxy/propoxy) polysiloxane of step (a) constitutes the precursor material as described herein. If a core-shell architecture is targeted, typically a pure Q-type precursor material is used as the core. The $^{29}Si$ NMR spectrum of a typical and exemplary Q-type precursor material is shown in FIG. 3 (top), displaying substantial amounts of $Q^{2r}$ and $Q^{3s,d}$ tetrasiloxane ring species. Upon T-type monomer silane grafting, ring species are significantly reduced as also shown in FIG. 3 (bottom).

For example, the following Q-type polymethoxy, polyethoxy or mixed poly(methoxy/ethoxy) polysiloxane can be used in step (a): commercial oligomers of TEOS or TMOS, e.g. ethylsilicates with 40% by mass of total $SiO_2$ equivalent content such as Dynasylan (Evonik Industries), Wacker Silicate TES 40 WN (Wacker), TEOS-40 (Momentive) or simply "ethylsilicate-40" as referred to by many non-branded Asian suppliers. Also, oligomers with higher silicate content such as Dynasylan Silbond 50 or equivalent products with up to 50% equivalent $SiO_2$ solids content can be used. The same holds for TMOS oligomers such as "Tetramethoxysilane, oligomeric hydrolysate" (Gelest Inc.) or "MKC silicate" (Mitsubishi Chemicals) which exist in variations with up to 59% $SiO_2$ equivalent content can be used as a source for methylsilicates. Comparable propoxy-silicates, if available commercially, can also be used.

Alternatively, the Q-type polymethoxy, polyethoxy, polypropoxy or mixed poly(methoxy/ethoxy/propoxy) polysiloxane of step (a) can be synthesized according to known protocols in the art, including hydrolytic and non-hydrolytic methods, e.g. as described in the examples below, in WO 2019/234062 A1, EP1576035 B1, Macromolecules 2006, 39, 5, 1701-1708, Macromol. Chem. Phys. 2003, 204(7), 1014-1026, or Doklady Chem., Vol. 349, 1996, 190-19.

The definitions of chemical substituents in the tri-organofunctional M-type silane $Si(OR^1)(Me)_3$, the di-organofunctional D-type siloxane moieties $Si(OR^1)_2$ $(R^2)(R^3)$ and the mono-organofunctional T-type siloxane moieties $Si(OR^1)_3$ $(R^5)$ in the context of the present method correspond to the definitions given in the context of the polysiloxane material described herein.

The term "in mono- or oligomeric form", as used herein, means that the M-, D- and T-type silanes are not highly polymerized when used as a precursor, i.e. are either monomers or small oligomers of, e.g., common mixtures with less than ten monomer units in a typical oligomer.

The rearrangement catalyst for use in the present method can be any catalyst that accelerates the grafting of T-, D- and M-type monomers or oligomers by nucleophilic substitution leading to the polymeric liquid material described herein. Catalyst concentrations are generally in the range from 0.01 mol-% to 1.5 mol-% based on the total molar silicon content in the prepared material. The catalyst may be present in step (a) or (c), or both with the proviso that it is present in at least one of steps (a) or (c).

In a further embodiment, main group or transition metal salts or organometallic compounds or organic (e.g. aliphatic amine- or aminosilane-) or inorganic bases are used as rearrangement catalysts.

The rearrangement catalyst, as used herein can be positively identified for example by following the protocol of Example 4 below. Any catalyst that elicits at least 75% grafting of $T^0$ (less than 25% residual $T^0$ monomer) for the MTES model compound defined in the protocol of Example 4 is a rearrangement catalyst for use in the present invention.

The catalyst for use in the present method can be selected from a group of compounds with the sum formulae $M(II)L_1L_2$ for metal ions in the oxidation state +2 such as $Zn^{+2}$ or $Fe^{+2}$ $M(III)L_1L_2L_3$ or $O{=}M(III)L_1$ for metal ions in the oxidation state +3 such as $Ce^{+3}$ or $Fe^{+3}$ $M(IV)$ $L_1L_2L_3L_4$ or $O{=}M(IV)L_1L_2$ for metal ions in the oxidation state +4 such as $Ti^{+4}$ or $Hf^{+4}$ $M(V)L_1L_2L_3L_4L_5$ or $O{=}M(V)L_1L_2L_3$ for metal ions in the oxidation state +5 such as $V^{+5}$ or $Nb^{+5}$ wherein M(II, III, IV, IV) is a main group or transition metal ion in an oxidation state +2 to +5 and bonded by covalent, ionic or coordination bonds or a combination thereof to identical or non-identical coordinating counterions and/or ligands $L_1$ to $L_5$, where at least one of these ligands is selected from the group of halides (e.g. $F^-$, $Cl^-$, $Br^-$, $I^-$), pseudohalides (e.g. $SCN^-$, $N_3^-$, $CN^-$), chalcogenides, mineral acid counterions, organic carboxylates, organic alcoholates, acetylacetonates, organic sulfonic or phosphonic acid counterions, where preferably the main group or transition metal ion is selected from the group of elements Fe, Al, Sc, Y, Ti, Zr, Hf, V, Nb, Ta, Zn, Ce, Co, Fe and $M^n$ in their naturally occurring oxidation states.

"In the absence of water" as noted in step d) optionally does not apply to reactions, e.g. grafting and/or rearrangement reactions, with tri-organofunctional M-type silanes as defined in the present method. In the present method, the reaction step with tri-organofunctional M-type silanes may be performed in the presence of water, e.g. in the presence of an aqueous acid/co-solvent mixture (e.g. EtOH, water, ketones etc.) as commonly used in the art. Optionally the M-type silane grafting is temporally separated from D-Type and/or T-type grafting, either being carried out before or after.

In order to allow sufficiently fast kinetics to yield reasonable reaction times, the use of elevated temperature in conjunction with a catalyst are typically required at least in step (d), optionally in steps (b) to (e) as described herein.

Each reaction step may be carried out for, e.g. half an hour to several hours or several days, depending on the rearrangement catalyst type and concentration used. Alternatively, if a radiofrequency-assisted heating method is used, the reaction times may be shortened significantly.

All of steps (b) to (f) are optionally carried out under stirring. Optionally stirring is continued in steps d) and/or (f) for at least 30 minutes after the M-, D- or T-type silane was added.

For example, during step (d) and/or (f), the total degree of polymerization remains essentially constant if the reaction is carried out in the absence of water. As noted herein, the degree of polymerization always refers to the that of the siloxane material.

Optionally, in step (d) and/or (f), low-molecular reaction products and/or residual starting materials in the reaction mixture can be removed by vacuum distillation, e.g. through gradually lowering the pressure inside the reaction vessel and holding a final pressure in the range of, e.g. about 5 to 250 mbar for a period of time between, e.g. 2 and 60 minutes. Optionally, residual volatile organic compounds, solvent residues and/or low molecular starting products (VOC) can be further removed at any stage in the workup procedure by bubbling a purge gas through the preferably still warm or hot reaction mixture.

For example, each of steps (a) through (e) of the present method are carried out essentially in the absence of any chemical reagent and/or any chemical reagent other than the rearrangement catalyst for promoting the polymerization and/or grafting reaction. For example, all of steps (a) through (e) are carried out essentially in the absence of acetic anhydride, acetic acid or other anhydrides or alphatic or aromatic carboxylic acids or water optionally in the absence of chlorosilanes, chlorosiloxanes, acetoxysilanes or acetoxysiloxanes. "Essentially in the absence" means that there may be traces or catalytic amounts of the aforementioned substances present, however, "essentially in the absence" means that the amounts are not sufficient to promote a detectable or significant polymerization reaction by means of these substances.

Without wishing to be bound by theory, it is believed that the driving force for this substitution reaction (also called "grafting") in step (d) results at least to a significant extent from the ring strain of four-membered $Q^2$-type and/or $Q^3$-type siloxane ring species in the Q-type material of step (a). The release of ring tension in the Q-type precursor or core material is sufficient for efficiently adding, i.e. grafting, M-, D- and/or T-type silanes onto the Q-type core material without the need for further chemical reagents such as acetic anhydride. Optionally, also no rearrangement catalyst as defined herein is necessary if the reaction temperature and duration is adjusted accordingly. As can be seen in the examples below, the mol-% of ring species in the material of step (a) is significantly reduced in the product according to the present preparation method. As an example of a typical grafting reaction, FIG. 3 (bottom) shows the reaction product after rearrangement of a typical example using a polyethoxysiloxane Q-type precursor (FIG. 3 (top)) and MTES as a monomeric T-type precursor. By direct comparison with one notices that the grafted product features a significant reduction in both $Q^{2r}$ and also $Q^{3s}$, $Q^{3d}$ tetrasiloxane ring species as well as an increase in $Q^0$ monomer which most likely results from a partial Q-type depolymerisation. At the same time, the fraction of linear Q-type moieties ($Q^{2l}$ and $Q^{3l}$) has increased significantly. FIG. 4 shows the temporal decay of $Q^{2r}$ and $Q^{3s,d}$ tetrasiloxane species (expressed as $(Q^{2r}+Q^{3s,d})/Q_{tot}$ in %) over the course of a typical rearrangement grafting reaction.

The proviso that at least one of steps (a2) or (b3) is carried out means that at the product of the present method is a polymeric liquid polysiloxane material as described herein comprising mono-organofunctional T-type siloxane moieties as described herein, hence, the T-type silanes of formula $Si(OR^1)_3$ ($R^5$) must be added in monomeric or oligomeric form in at least one step of the present method. This is synonymous with saying that the product must contain T-type moieties.

When step (e) is optionally performed, the repetition of step (b) encompasses that the materials added during that or a further repetition step are not necessarily the same materials compared to the previously performed step. For example, if for the first performance of step (b3), $R^{5U}$ is chosen for $R^5$, then $R^{5U}$, $R^{5S}$, $R^{5N}$, or any combination thereof can be chosen for $R^5$ when repeating step (b3). The same applies to all other repeated steps, e.g. regarding whether M-, D- or T-type silanes are added and/or which type of $R^1$, $R^2$ and $R^3$ are chosen, as well what type and amount of catalyst are added during the repetition.

For the mono-organofunctional T-type siloxane moieties and silanes of step (a2) and (b3), $R^5$ is selected from $R^{5N}$, $R^{5U}$ and $R^{5S}$. This means that the T-type siloxane moieties/silanes may be non-$R^{5S}$-functionalized (essentially 100 mol-% of all $R^{5U}$ moieties of all T-type siloxane moieties/silanes in the material are $R^{5N}$ or $R^{5U}$ moieties), fully $R^{5S}$-functionalized (essentially 100 mol-% of the sum of all $R^{5U}$ and $R^{5S}$ moieties of all T-type siloxane moieties/silanes in the material are $R^{5S}$ moieties) or partly $R^{5S}$-functionalized (the T-type siloxane moieties/silanes comprise $R^{5S}$ together with $R^{5U}$ and/or $R^{5N}$ moieties in any possible ratio). Optionally, $R^5$ of the mono-organofunctional T-type siloxane moieties in step (a2) of the present method is $R^{5N}$ or $R^{5U}$.

Step (f) is optional to the extent that no functionalization of the $R^{5U}$ residues is mandatory if the T-type siloxane moieties and silanes of step (a2) and/or (b3) are chosen, for example and optionally such that in the product of the method at least 1 mol-%, optionally at least 3 mol-%, optionally at least 5 mol-% optionally at least 7 mol-% of the sum of all $R^{5U}$ and $R^{5S}$ moieties are $R^{5S}$ moieties in the absence of step (f). Of course, and for example, step (f) can be carried out even if the T-type siloxane moieties and silanes of step (a2) and/or (b3) already lead to a product wherein at least 1 mol-% of the sum of all $R^{5U}$ and $R^{5S}$ moieties in the material are $R^{5S}$, e.g. to increase the molar percentage of functionalized $R^5$ residues.

Optionally, step (f) can also be performed between steps (d) and (e) and the sequence of steps (e) and (f) are optionally interchangeable.

In a further embodiment, the method described herein is one, wherein in step (a), the $R^5$ of the T-type siloxane moiety is $R^{5N}$ and/or $R^{5U}$;

in step (b), the $R^5$ of the T-type silane is $R^{5N}$ and/or $R^{5U}$; and the method comprises the step (f) of functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to the sum of all $R^{5U}$ and $R^{5S}$ residues.

In another embodiment, the method described herein is one, wherein in step (a), the $R^5$ of the T-type siloxane moiety is $R^{5U}$;

in step (b), the $R^5$ of at least one T-type silane is $R^{5S}$; wherein in optional step (e) the $R^5$ of the T-type silane is selected from $R^{5U}$ and $R^{5S}$, and the method optionally does not comprise the step (f).

It is within the purview of the skilled person to routinely implement any permutations in the choice of starting materials and further functionalization reaction in the context of $R^5$ moieties.

The concept of the $R^{5S}$-functionalization protocol variability can be illustrated by NMR spectroscopic investigations where the reactants and products are first identified by $^1H$ and $^{13}C$ NMR spectroscopy. The degree of $R^{5S}$-functionalization can then be assessed by standard spectral interpretation/reaction monitoring as it is a standard process in preparative organic chemistry.

The product of the present method is retrieved in step (g) by collection of the material from the reaction vessel. The product may optionally be isolated and purified by standard methods known in the art, e.g. by distillation, optionally using a thin film evaporator, VOC removal by stripping with a purge gas etc.

In an embodiment, the method described herein further comprises before step (b) or after step (d) or (e), the method further comprises the step of adding a tri-organofunctional M-type silane or M-type siloxane and optionally a di-organofunctional D-type silane in mono- or oligomeric form as described in step (b2) in the presence of water, a suitable co-solvent and an acid catalyst, followed by heating the mixture, optionally to reflux. If the addition takes place before step (b), residual water, if any, and optionally alcohol or other cosolvents are removed before step (b) is initiated.

For example, solvents for adding a tri-organofunctional M-type silane and/or optionally a di-organofunctional D-type siloxane can be selected from the group consisting of ethanol, methanol, n-propanol, isopropanol, acetone, methyl-ethyl ketone, dimethyl ether, methyl-ethyl ether, diethyl ether.

For example, an acid catalyst can be selected from of strong acids with a negative pKa value, preferably selected from the group consisting of hydrochloric acid, nitric acid, sulfuric acid, hydrobromic or hydroiodic acid or organo-sulfonic acids (methane-, amido- or benzene-sulfonic acid).

In another embodiment, the reaction temperature for steps (c) through (e) of the method described herein is in the range from 30 to 170, optionally 50 to 150 or 70° C. to 120° C., and the pressure during steps (c) through (e) is in the range of 0.1 bar to 2 bar, optionally in the range of 0.5 bar to 1.4 bar or in the range of 0.6 bar to 1.2 bar.

The step of optionally functionalizing (f) is not necessarily performed at elevated temperatures, even if the step is performed before step (e). It is common general knowledge which reaction temperatures are necessary for which type of $R^{5S}$-functionalization reaction in step (f).

In a further embodiment, the rearrangement catalyst for use in the present method is selected from the group consisting of $Ti(IV)(OR^{13})_4$ and $Zr(IV)(OR^{13})_4$;

$Ti(IV)X_4$ and $Zr(IV)X_4$;

$O{=}Ti(IV)X_2$ and $O{=}Zr(IV)X_2$);

$Ti(IV)X_2(OR^{13})_2$ and $Zr(IV)X_2(OR^{13})_2$;

$Ti(IV)X_2$ $(OAcAc)_2$ and $Zr(IV)X_2$ $(OAcAc)_2$;

$Ti(IV)(OSi(CH_3)_3)_4$ and $Zr(IV)(OSi(CH_3)_3)_4$;

$(R^{13}O)_2Ti(IV)(OAcAc)_2$ and $(R^{13}O)_2Zr(IV)(OAcAc)_2$;

$O{=}Ti(IV)(OAcAc)_2$ and $O{=}Zr(IV)(OAcAc)_2$;

$Ti(IV)(OAc)_4$ and $Zr(IV)(OAc)_4$;

$Ti(IV)(OAc)_2(OR^{13})_2$ and $Zr(IV)(OAc)_2(OR^{13})_2$; and $O{=}Ti(IV)(OAc)_2$ and $O{=}Zr(IV)(OAc)_2$;

wherein $R^{13}$ is selected from the group consisting of $-CH_3$, $-CH_2CH_3$, $-CH(CH_3)_2$, $-CH_2CH_2CH_3$, $-C(CH_3)_3$, $-CH_2CH_2CH_2CH_3$ and $CH_2CH_2CH(CH_3)_2$ and wherein X is a halide, a pseudohalide, nitrate, chlorate or perchlorate anion, and wherein the catalyst amount in each of steps (a) or (c) is optionally between 0.01 and 5 mol-%, optionally between 0.05 or 0.1 to 3 mol-%, based on the total molar silicon content present in said step.

In another aspect, the present invention is directed to a product obtained or obtainable by any of the methods described herein.

In a further aspect, the present invention is directed to a use of a polymeric liquid material described herein, comprising at least one population of T-type siloxane moieties with $R^5$ as a radical polymerizable organofunctional residue selected from the group consisting of vinyl, methacrylate, butacrylate, acrylate,

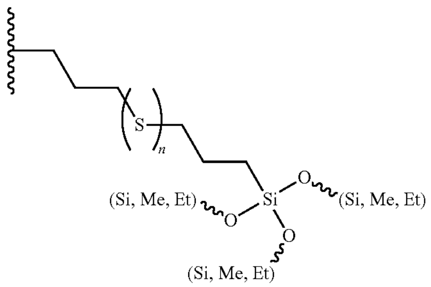

and

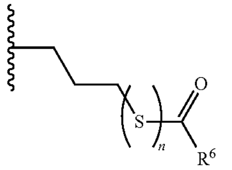

as a crosslinker within a formulation, with a content of the polymeric liquid material in the range of 0.2% to 25% by weight with respect to the formulation.

The term "formulation", as used herein, refers to any product comprising the polymeric liquid material described herein, e.g. as a crosslinker or as any other functional entity. The formulation may be a liquid, a paste or an emulsion or slurry. Such a formulation typically comprises, e.g., other compatible radical polymerizable monomers, oligomers or prepolymers or silane terminated polymeric building block moieties, fillers as well as performance or lifetime enhancing additives and stabilizers such as: UV and light stabilizers, antioxidants, rheology modifiers, tack modifiers, film forming additives, gloss additives, antistatics, nucleation agents etc. If thermally activatable, such a formulation will also typically contain, e.g., a radical starter molecule chosen to meet the designed curing onset temperature.

In a further aspect, the present invention is directed to a use of the polymeric liquid material, of the hydrolysis product or of the emulsion described herein containing at least one population of T-type alkoxy-terminated siloxane moieties with organofunctional groups selected from methyl, ethyl, vinyl, methacrylate, n-propyl, isopropyl, n-butyl, t-butyl, hexyl, octyl, dodecyl, hexadecyl, (3,3,3-trifluoro)propyl, (1H,1H, 2H,2H-perfluoro)octyl, (1H,1H, 2H, 2H-perfluoro)dodecyl and (1H,1H, 2H, 2H-perfluoro) hexadecyl for $R^5$, in a hydrophobic formulation, wherein the loading of the polymeric liquid, hydrolysis product or emulsion in the formulation is 0.5% to 25% by weight.

The following Figures and Examples serve to illustrate the invention and are not intended to limit the scope of the invention as described in the appended claims.

BRIEF DESCRIPTION OF THE DRAWINGS

In FIG. 1*a*, an exemplary Q-type precursor featuring ring species with 20 Silicon atoms and a $DP_{Qtype}$ value of 2.25 and 1.5 accessible alkoxy groups (circled) per Si atom onto which T-type silane moieties can be grafted is shown. In FIG. 1*b*, a Q-type polycondensate with 7 Silicon atoms and a $DP_{Qtype}$ value of 1.57 and 2.14 accessible alkoxy groups (circled) per Si atom onto which T-type silane moieties could be grafted is shown. This goes to illustrate that the surface to volume ratio for the structure in FIG. 1*b*, is much higher and sufficient functionalization would require a substantially higher T:Q molar ratio, hence it does not qualify as a direct precursor to prepare materials described herein. Furthermore, the dendritic "macromonomer aspect (number of graftable sites per molecule) is significantly smaller in the case shown in FIG. 1*b*.

In FIG. 2*a*, a grafted material comprising M, D and T moieties is shown with $R^{5U}$, $R^{5S}$ but no $R^{5N}$ functionality. In FIG. 2*b*, a grafted polymeric liquid material comprising only $R^{11}$-functionalized $R^{5S}$ glycidoxypropyl T-type moieties is shown and the $R^1$ residues are comprised of ethoxy and methoxy. In FIG. 2*c*, a grafted polymeric liquid material comprising two kinds of T-type is shown, namely $R^{10}$-functionalized $R^{5S}$ aminopropyl, as well as non-functionalizable $R^{5N}$ propyl moieties and the $R^1$ residues are comprised of ethoxy and methoxy. The representations are for illustration purposes only and do not represent any limitation in further T ($R^{5N}$, $R^{5S}$ and $R^{5U}$), D, M-Type grafting and functionalization combinations.

DETAILED DESCRIPTION

EXAMPLES

Figure 1A:
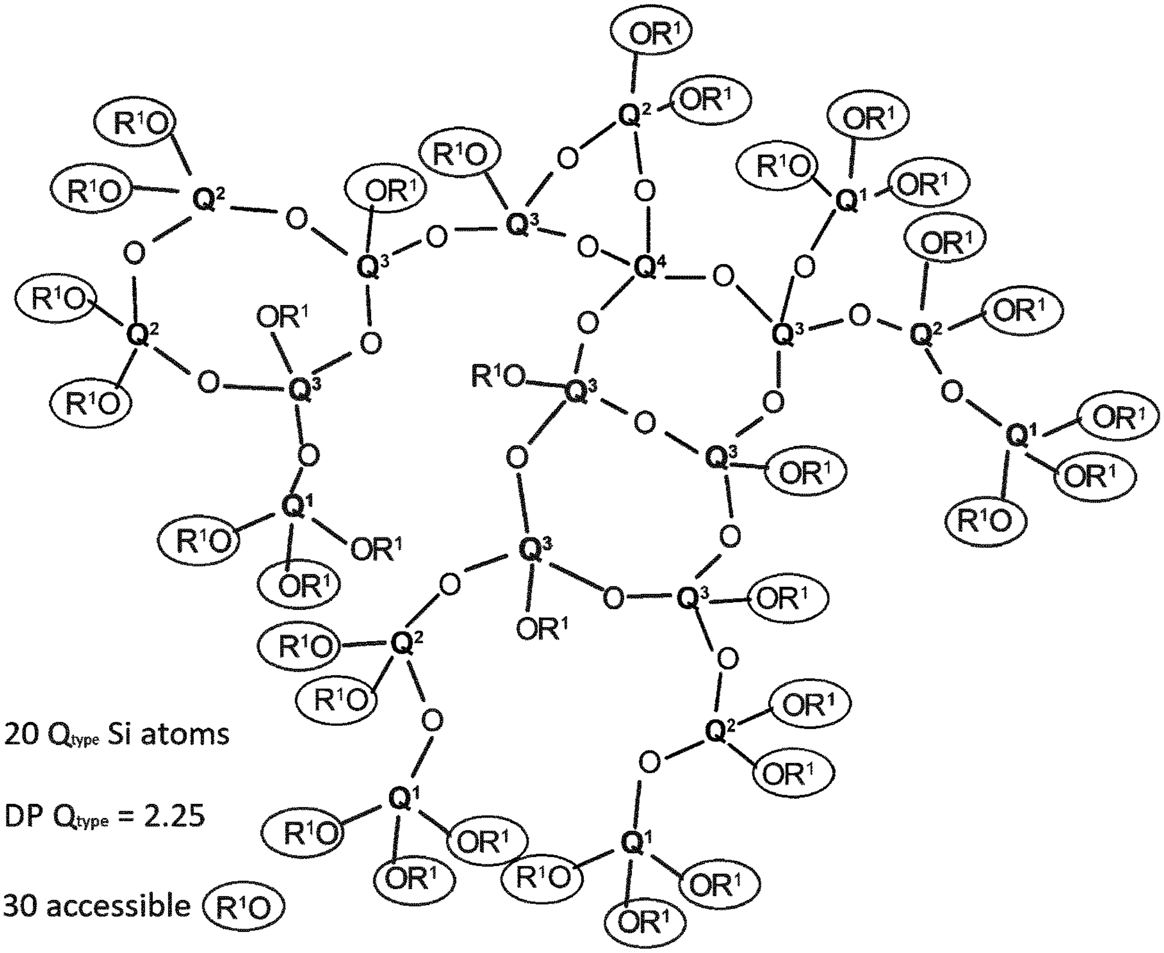
FIGS. 1*a* and 1*b* shows exemplary 2D molecular structure representations of a typical pure Q-type polyalkoxysilane material described herein with generalized $R^1$ substituents for two different $DP_{Qtype}$ values to illustrate the surface to volume dependence on the size or more specifically on the $DP_{Qtype}$ values.
Figure 1B:
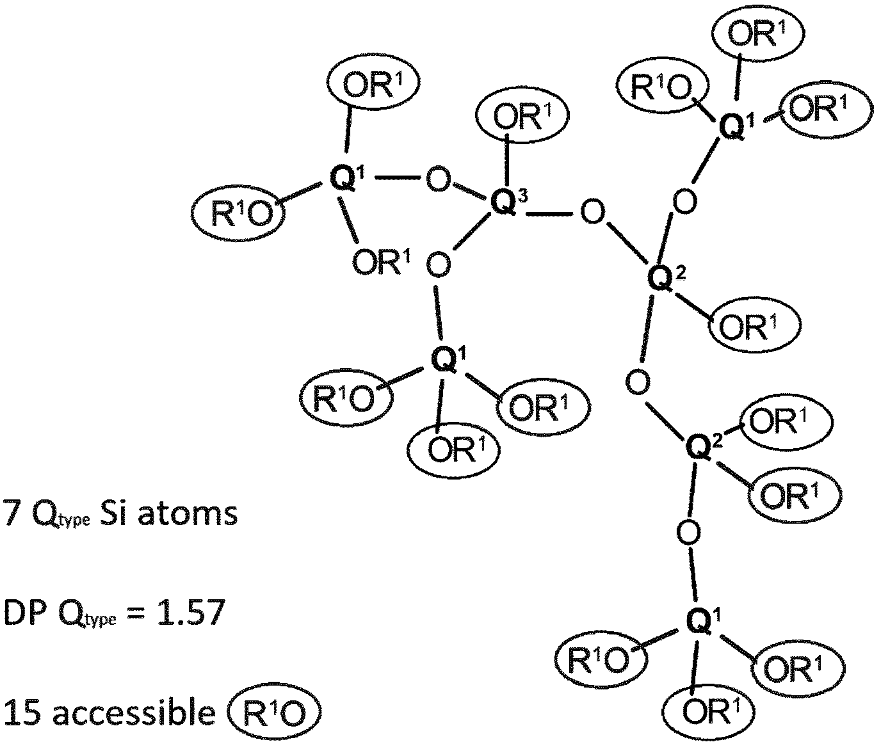
Figure 2A:
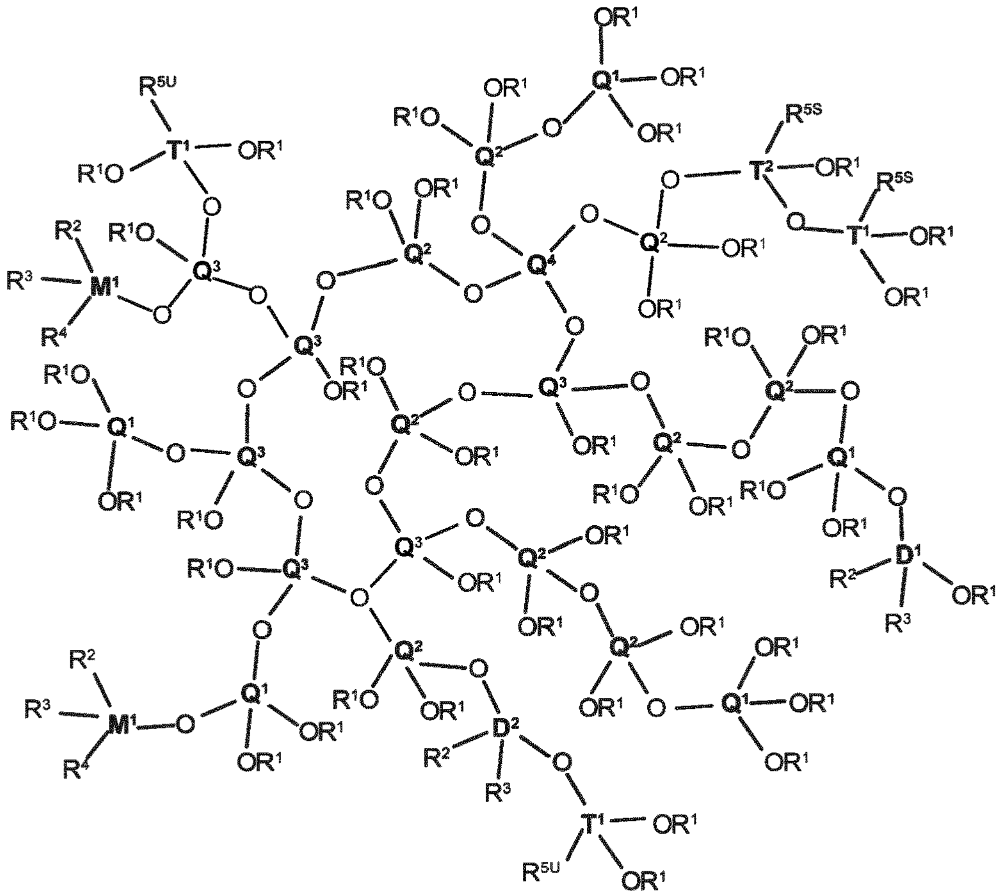
FIGS. 2*a*, 2*b*, and 2*c* shows exemplary 2D molecular structure representations of typical materials described herein based on a pure Q-type precursor material only.
Figure 2B:
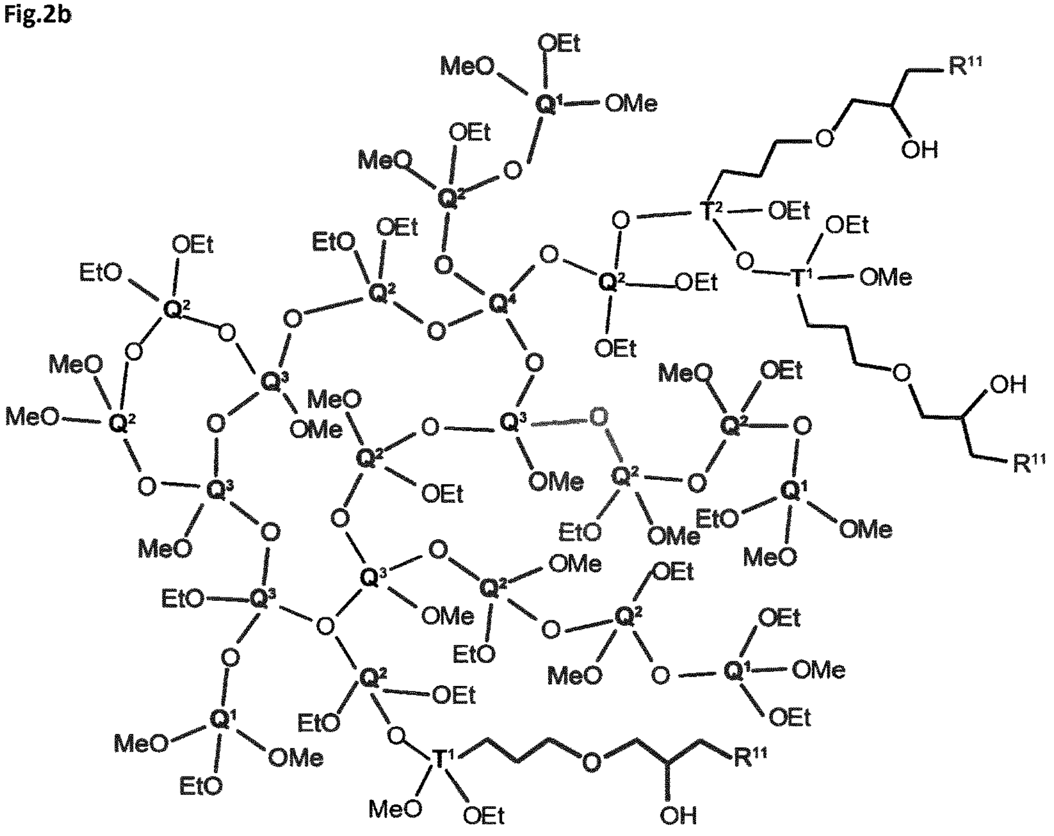
Figure 2C:
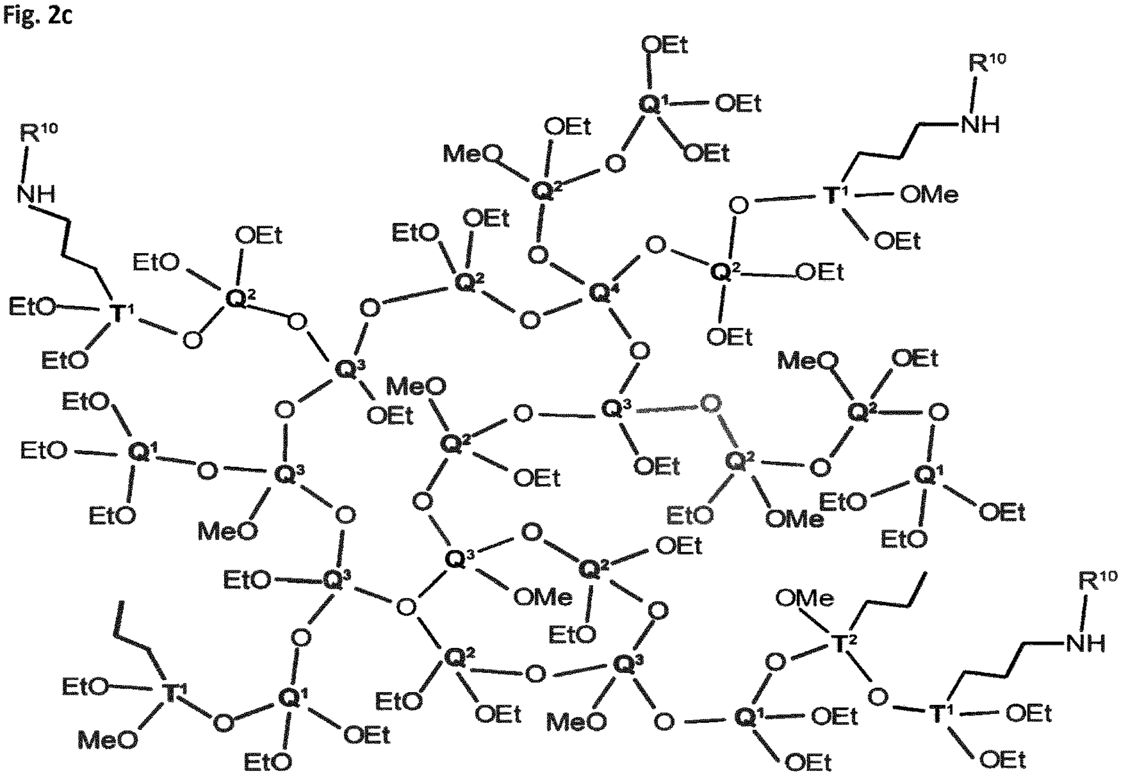
Figure 3:
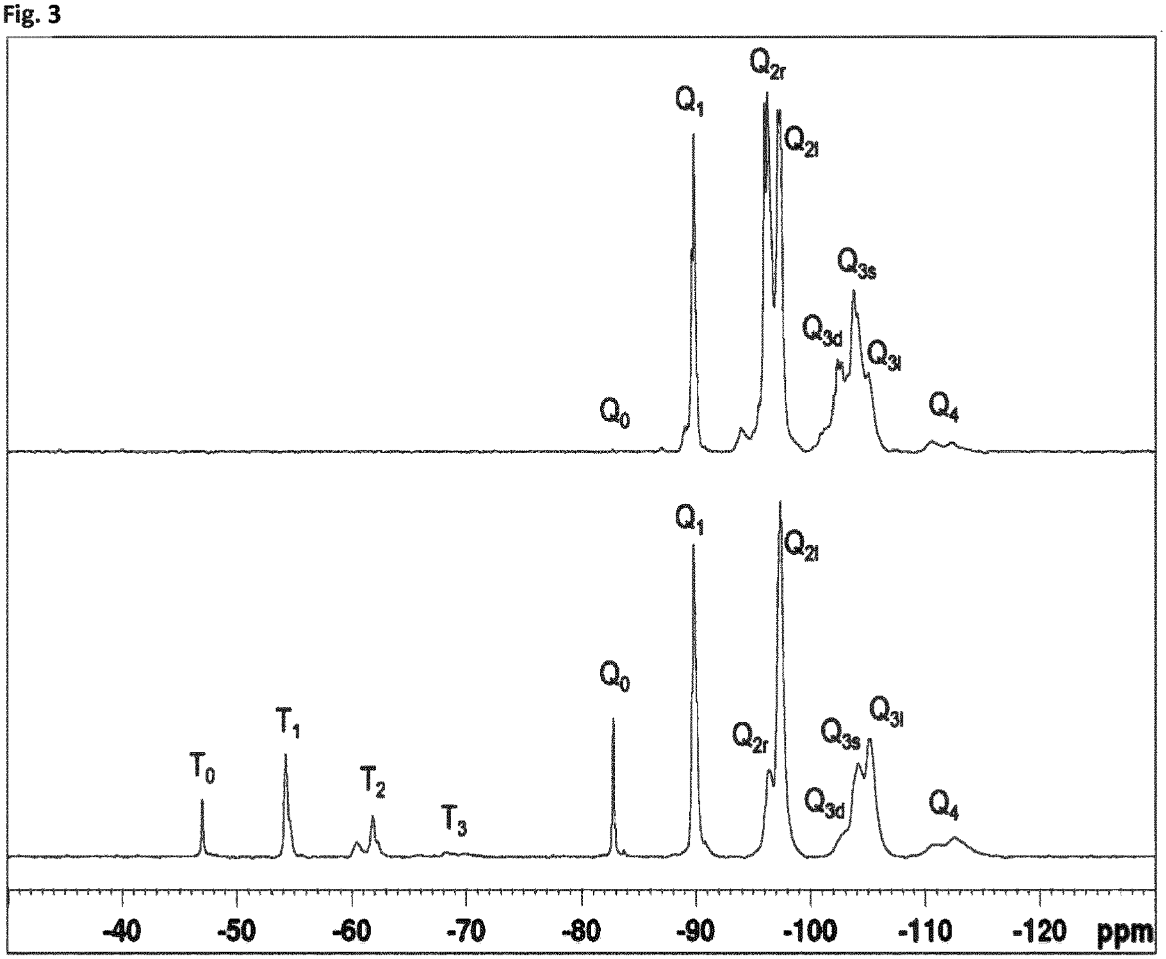
FIG. 3 shows the effect of the rearrangement grafting on the tetrasiloxane ring species content. The upper $^{29}Si$ NMR spectrum of a polyethylsilicate Q-type precursor material displays an abundance of $Q^{2r}$ and $Q3^{s,d}$ tetrasiloxane ring species. The lower 29Si NMR spectrum shows a material made from that exact polyethylsilicate Q-type precursor by means of Ti(IV)-catalyzed rearrangement grafting with a single triethoxysilane monomer T-type precursor with peak assignment of the corresponding Q-type and T-type moieties. One can clearly see that the product contains much fewer $Q^{2r}$ and $Q3^{s,d}$ tetrasiloxane ring species than the Q-type precursor material which it was made from. Specifically, a large fraction of $Q^{2r}$ species have been converted to $Q^{21}$ and also most $Q^{3d}$ and some $Q^{3s}$ tetrasiloxane ring species have disappeared and are replaced by linear $Q^{31}$ species presumably as a result of the rearrangement grafting reaction.
Figure 4:
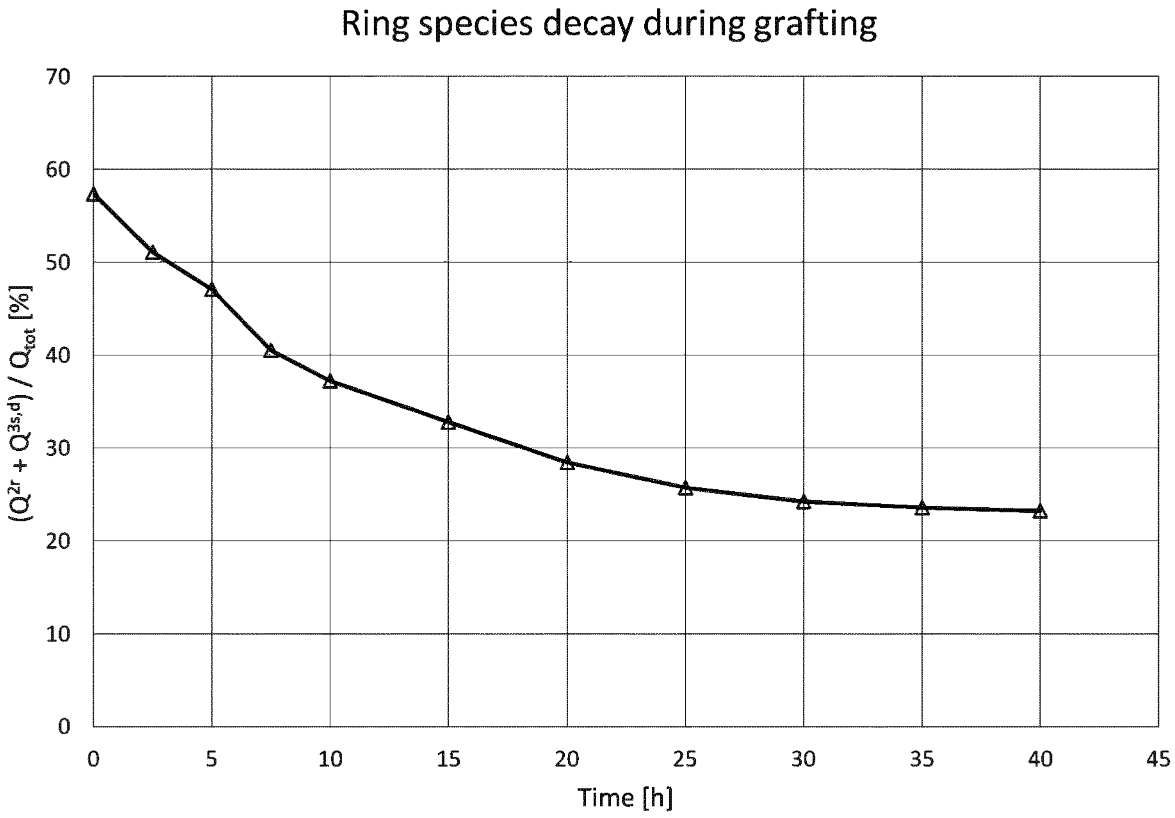
FIG. 4 shows the disappearance of ring species exemplified by the % ($Q^{2r}$&$Q^{3s,d}$) ring species indicator during a model grafting reaction of MTES on a Q-type model precursor compound with increasing reaction time based on analysis of time dependent $^{29}$Si NMR data. The disappearance of ring species during thermal treatment in the presence of a rearrangement catalyst is concurrent with the grafting of the monomeric T-type model silane compound onto the Q-type precursor.

In all examples, the mol-percentage of (tetrasiloxane) ring species refers to the sum of all $Q^2$ and $Q^3$ ring species relative to the total number of Q species also referred herein as % ($Q^{2r}$&$Q^{3s,d}$) ring species unless specifically mentioned otherwise.

In all examples, the mol-percentage of (tetrasiloxane) ring species refers to the sum of all $Q^2$ and $Q^3$ ring species relative to the total number of Q species also referred herein as % ($Q^{2r}$&$Q^{3s,d}$) ring species unless specifically mentioned otherwise. Examples are structured as follows:

Example 1 describes selected preparation protocols of non-$R^{5S}$-functionalized (i.e. $R^{5N}$ and $R^{5U}$-bearing) liquid materials.

Example 2 describes selected examples for preparing $R^{5S}$-functionalized materials. $R^{5S}$ modification was confirmed by means of $^1$H and $^{13}$C NMR spectroscopy.

Example 3 illustrates the effect of $DP_{Qtype}$ and atomic T:Q ratios on application relevant properties illustrated by simple tests

Example 1a: Synthesis of a TEOS Polycondensate/(PTES+N3-PTES) Polycondensate Material with nQ-Type:(nT-Type)=1:(0.05+0.08)

334 g of a Q-type precursor with a $DP_{Qtype}$ of 2.17 and 44.7% ring species prepared by nonhydrolytic condensation of tetraethoxysilane (TEOS) with acetic anhydride in the presence of a Titanium(IV) isopropoxide rearrangement catalyst (1250 ppm, present in the Q-type precursor) were placed inside a 1 L round bottom flask with reflux condenser together where after 27.4 g/0.13 mol of a monomeric T-type precursor Propylriethoxysilane (PTES) and 52.2 g/0.21 mol of a second T-type precursor 3-azidopropyltrimethoxysilane (N3-PTES) without further rearrangement catalyst addition. The mixture was heated to a temperature of 124° C. and was kept stirring for a period of 9 hours, at which point any residual volatiles were removed by pulling a 250 mbar vacuum for 5 minutes. $^{29}$Si NMR analysis confirmed that the product contained less than 8.2% of total $T^0$-monomer measured by the total amount of T-type moieties, respectively as well as less than 29.2% of Q-type tetrasiloxane ring species.

Example 1b: Synthesis of a Non-$R^{5S}$-Functionalized Ethylsilicate Polycondensate/(PTES+OTES) Polycondensate Material with nQ-Type:(nT-Type) =1:(0.08+0.11)

The same synthesis procedure as in Example 1a above was used to prepare the material, with the differences that the i) Q-type precursor was prepared from hydrolysis of a commercial ethylsilicate oligomer (Wacker silicate TES 40 WN), ii) 1100 ppm O═Zr(IV)(OAcAc)$_2$, was added as a catalyst instead of Titanium(IV)isopropoxide for the rearrangement grafting of T-type precursors and that iii) the amount and type of the second T-type precursor two non-functionalisable $R^{5N}$ T-type silanes (PTES—Propyltriethoxysilane and OTES—n-Octyltriethoxysilane) used during rearrangement were changed and the reaction time was 12 h. $^{29}$Si NMR analysis confirmed that the product contained less than 13.5% of total T0-monomer measured by the total amount of T-type moieties, respectively as well as less than 24.8% of Q-type tetrasiloxane ring species.

Example 1c: Synthesis of a Non-$R^{5S}$-Functionalized Ethylsilicate Polycondensate/(PTES+APTMS) Polycondensate Material with nQ-Type:(nT-Type)=1:(0.03+0.15)

The exact same synthesis procedure as in Example 1b above was used to prepare the material, with the sole difference that 250 ppm Ti(OEt)$_4$ was added as a catalyst for the rearrangement grafting of T-type precursors and that the amount and the second T-type precursor (APTMS—aminopropyltrimethoxysilane instead of OTES) was changed to a functionalizable $R^{5U}$ type. $^{29}$Si NMR analysis confirmed that the product contained less than 6.1% of total $T^0$-monomer measured by the total amount of T-type moieties, respectively as well as less than 23.8% of Q-type tetrasiloxane ring species.

Example 1d: Synthesis of a Non-$R^{5S}$-Functionalized Methylsilicate Polycondensate/(oligoVTES+APTMS) Polycondensate Material with nQ-Type:(nT-Type)=1:(0.05+0.15)

The exact same synthesis procedure as in Example 1g above was used to prepare the material, with the difference that the Q-type precursor was a methylsilicate precursor prepared from tetramethoxysilane (TMOS) with a $DP_{Qtype}$ value of 1.94 and that the first T-type precursor VTES was added in oligomeric form (oligoVTES). $^{29}$Si NMR analysis confirmed that the product contained less than 13% of total $T^0$-monomer measured by the total amount of T-type moieties, respectively as well as less than 25.7% of Q-type tetrasiloxane ring species.

Example 1e: synthesis of a non-$R^{5S}$-functionalized methylsilicate polycondensate/(VTES) polycondensate material with nQ-type:(nT-type)=1:(0.22)

A material was prepared in exactly the same way as in Example 1c above, with the difference that the VTES T-type precursor was added in monomeric form and that no APTMS was used. $^{29}$Si NMR analysis confirmed that the product contained less than 13% of total $T^0$-monomer measured by the total amount of T-type moieties, respectively as well as less than 25.3% of Q-type tetrasiloxane ring species.

Example 1f: Synthesis of a Non-$R^{5S}$-Functionalized TEOS &TMOS/SH-PTMS Polycondensate Material with nQ-Type:(nT-Type)=1:(0.15)

4 mol of a mixed (TMOS 66%/TEOS33%) Q-type precursor prepared by hydrolytic condensation with a $DP_{Qtype}$ of 2.19 and 51.0% Q-type tetrasiloxane was mixed with 117.8 g/0.6 mol mercaptopropyltrimethoxysilane (SH-PTMS) as a T-type precursor. The mixture was then again heated up with 670 ppm of Ti(IV) isopropoxide to a temperature of 115° C. with stirring in a glass reactor and kept for 17 hours, at which point the heating source was removed and the product was isolated. $^{29}$Si NMR analysis confirmed that the product contained less than 8.3% of total $T^0$-monomer measured by the total amount of T-type moieties, respectively as well as less than 22% of Q-type tetrasiloxane ring species and less than 44.8% of % $(Q^{3s,d})/Q^3$ ring species.

Example 1g: Synthesis of a Non-$R^{5S}$-Functionalized TEOS/(PhTES+APTMS:DPhDES) Polycondensate Material with nQ-Type:(nT-Type:nD-Type) =1:(0.03+0.15:0.05)

An amount containing 4.5 mol Si equivalent of a Q-type precursor prepared by controlled hydrolysis of TEOS was injected into a hermetically sealed stirred glass reactor (Büchi versoclave, 1 l) set to a temperature of 105° C. Next, 108.2 g/0.45 mol and 37.0 g/0.23 mol of a first and second T-type monomer precursor phenyltriethoxysilane (PhTES) and aminopropyltrimethoxysilane (PTMS) were also injected into the hot autoclave together with 56.2 g/0.23 mol of a D-type precursor diphenyldimethoxysilane (DPhDMS) and Titanium(IV)-methoxide as a catalyst. The mixture was kept at temperature with stirring for 29 hours and then removed from the heating source and allowed to cool to room temperature. $^{29}Si$ NMR analysis confirmed that the product contained less than 16% $T^0$-monomer and less than 11% of $D^0$-monomer measured by the total amount of T-type and D-type moieties, respectively, as well as less than 22.7% of Q-type tetrasiloxane ring species.

Example 2a: Preparation of an $R^{5S}$ Functionalized Material Based on a Material Prepared According to Example 1a A material prepared according to Example 1a was $R^{5S}$ functionalized on its azide ($L-N_3$) groups by direct "on polysiloxane" reaction with a mixture of an alkynylated poly-propylene glcol (A-PPG) and a cyclic substituted alkyne Difluorocyclooctyne (DIFO) leading to partial -L'-$Y^2$ functionalization. The A-PPG material was first prepared by reacting a 450 g/mol PPG with an alkyne in the presence of $SO_2F_2$ in DMSO as a solvent/activator system. An equimolar amount of A-PPG and DIFO was used in the presence of a Cu-catalyst with a total alkyne to azide ratio of 0.82:1 and the reaction was carried out at room temperature in ethanol leading to a partial substitution with 58% yield as confirmed by NMR analysis.

Example 2b: Preparation of an $R^{5S}$ Functionalized Material Based on a Material Prepared According to Example 1b A material prepared according to Example 1b containing only $R^{5N}$ and no functionalizable $R^{5U}$ groups was functionalized "$T^0$ grafting" of a previously prepared functionalized $T^0$ monomer. Said functionalized monomer was prepared by reacting 2-hydroxyacetophenone in methanol under reflux with aminopropyltriethoxysilane (APTES) for 3 h and removing the MeOH solvent by distillation. The functionalized $T^0$ monomer was then rearrangement grafted to a material prepared according to example 1b at 100° C. for 32 h.

Example 2c: Preparation of an $R^{5S}$ Functionalized Material Based on a Material Prepared According to Example 1c A material prepared according to Example 1c was $R^{5S}$ functionalized on its amino ($L-NH_2$) groups by direct "on polysiloxane" reaction with a triacrylate (trimethylolpropane triacrylate—TMPTA) leading to complete -L'-$Y^1$ functionalization. A 2:1 molar ratio (50% molar excess of TMPTA) was used based on the effective aminic proton to acrylate group ratio. The reaction was carried neat at room temperature for 24 hours and the product confirmed by NMR analysis.

Example 2d: Preparation of an $R^{5S}$ Functionalized Material Based on a Material Prepared According to Example 1d A material prepared according to Example 1d was $R^{5S}$ functionalized on its vinyl ($—CH═CH_2$) groups by direct "on polysiloxane" radical polymerization in a gel emulsion containing a low concentration of a polymer precursor methyl-methacrylate (MMA) leading to —$Y^3$ functionalization with oligo-hybrid PMMA. A 6:1 molar ratio of vinyl groups to MMA precursor was used and the reaction triggered by a photoinitiator and a 365 nm UV light source. The reaction product was identified and confirmed by NMR analysis.

Example 2e: Preparation of an $R^{5S}$ Functionalized Material Based on a Material Prepared According to Example 1f A material prepared according to Example 1f was $R^{5S}$ functionalized on its mercapto (-L-SH) groups by direct "on polysiloxane" modification with an isocyanate (Methylene diphenyl diisocyanate—MDI) leading to L'-$Y^1$ isocyanate ($R^{10b}$, X═N) functionalization with grafted MDI units. A 1:2.38 molar ratio of mercapto groups to MDI reagent was used and the reaction was carried out neat at 0° C. with stirring overnight. The reaction product was identified and confirmed by NMR analysis.

Example 2f: Preparation of an $R^{5S}$ Functionalized Material Based on a Material Prepared According to Example 1g A material prepared according to Example 1g was $R^{5S}$ functionalized on its amino ($-L-NH_2$) groups by direct "on polysiloxane" modification with an epoxide precursor (Bisphenol F diglycidyl ether—BFDGE) leading to L'-$Y^1$ epoxy ($R^{10d}$) functionalization with grafted BFDGE units. A 1:2 molar ratio based on the effective aminic proton to BFDGE molar ratio was used and the reaction was carried out neat overnight at 80° C. with 1% of a dimethylbenzylamine catalyst. The reaction product was identified and confirmed by NMR analysis.

Example 2g: Preparation of an $R^{5S}$ Functionalized Material Based on an $R^{5U}$ Polysiloxane Material Prepared Using a Preparation Protocol Described in Example 1g A material was first prepared using the same protocol as in Example 1g but using 3-(2-aminoethylamino)propyltrimethoxysilane (AEAPTMS)—a mixed secondary and primary amine bearing $T^0$ precursor instead of APTMS and using a T:Q molar ratio of said aminotrimethoxysilane of 0.11:1 instead of the previously used 0.15:1 during grafting. This material was then $R^{5S}$ functionalized on its amino ($-L-NH—(CH_2)_2—NH_2$) groups by direct "on polysiloxane" modification with the same epoxide precursor (Bisphenol F diglycidyl ether—BFDGE) leading to epoxy ($R^{10d}$) functionalization with grafted BFDGE units. A 1:1.5 molar ratio based on the effective aminic proton to BFDGE molar ratio was used and the reaction was carried out neat overnight at 80° C. with 1% of a dimethylbenzylamine catalyst. The reaction product was identified and confirmed by NMR analysis.

Example 2h: Alternative Preparation of an $R^{5S}$ Functionalized Material Based on a Material Prepared According to Example 1g A material prepared according to Example 1g was $R^{5S}$ functionalized on its Phenyl ($Y^3$—$R^8$) groups by direct "on polysiloxane" modification with Chlorine (aromatic halogenation) in the presence of an $AlCl_3$ catalyst to yield a $Y^3$ ($R^8$ on phenyl) functionalization.

Example 2i: Improved Preparation of an $R^{5S}$ Functionalized Material Based on a Material Prepared According to Example 1g A material identical to the one described above was prepared by first chlorinating trichlorophenylsilane with $Cl_2$ and an $AlCl_3$ catalyst to yield (p-chlorophenyl-trichlorosilane) which was then purified by distillation but this time using the better suited "$T^0$ grafting" approach. The (p-chlorophenyl)trichlorosilane was then converted to (p-chlorophenyl)trimethoxysilane by quenching it in methanol and isolation. The resulting (p-chlorophenyl)trichlorosilane was then grafted in a desired quantity together with phenyltrimethoxysilane (PhTMS) in a protocol identical to the one described in Example 1g to yield the desired degree of $Y^3$ ($R^8$ on phenyl) functionalization.

Example 2j: Alternative Preparation of an $R^{5S}$ Functionalized Material Based on a Material Prepared According to Example 1f A material prepared according to Example 1f was $R^{5S}$ functionalized on its on its mercapto (-L-SH) groups by direct "on polysiloxane" modification with an epoxide precursor (Bisphenol A diglycidyl ether—BADGE) leading to L'-$Y^1$ epoxy ($R^{10d}$) functionalization with grafted BADGE units. A 1:4 molar ratio of mercapto (—SH) to BADGE was used and the reaction was carried out neat overnight at 90° C. with 0.5% of a dimethylbenzylamine catalyst. The reaction product was identified and confirmed by NMR analysis.

Example 2k: Preparation of an $R^{5S}$ Functionalized Material Based on a Material Prepared According to Example 1e A material prepared according to Example 1e was $R^{5S}$ functionalized by "$T^0$ grafting" of a functionalized T-monomer which was obtained by reacting aminorpopyltriethoxysilane (APTES) pyromellitic dianhydride (PDA) in a 1:0.62 (aminic protons to PDA) molar ratio. The reaction mixture was $T^0$ grafted in a second step (90° C., 35 hours) without additional rearrangement catalyst in a T:Q ratio of 0.06:1 on top of the already existing VTES T-type moieties. The reaction product was identified and confirmed by NMR analysis.

Example 2l: Alternative Preparation of an $R^{5S}$ Functionalized Material Based on a Material Prepared According to Example 1e On a material prepared according to Example 1e, first a second T-type monomer was grafted onto, namely Bis[3-(triethoxysilyl)propyl] Tetrasulfide (TESPT) in a T:Q molar ratio of 0.04:1 with additional rearrangement catalyst (600 ppm Ti(IV)-isopropoxide). The reaction product was then modified in dilute organic solution with a small amount of styrene monomer using an organic peroxide as radical initiator. The viscous, modified (vinyl & TESPT units) radical reaction product was identified and confirmed by NMR analysis.

Example 2m: Preparation of an $R^{5S}$ Functionalized Material Based on a Material Prepared According to Example 1f A material prepared according to Example 1f was $R^{5S}$ functionalized on its mercapto (-L-SH) groups by direct "on polysiloxane" modification with an epoxidized fatty acid (epoxidized soybean oil) leading to a direct —S—$R^{12c}$ functionalization. A 1:1.42 molar ratio of mercapto groups to epoxidized soybean oil reagent was used and the reaction was carried out at 65° C. in toluene. The reaction product was identified and confirmed by NMR analysis.

Example 3a: Effect of $DP_{Q\text{-}type}$ and T:Q Molar Ratio on the Reactivity of Vinyl Functional Polymeric Liquid Materials A series of compounds according to example 1e were prepare but starting from ethoxy-polysiloxane Q-type precursors. 10 ml aliquots of the resulting materials were then placed in an oil bath at 140° C. with stirring and once they had reached temperature, 50 mg of dicumylperoxide (DCP) was added as a radical initiator. All materials had a $DP_{Qtype}$ value above 1.8 and they self-polymerized, presumably because of their "macro-monomer" character. The time to polymerization at 140° C. was recorded showing the dependence of the radical polymerization/crosslinking reactivity on both DP Qtype and T:Q molar ratios.

In the table below, we can see the time to polymerization as a function of $DP_{Qtype}$ and T:Q ratio at 140° C. (after DCP addition).

| DP Q-type | 1.82 | 1.97 | 2.15 |
|---|---|---|---|
| T:Q ratio = 0.15:1 | 4 minutes | 3 minutes | 2 minutes |
| T:Q ratio = 0.26:1 | 1 minutes | 1 minutes | <1 minute |

Example 3b: Comparative Example Demonstrating the Lack of Reactivity of Vinyl Functional Polymeric Liquid Materials with Low $DP_{Qtype}$ Value Materials identical to the ones above were prepared and tested but this time starting from an Ethylsilicate (DYNASYLAN 40, Evonik Industries) precursor onto which VTMS was grafted to yield T:Q ratios of 0.16:1 and 0.26:1, in analogy to the above example. When tested for self-polymerization with DCP at 140° C. in the same manner as described in Example 3a, no polymerization was observed even after one hour at temperature, indicating insufficient reactivity, which can be attributed as a lack of "macro-monomer" or resinous character and is a direct consequence of the lower $DP_{Qtype}$.

Example 3c: Effect of $DP_{Qtype}$ on the Reactivity of BADGE-(Epoxy) $R^{5S}$ Functionalized Mercapto-Functional Polymeric Liquid Materials Three BADGE modified mercapto-bearing polysiloxanes were prepared according to the preparation protocol described example 2f with $DP_{Qtype}$ values of 1.77, 1.92 and 2.18, respectively and a constant T:Q molar ratio of 0.15:1. The corresponding BADGE modified compounds were reacted with 10 weight % of a standard amine hardener for epoxy resins in a warm heating cabinet. The respective curing times of the epoxy resin systems decreased within the series of increasing $DP_{Qtype}$ value and were recorded as 95, 78 and 55 minutes respectively, again demonstrating the dependence of reactivity on the DP-value.

Example 3d: Effect of T:Q Molar Ratio on the Reactivity of MDI-(Isocyanate) $R^{5S}$ Functionalized Mercapto-Functional Polymeric Liquid Materials Three MDI modified mercapto-bearing polysiloxanes were prepared according to the preparation protocol described in example 2e with a constant $DP_{Qtype}$ value of 2.19 but T:Q ratios (mercapto $R^{5U}$ of the polysiloxane prepared prior to MDI functionalization) were chosen as 0.07:1, 0.15:1 and 0.24:1, respectively and the weighed amount of MDI used to modify was taken from Example 2e and kept the same for all three T:Q ratio examples (constant amount of isocyanate in all cases). The corresponding MDI modified compounds were reacted with a 4000 MW PPG polyol in the presence of 1% DABCO as a catalyst. The respective curing times of the epoxy resin systems decreased within the series of increasing T:Q molar ratio. The corresponding measured curing times in the series (from lowest to highest T:Q ratio) were 71, 52 and 19 minutes, respectively, showing a pronounced effect on the system's reactivity.

Example 3e: Effect of $DP_{Qtype}$ and T:Q Molar Ratio on the Reactivity of DPGDA-(Diacrylate) $R^{5S}$ Functionalized Amino-Functional Polymeric Liquid Materials A series of materials similar to the one shown in Example 1c were prepared from Q_type precursors with different DP values and then also different APTMS grafting degrees were chosen. In contrast to the material described in Example 1c, there was no $R^{5N}$ nonfunctionalizable T-type silane (propyltriethoxysilane, PTES) present in the prepared $R^{5U}$ analogues, meaning that the materials contained APTMS as the only grafted T-type silane. These $R^{5U}$ materials were then $R^{5S}$ functionalized with a given molar ratio of DPGDA (di-propylene glycol diacrylate) to "amino protons" to yield the corresponding diacrylate Michael adducts.

Next the stability of these compounds in the absence of any stabilizers was investigated which is a measure of their propensity to self-polymerize and thus their reactivity. To do so, DPGDA (-L'-$Y^1$) $R^{5S}$ functionalized polymeric liquid materials were stored at 45° C. and at room temperature, respectively. The table below shows the time to gelation/self polymerization as a function of $DP_{Qtype}$ and the T:Q molar ratio: The samples at 40° C. are at constant T:Q molar ratio and thus also constant DPGDA content in the material. They show that with increasing $DP_{Qtype}$ (precursor core size), the materials are more reactive and polymerize sooner.

The room temperature study below shows that samples prepared at a medium $DP_{Qtype}$ but with varying T:Q molar ratio are more stable at lower T:Q ratios which makes sense, as this translates into a lower total functionality/extent of $R^{5S}$ functionalization in the material as well. Interestingly, the lowest $DP_{Qtype}$ of 1.85 and intermediate T:Q ratio (0.15:1) leads to a material that is still reactive but that seems reasonably stable at room temperature.

| DP Q_type [ ] | T:Q molar ratio [ ] | Temperature [° C.] | Molar ratio DPGDA DPGDA:amino "H" | Gel time [days] |
|---|---|---|---|---|
| 1.85 | 0.15:1 | 40 | 0.75 | 11 |
| 2.03 | 0.15:1 | 40 | 0.75 | 3 |
| 2.18 | 0.15:1 | 40 | 0.75 | 2 |
| 1.85 | 0.15:1 | 22 | 1 | no gelation |
| 2.03 | 0.10:1 | 22 | 1 | 23 |
| 2.03 | 0.15:1 | 22 | 1 | 11 |
| 2.03 | 0.20:1 | 22 | 1 | 5 |

Example 4: Efficiency Testing for Potential Rearrangement Catalysts

A protocol was devised to test various model catalysts for their efficiency to catalyze grafting of a T-type monomeric model silane methyltriethoxysilane (MTES). Briefly, commercial Dynasylan Silbond 50 was used as Q-type precursor. A molar $ratio_{nQ\text{-}type}$:$n_{T\text{-}type}$ of 1:0.15 was used and 30 ml aliquots of a premixed solution containing said Q-type and T-type silane precursor were filled into 50 ml glass bottles with lid. To each bottle, 1% by weight of model rearrangement catalyst was added and a blank sample was further included in the study. All glass bottles were simultaneously placed inside a heating cabinet which was kept at 100° C. and the samples were left there for a 24 h incubation period. After that, they were removed from the cabinet and allowed to cool to room temperature and analyzed by means of $^{29}Si$ NMR spectroscopy.

| Catalyst: | $DP_{Q\text{-}Type}$ | $DP_{T\text{-}Type}$ | % $T^0$ | %($Q^{2r}$&$Q^{3s,d}$)/$Q_{tot}$ | %($Q^{3s,d}$)/$Q^3$ | Rearrangement |
|---|---|---|---|---|---|---|
| No cat. | 2.12 | 0.56 | 51.6 | 48.9 | 80.8 | — |
| Fe(II)-chloride | 2.18 | 1.41 | 5.6 | 33.8 | 0.65 | Yes |
| Ti(IV)-isopropoxide | 2.08 | 1.65 | 5.8 | 24.6 | 52.0 | Yes |
| Zn(II)-chloride | 2.19 | 0.64 | 41.2 | 50.9 | 81.3 | No |
| Zr(IV)-oxynitrate | 2.16 | 1.84 | 4.4 | 25.3 | 51.6 | Yes |

Following the spectral NMR analysis, one can evaluate the performance and suitability of a catalyst in terms of its ability to graft $T^0$ monomers ($DP_{T\text{-}Type}$ and % $T^0$ indicators) as well as the percentage of residual tetrasiloxane ring species after the grafting step (% ($Q^{2r}$&$Q^{3s,d}$)/$Q_{tot}$ and % ($Q^{3s,d}$)/$Q^3$ indicators).

The invention claimed is:

1. A polymeric liquid polysiloxane material comprising:

(i) non-organofunctional Q-type siloxane moieties selected from the group consisting of:

Q[1]

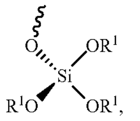

Q[2]

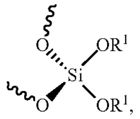

Q[3]

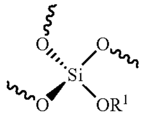 and

Q[4]

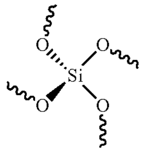;

(iv) mono-organofunctional T-type siloxane moieties selected from the group consisting of:

T[1]

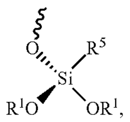

T[2]

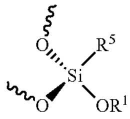 and

T[3]

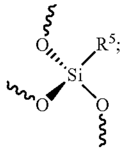

wherein

 indicates a covalent siloxane bond to a silicon atom of another Q-, and/or T-type moiety as defined in (i) and/or (iv);

$R^1$ is selected from the group consisting of methyl, ethyl, propyl, $—P(=O)(OR^{1'})(OH)$, $—P(OR^{1'})_2$, and $—P(=O)(OH)_2$;

$R^{1'}$ is selected from the group consisting of methyl, ethyl, propyl, and butyl;

$R^2$ is selected from the group consisting of methyl, vinyl, and phenyl;

$R^3$ is selected from the group consisting of methyl, vinyl, and phenyl;

$R^5$ is selected from the group consisting of $R^{5N}$, $R^{5U}$ and $R^{5S}$, wherein $R^{5N}$ is selected from the group consisting of methyl, ethyl, n-propyl, isopropyl, n-butyl, t-butyl, linear $C_{5-16}$ alkyl residues, branched $C_{5-16}$ alkyl residues, and cyclic $C_{5-16}$ alkyl residues;

$R^{5U}$ is selected from the group consisting of $-L-Z^1$, $-L-Z^2$ and $—Z^3$, wherein L is an aliphatic linker selected from the group consisting of $—CH_2—$, $—CH_2CH_2—$, $—CH_2CH_2CH_2—$, $—C_6H_4—$, $—C_6H_4—CH_2—$, and $—CH_2—CH_2—C_6H_4—CH_2—$;

$z^1$ is a moiety selected from the group consisting of $—SH$, $—NH_2$,

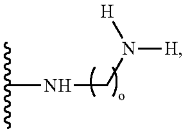

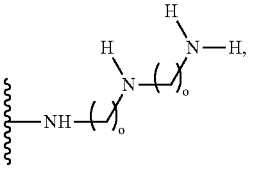 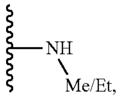

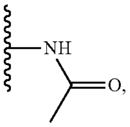 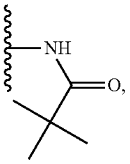 and

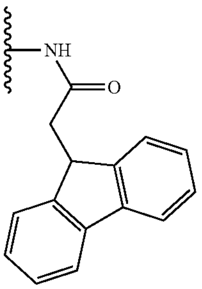;

$Z^2$ is a moiety selected from the group consisting of

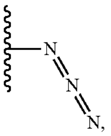 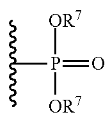, 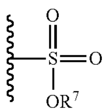,

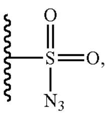 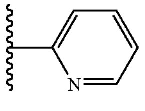, 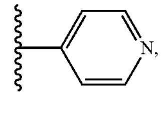

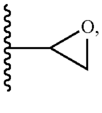 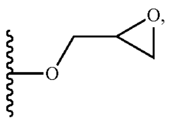 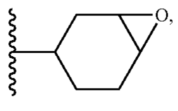

-continued

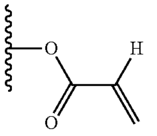

and

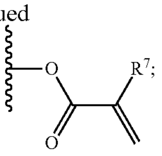

wherein $R^7$ is independently selected from the group consisting of methyl, ethyl and n-butyl, and o is an integer from 1 to 3, and $Z^3$ is selected from the group consisting of vinyl, phenyl,

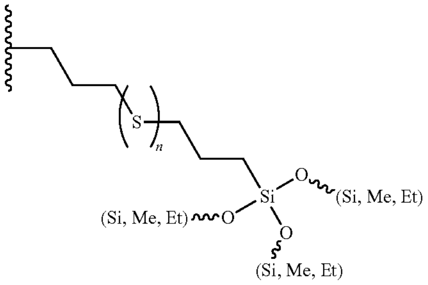

and

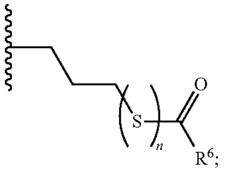

wherein n is an integer selected from the group consisting of 1, 2, 3, 4, and 5, and $R^6$ is selected from the group consisting of methyl, ethyl, n-butyl, linear $C_{5-14}$ alkyl residues branched $C_{5-14}$ alkyl residues;

$R^{5S}$ is selected from the group consisting of -L'-$Y^1$, -L'-$Y^2$, and —$Y^3$, wherein m is an integer selected from the group consisting of 1, 2, 3, and 4;

$R^8$ is selected from the group consisting of —Cl, —Br, —I, —F, —CN, —SCN, —$N_3$, —$NO_2$, —OH, —$SO_2OR^{1'}$, and —O—C(=O)$R^{12}$;

$R^9$ is selected from the group consisting of —Cl, —Br, —I, —F, —CN, —COOH, —$COOR^{1'}$, phenyl, o-vinylphenyl, m-vinylphenyl, and p-vinylphenyl;

$R^{9'}$ is selected from the group consisting of —COOH and —$COOR^{1'}$;

L' is an aliphatic linker selected from the group consisting of —$CH_2$—, —$CH_2CH_2$—, and —$CH_2CH_2CH_2$—; and $Y^1$ is a moiety selected from the group consisting of

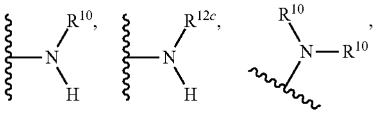

-continued

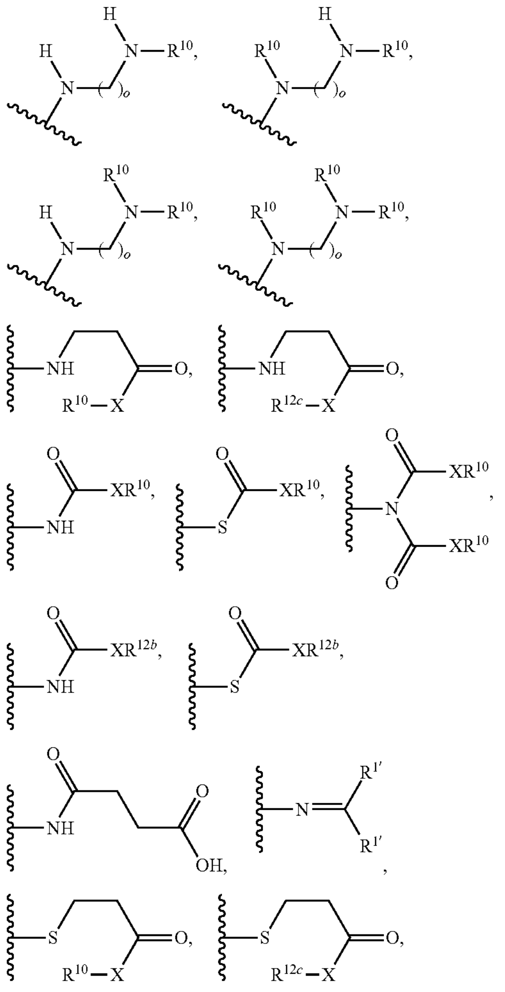

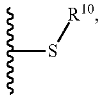

and

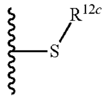

wherein o is an integer from 1 to 3;

$Y^2$ is a moiety selected from the group consisting of

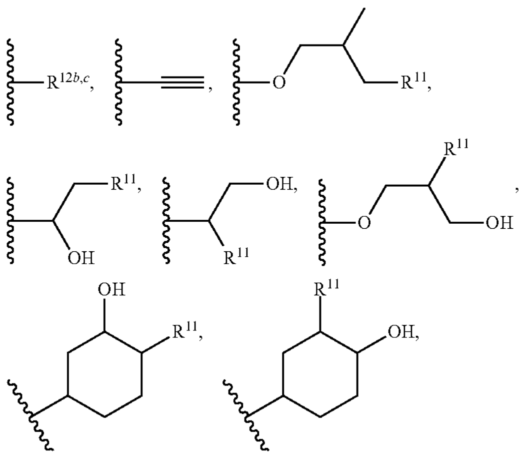

-continued
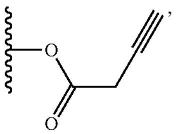 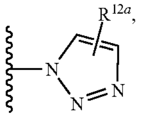
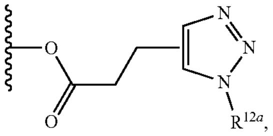 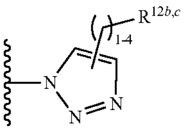 ,
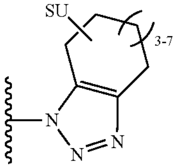 and 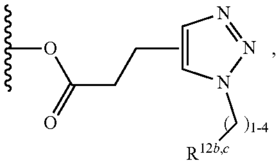 ,
wherein SU indicates substituted or non-substituted;
$Y^3$ is a moiety selected from the group consisting of
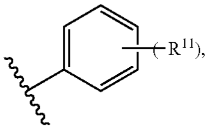 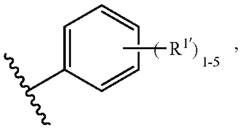
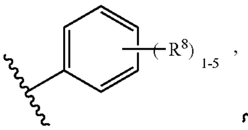 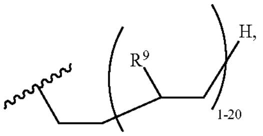
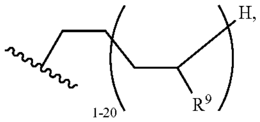
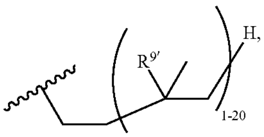
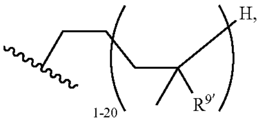
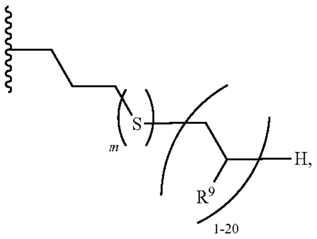 and
-continued
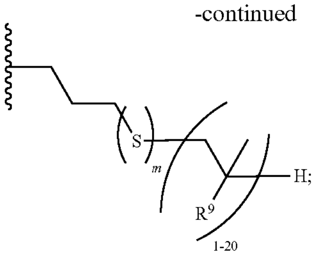
wherein
X is absent, —(NH)— or —O—;
$R^{10}$ is selected from the group consisting of $R^{10a}$, $R^{10b}$, $R^{10c}$, $R^{10d}$, $R^{12a}$, and
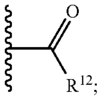
$R^{10a}$ is selected from the group consisting of
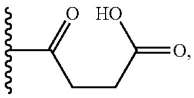 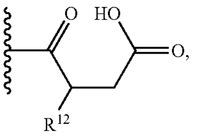
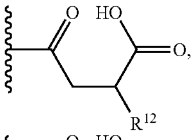 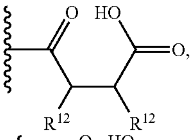
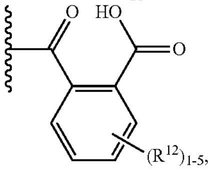 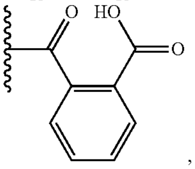 ,
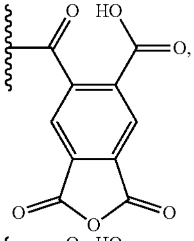 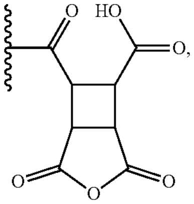
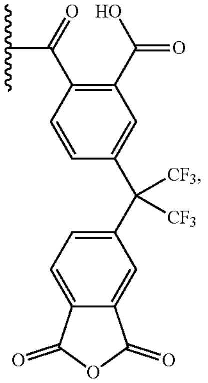 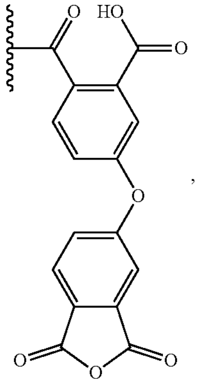 , -continued
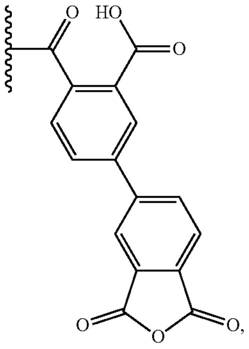
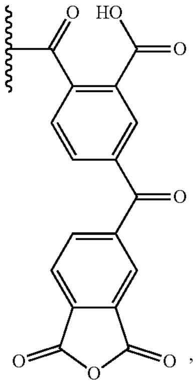
, and
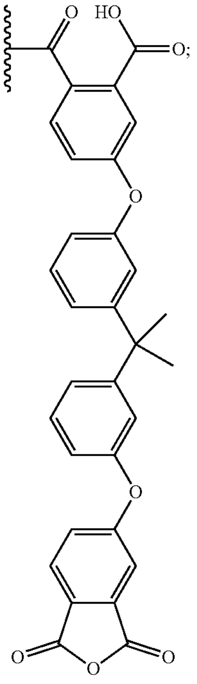 [SMILES: *C(=O)c1ccc(Oc2cccc(C(C)(C)c3cccc(Oc4ccc5c(c4)C(=O)OC5=O)c3)c2)cc1C(=O)O]
$R^{10b}$ is selected from the group consisting of:
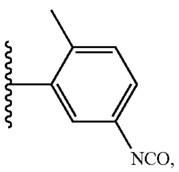
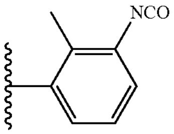
,
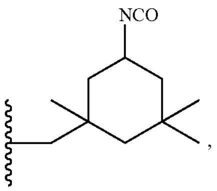
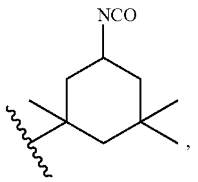
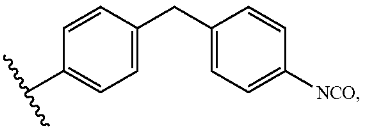
-continued
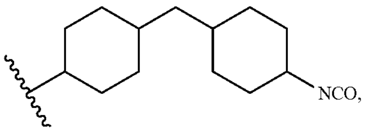
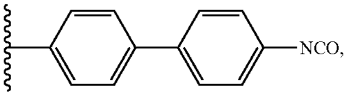
and
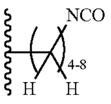
,
in monomeric, biuret and triisocyanurate form;
$R^{10c}$ is selected from the group consisting of:
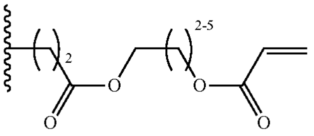
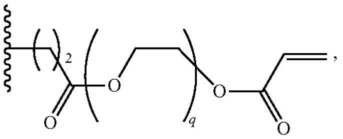
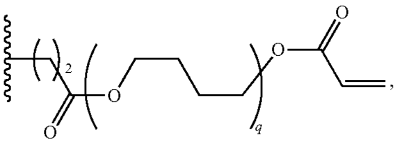
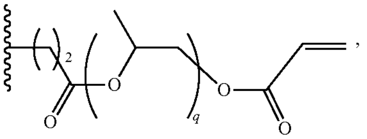
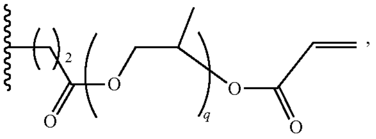
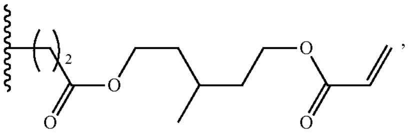
wherein q is an integer from 1 to 25,
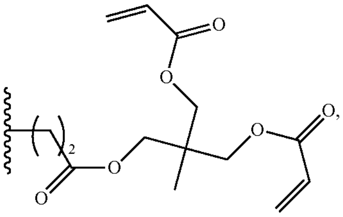

-continued
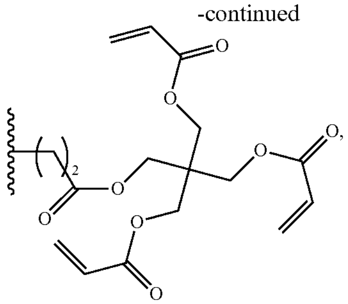
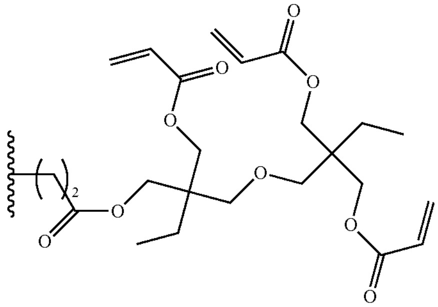
,
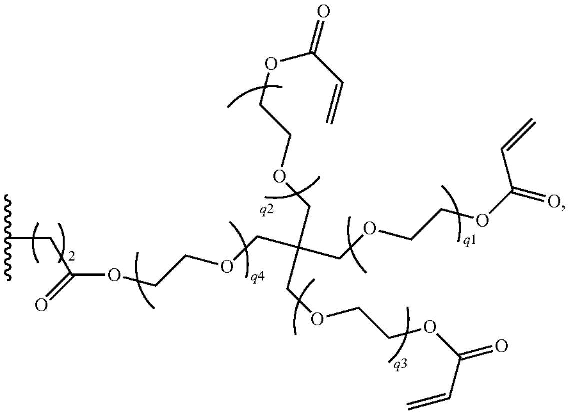
-continued
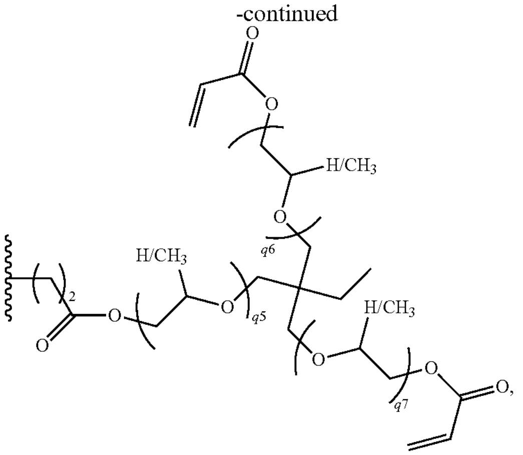
and
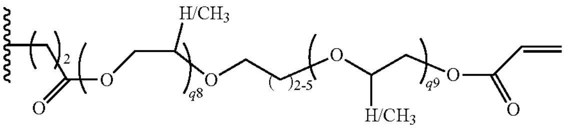
,
wherein each of q1 to q4 are integers from 0 to 8 and the sum of (q1+q2+q3+q4) is from 4 to 8, wherein each of q5 to q7 are integers from 0 to 24 and the sum of (q5+q6+q7) is from 3 to 24, wherein each of q8 and q9 are integers from 0 to 6 and the sum of (q8+q9) is from 2 to 6;
$R^{10d}$ is selected from the group consisting of:
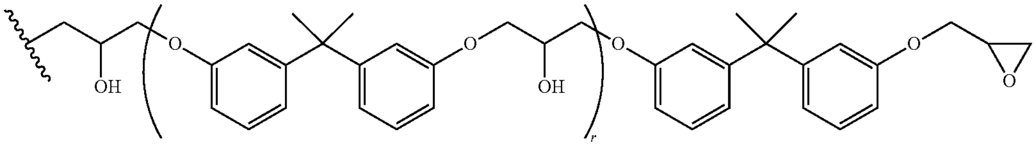
,
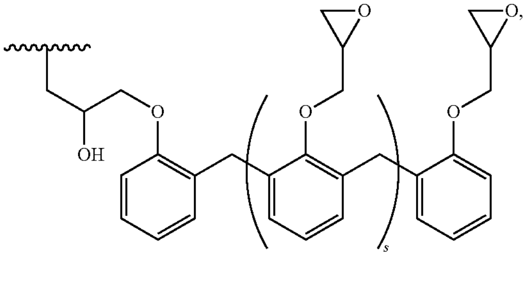
,
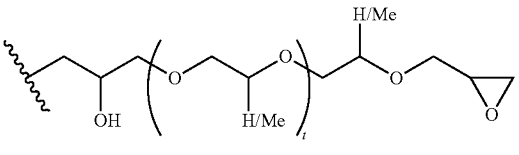
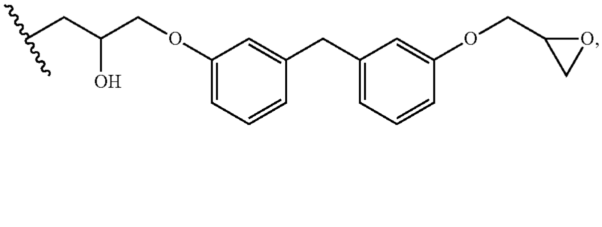
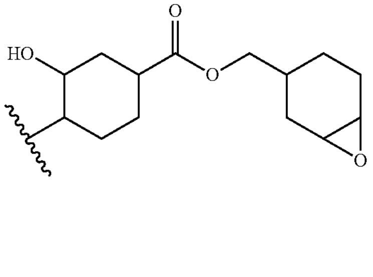

-continued

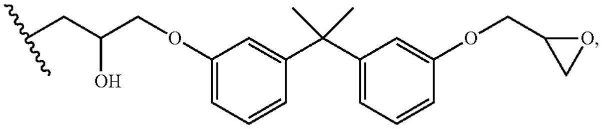

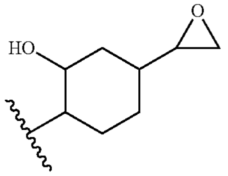

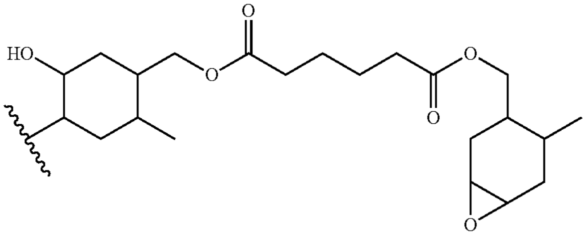

, and

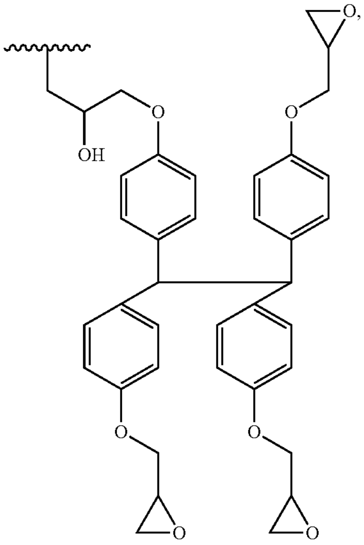

wherein r is an integer from 1 to 100, s is an integer from 1 to 15, and t is an integer from 1 to 10;

$R^{11}$ is selected from the group consisting of $R^8$, —X—$R^{1'}$, and $R^{12c}$, and $R^{12}$ is selected from the group consisting of $R^{12a}$, $R^{12b}$, and $R^{12c}$, wherein $R^{12a}$ is selected from the group consisting of linear $C_{1-18}$ alkyl, linear $C_{2-18}$ alkenyl linear $C_{2-18}$ alkynyl, branched $C_{1-18}$ alkyl, branched $C_{2-18}$ alkenyl, branched $C_{2-18}$ alkynyl, substituted $C_{1-18}$ alkyl, substituted $C_{2-18}$ alkenyl, substituted $C_{2-18}$ alkynyl, non-substituted $C_{1-18}$ alkyl, non-substituted $C_{2-18}$ alkenyl, non-substituted $C_{2-18}$ alkynyl, cyclic $C_{3-18}$ alkyl, cyclic $C_{5-18}$ alkenyl, cyclic $C_{8-18}$ alkynyl, substituted $C_{3-18}$ alkyl, substituted $C_{5-18}$ alkenyl, substituted $C_{8-18}$ alkynyl, non-substituted $C_{3-18}$ alkyl, non-substituted $C_{5-18}$ alkenyl and non-substituted $C_{8-18}$ alkynyl;

$R^{12b}$ is selected from the group consisting of linear alkyl ether, branched alkyl ether, substituted alkyl ether, non-substituted alkyl ether, linear alkenyl ether, branched alkenyl ether, substituted alkenyl ether, non-substituted alkenyl ether, linear alkynyl ether, branched alkynyl ether, substituted alkynyl ether, non-substituted alkynyl ether, cyclic alkyl ether, substituted alkyl ether, non-substituted alkyl ether, cyclic alkenyl ether, substituted alkenyl ether, and non-substituted alkenyl ether, wherein the alkyl ether, alkenyl ether, and alkynyl ether have a molecular weight of up to 5000 g/mol;

unsubstituted polydimethylsiloxane and unsubstituted polydivinylsiloxane; and poly- and oligosaccharides up to a molecular weight of 5000 g/mol; and $R^{12c}$ is selected from the group consisting of amino acids up to a molecular weight of 5000 g/mol, oligo-peptides up to a molecular weight of 5000 g/mol and poly-peptides up to a molecular weight of 5000 g/mol; and $C_{12-24}$ fatty acids, with the proviso that $R^{55}$ is not

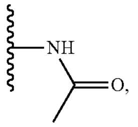

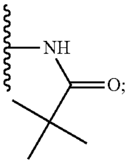

wherein the degree of polymerization of the T-type siloxane moieties $DP_{T\text{-}type}$ is in the range of 1.1 to 2.7;

the material has a viscosity in the range of 2 to 100'000 cP, about 5 to 50'000 cP, or 5 to 1'000 cP, as measured by a cylindrical rotation viscometer according to standard ASTM E2975-15;

the material comprises less than 5, 2.5, 2, 1.5, 1 or 0.5 mol-% silanol groups (Si—OH); and further wherein the polysiloxane material comprises less than 45, less than 37, less than 30 or less than 25 mol-% four-membered combined $Q^{2r}$-type and $Q^{3s,d}$-type siloxane ring species relative to the total Q-type siloxane species; and/or the polysiloxane material comprises less than 70, less than 63, less than 56 or less than 50 mol-% four-membered combined $Q^{3s,3d}$-type siloxane ring species relative to all $Q^3$-type siloxane species; and/or the polysiloxane material comprises less than 4.5, less than 4.0, less than 3.5 or less than 3.0 mol-% double four-membered $Q^{3d}$-type siloxane ring species relative to the total Q-type siloxane species; and/or the polysiloxane material comprises less than 25, less than 20, less than 17 or less than 14 mol-% double four-membered $Q^{3d}$-type siloxane ring species relative to all $Q^3$-type siloxane species, characterized in that when at least 65 mol-%, 75 mol-% or 85 mol-% of all $R^5$ residues of the T-type siloxane moieties in the polysiloxane material are $R^{5N}$, the degree of polymerization of the Q-type siloxane moieties $DP_{Q\text{-}type}$ is in the range of 1.65 to 2.35, and the atomic ratio of T- to Q-species in the material is in the range of 0.05:1 to 0.45:1;

when the sum of all -L-$Z^1$ and -L'-$Y^1$ residues amounts to at least 80 mol-% of all $R^5$ residues of the T-type siloxane moieties in the polysiloxane material, the degree of polymerization of the Q-type siloxane moieties $DP_{Q\text{-}type}$ is in the range of 1.75 to 2.25, and the atomic ratio of T- to Q-species in the material is in the range of 0.02:1 to 0.3:1;

when the sum of all $Z^3$ and $Y^3$ and/or the sum of all -L-$Z^2$ and -L'-$Y^2$ amounts to at least 50 mol-% of all $R^5$ residues of the T-type siloxane moieties in the polysiloxane material, the degree of polymerization of the Q-type siloxane moieties $DP_{Q\text{-}type}$ is in the range of 1.85 to 2.2, and the atomic ratio of T- to Q-species in the material is in the range of 0.02:1 to 0.3:1;

when the sum of all -L-$Z^1$, -L'-$Y^1$ and $R^{5N}$ amounts to at least 90 mol-% of all $R^5$ residues of the T-type siloxane moieties in the polysiloxane material, the degree of polymerization of the Q-type siloxane moieties $DP_{Q\text{-}type}$ is in the range of 1.8 to 2.4, and the atomic ratio of T- to Q-species in the material is in the range of 0.05:1 to 0.4:1; and when the sum of all $R^{5N}$, $z^3$, $Y^3$, -L'-$Y^2$ and -L-$Z^2$ amounts to at least 90 mol-% of all $R^5$ residues of the T-type siloxane moieties in the polysiloxane material, the degree of polymerization of the Q-type siloxane moieties $DP_{Q\text{-}type}$ is in the range of 1.7 to 2.25, and the atomic ratio of T- to Q-species in the material is in the range of 0.05:1 to 0.25:1.

2. The polymeric liquid hyperbranched polysiloxane material according to claim 1, wherein $R^{5N}$ is selected from the group consisting of methyl, ethyl, n-propyl, isopropyl, n-butyl, t-butyl, linear $C_{5-16}$ alkyl residues, branched $C_{5-16}$ alkyl residues and cyclic $C_{5-16}$ alkyl residues;

$Z^1$ is a moiety selected from the group consisting of —SH,

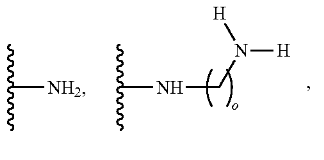

-continued

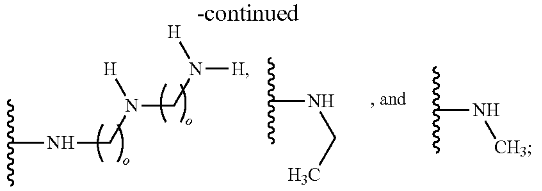

$R^8$ is selected from the group consisting of —Cl, —Br, —I, —CN, —SCN, and —$N_3$;

$Y_1$ is selected from the group consisting of

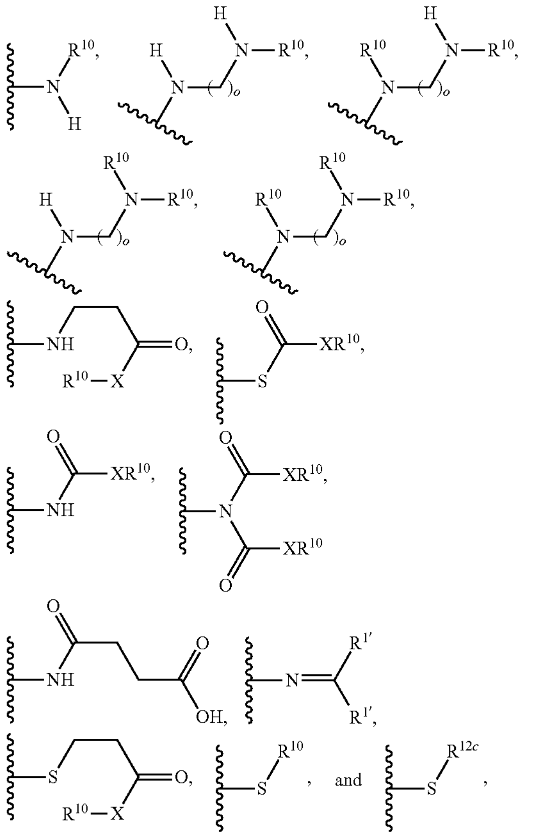

wherein o is an integer from 1 to 3;

$Y^2$ is a moiety selected from the group consisting of

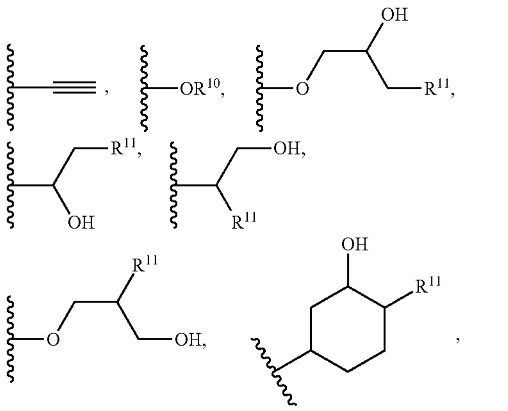

-continued
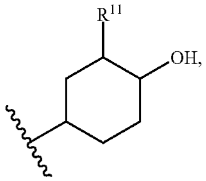
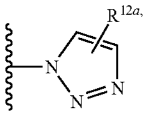
and
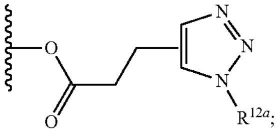
$Y^3$ is a moiety selected from the group consisting of
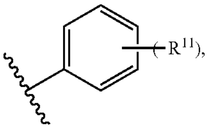
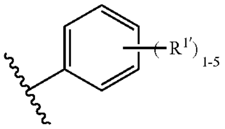
,
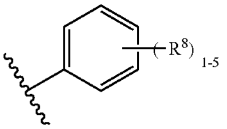
,
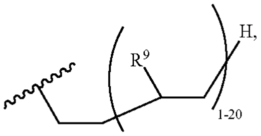
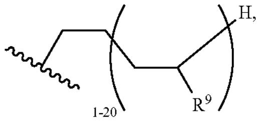
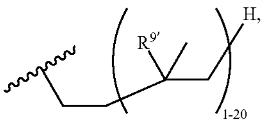
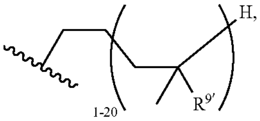
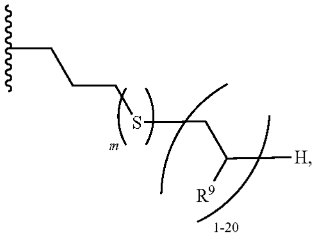
and
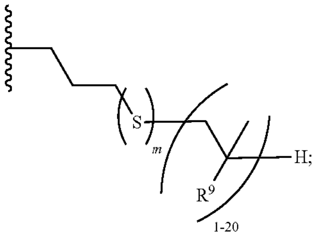
wherein
X is absent, —(NH)— or —O—;
$R^{10}$ is selected from the group consisting of $R^{10a}$, $R^{10b}$, $R^{10c}$, $R^{10d}$, and $R^{12a}$;
$R^{10a}$ is selected from the group consisting of
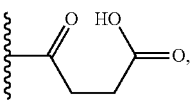
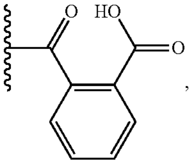
,
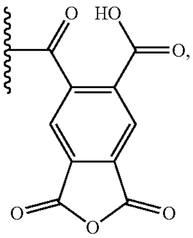
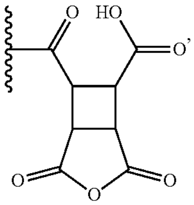
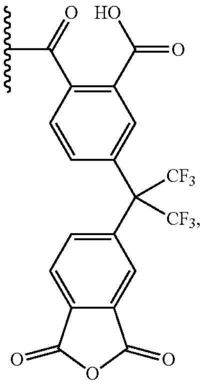
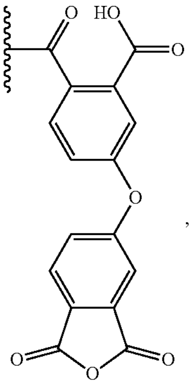
,
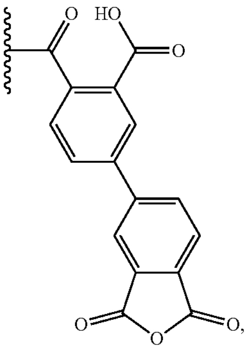
and
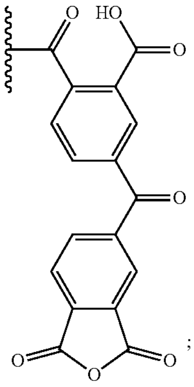
;
$R^{10b}$ is selected from the group consisting of
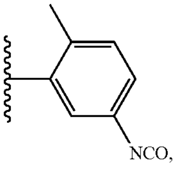
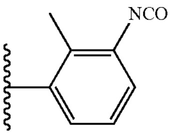
,
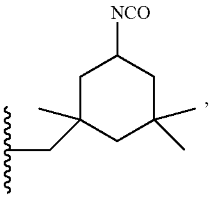
,
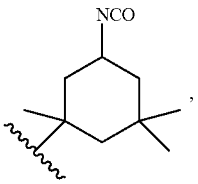
, -continued
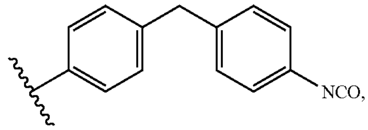,
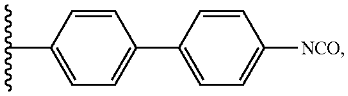, and
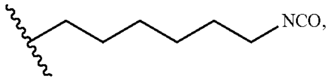,
and X is N;
$R^{10c}$ is selected from the group consisting of
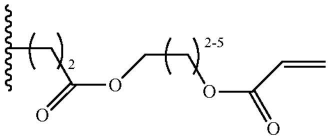,
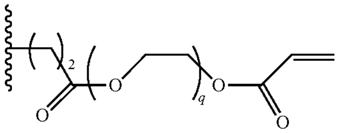,
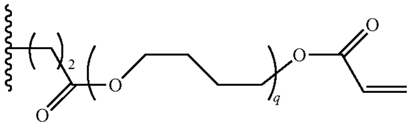,
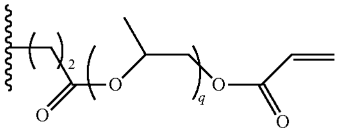,
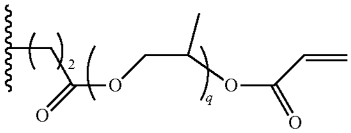,
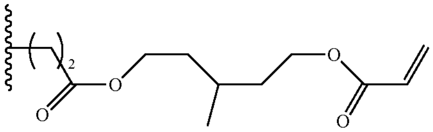,
wherein q is an integer from 1 to 10,
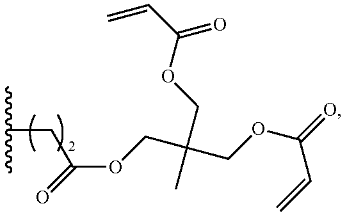,
-continued
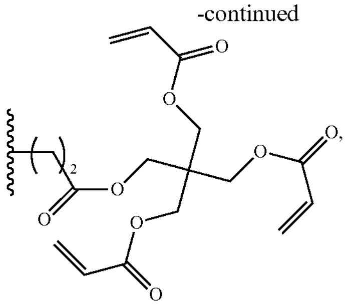,
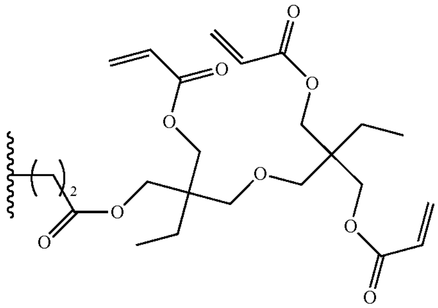,
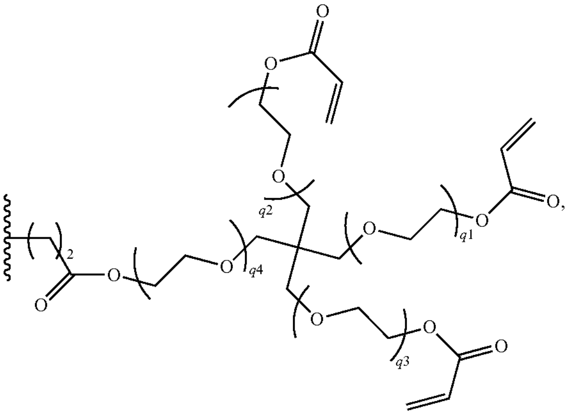,
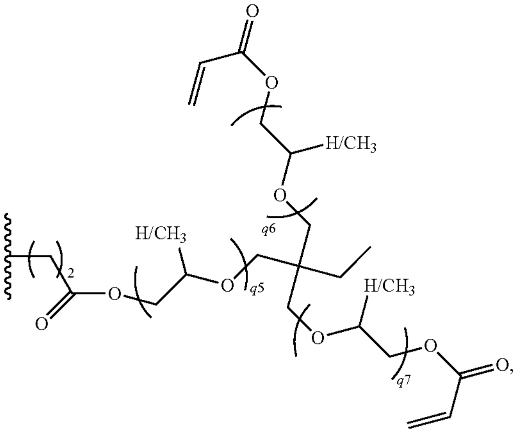, and
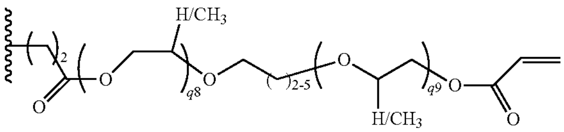,
wherein each of q1 to q4 are integers from 0 to 8 and the sum of (q1+q2+q3+q4) is from 4 to 8, wherein each of q5 to q7 are integers from 0 to 24 and the sum of (q5+q6+q7) is from 3 to 24, wherein each of q8 and q9 are integers from 0 to 6 and the sum of (q8+q9) is from 2 to 6;

$R^{10d}$ is selected from the group consisting of

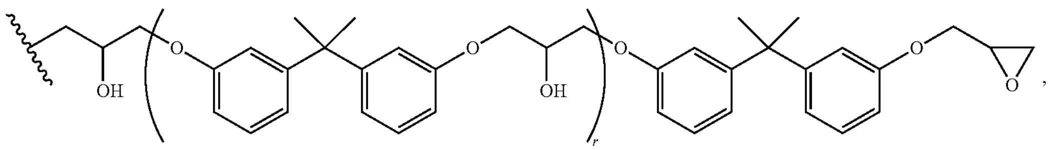

,

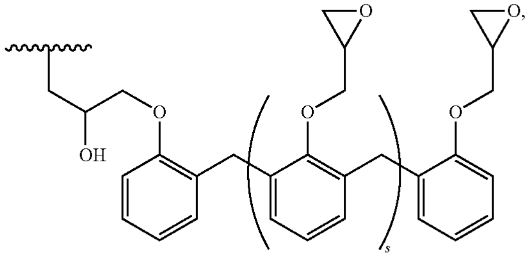

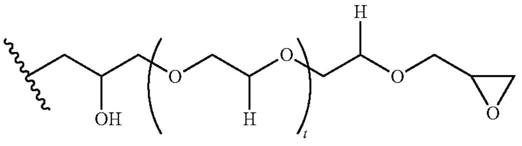

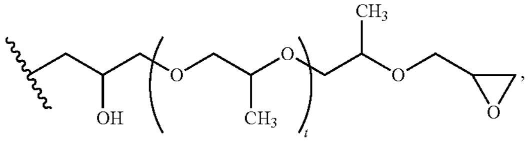

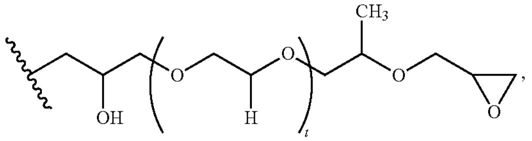

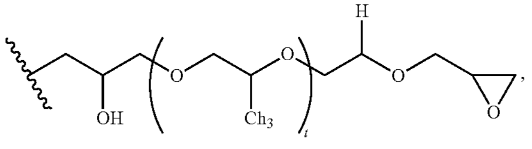

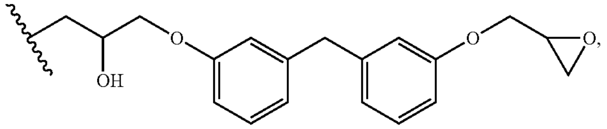

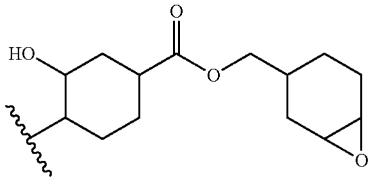

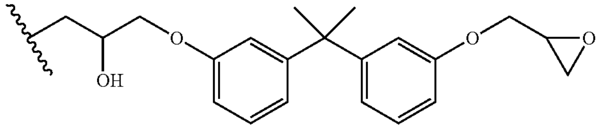

and

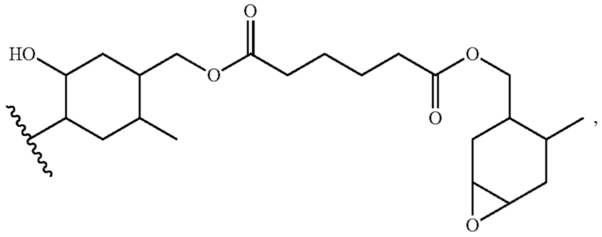

wherein r is an integer from 1 to 25, s is an integer from 1 to 10 and t is an integer from 1 to 10;

$R^{11}$ is selected from the group consisting of $R^8$ and $R^{12c}$; and $R^{12}$ is selected from the group consisting of $R^{12a}$, $R^{12b}$ and $R^{12c}$, wherein $R^{12a}$ is selected from the group consisting of linear $C_{1-18}$ alkyl, branched $C_{1-18}$ alkyl, substituted $C_{1-18}$ alkyl, non-substituted $C_{1-18}$ alkyl, linear $C_{2-18}$ alkenyl, branched $C_{2-18}$ alkenyl, substituted $C_{2-18}$ alkenyl and non-substituted $C_{2-18}$ alkenyl;

$R^{12c}$ is selected from the group consisting of amino acids up to a molecular weight of 2000 g/mol, oligo-peptides up to a molecular weight of 2000 g/mol and poly-peptides up to a molecular weight of 2000 g/mol; and $C_{12-24}$ fatty acids and ring opened epoxidized fatty acid based polyols.

3. The polymeric liquid polysiloxane material according to claim 1, wherein $R^1$ is selected from the group consisting of methyl, ethyl, and propyl;

$R^{5N}$ is selected from the group consisting of methyl, ethyl, n-propyl, isopropyl, n-butyl, t-butyl, linear $C_{5-16}$ alkyl residues, branched $C_{5-16}$ alkyl residues and cyclic $C_{5-16}$ alkyl residues;

L is an aliphatic linker selected from the group consisting of $—CH_2—$, $—CH_2CH_2—$, $—CH_2CH_2CH_2—$, and $—C_6H_4—$;

$Z^1$ is a moiety selected from the group consisting of —SH,

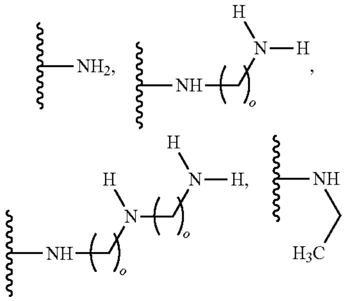

, and

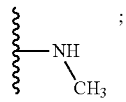

$Z^2$ is a moiety selected from the group consisting of

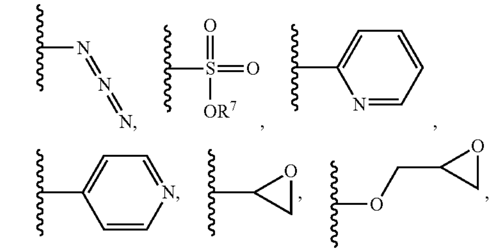

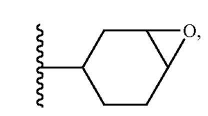

and

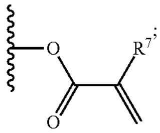

wherein $R^7$ is independently selected from the group consisting of methyl and ethyl;

$Z^3$ is selected from the group consisting of vinyl, and phenyl;

$R^8$ is selected from the group consisting of —Cl, —Br, —I, —CN, and —$N_3$;

$R^9$ is selected from the group consisting of —Cl, —CN, —COOH, —COOR$^{1'}$, and phenyl;

$Y^1$ is selected from the group consisting of

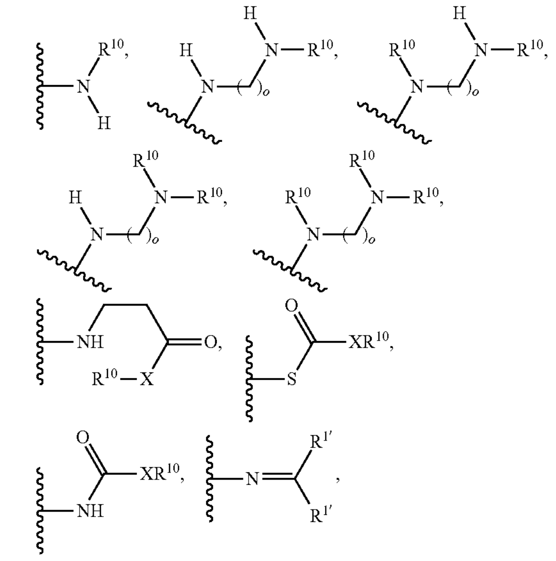

-continued

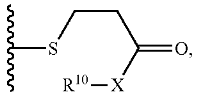

and

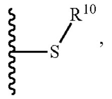

wherein o is an integer from 2 to 3;

$Y^2$ is a moiety selected from the group consisting of

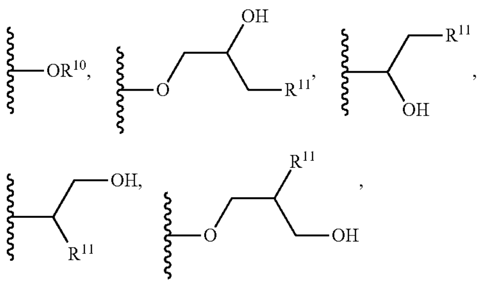

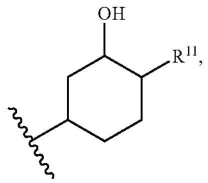

and

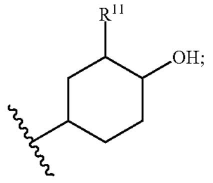

$Y^3$ is a moiety selected from the group consisting of

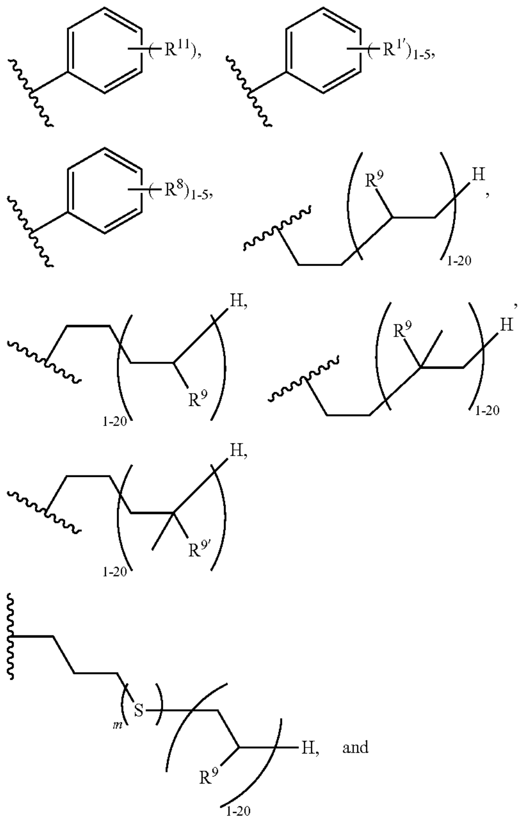

and

-continued
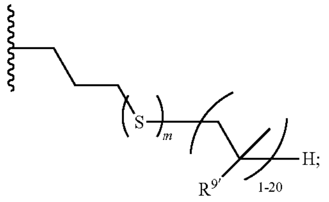
wherein X is absent, —(NH)—, or —O—;
$R^{10}$ is selected from the group consisting of $R^{10a}$, $R^{10b}$, $R^{10c}$, and $R^{10d}$;
$R^{10a}$ is selected from the group consisting of
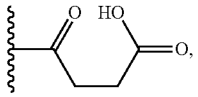
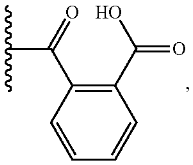
,
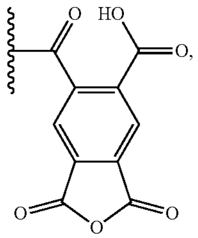
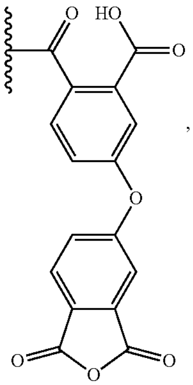
, and
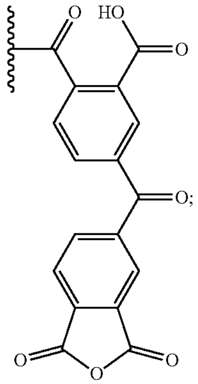
$R^{10b}$ is selected from the group consisting of
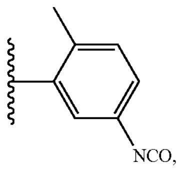
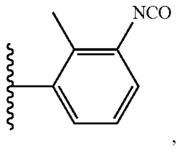
,
-continued
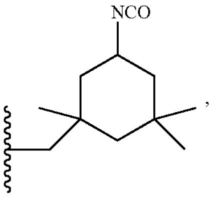
,
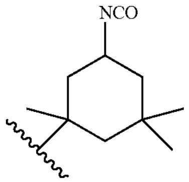
,
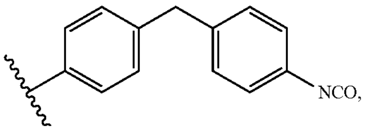
and
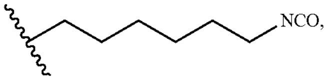
and X is N;
$R^{10c}$ is selected from the group consisting of
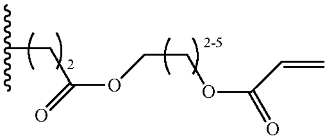
,
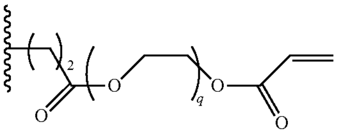
,
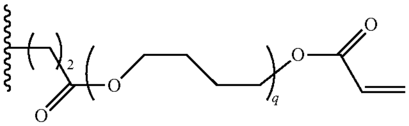
,
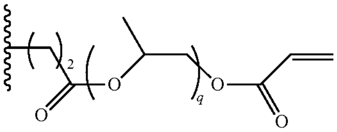
,
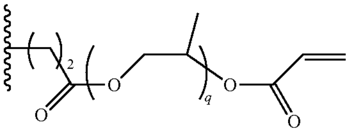
, and
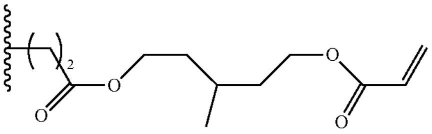
,
wherein q is an integer from 1 to 6,
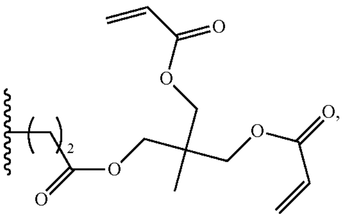

-continued
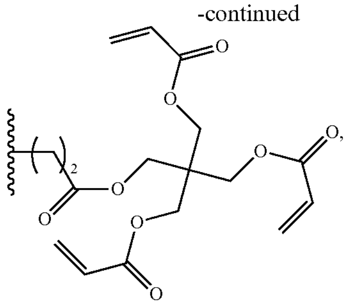
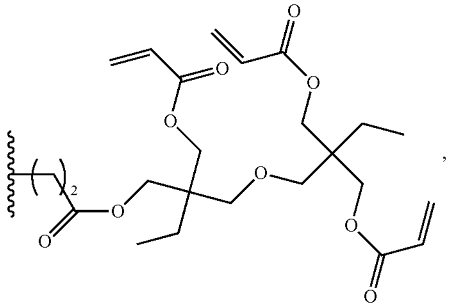
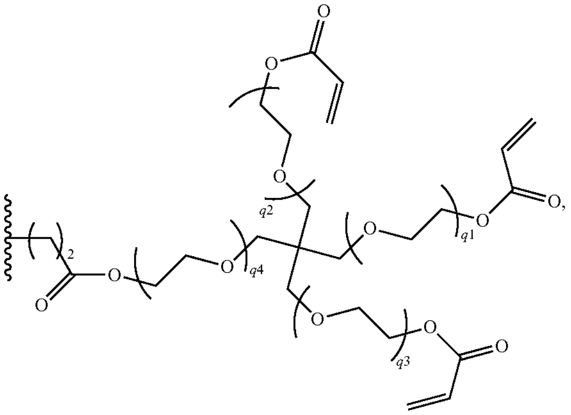
-continued
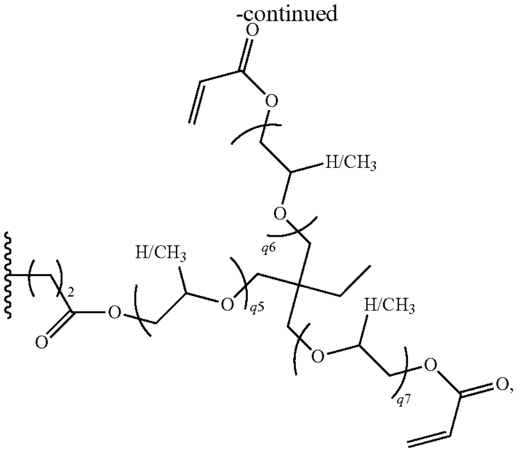
and
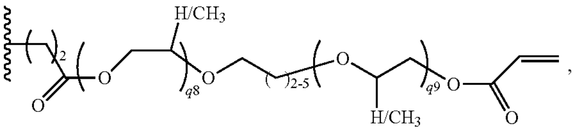
wherein each of q1 to q4 are integers from 0 to 8 and the sum of (q1+q2+q3+q4) is from 4 to 8, wherein each of q5 to q7 are integers from 0 to 8 and the sum of (q5+q6+q7) is from 3 to 12, wherein each of q8 and q9 are integers from 0 to 4 and the sum of (q8+q9) is from 2 to 4; and
$R^{10d}$ is selected from the group consisting of
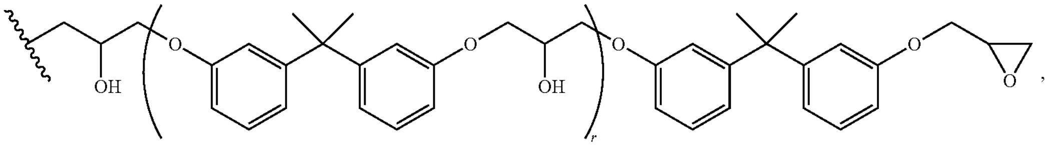
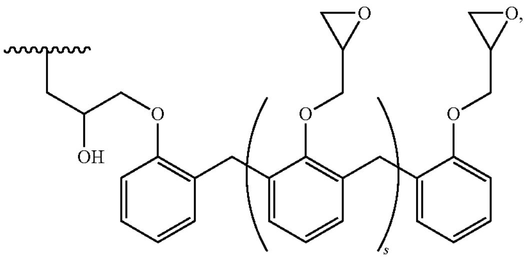
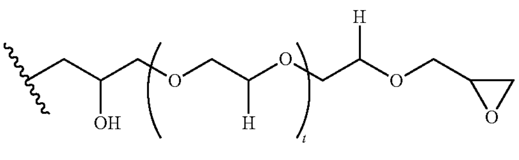
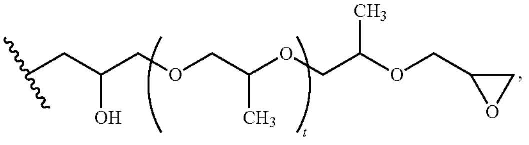

-continued

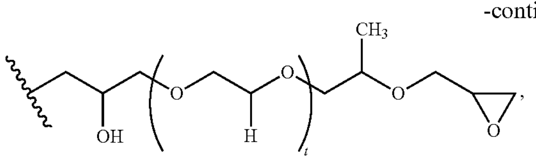

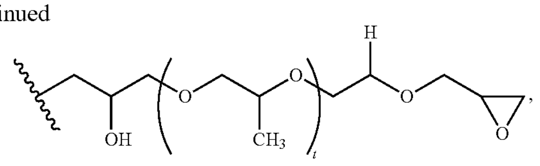

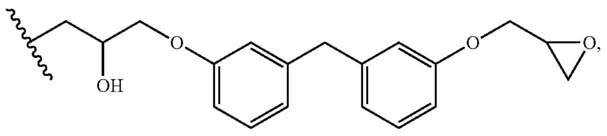

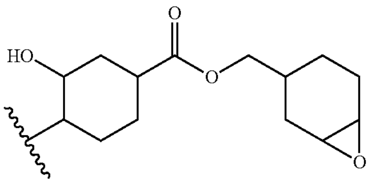

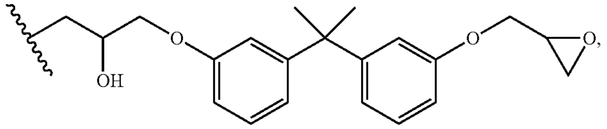

and

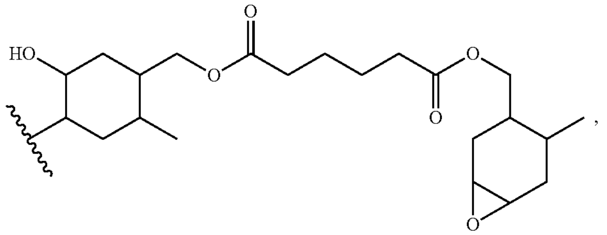

wherein r is an integer from 1 to 20, s is an integer from 1 to 8 and t is an integer from 1 to 10;

$R^{11}$ is selected from the group consisting of $R^8$ and $R^{12c}$; and $R^{12c}$ is selected from the group consisting of amino acids up to a molecular weight of 1000 g/mol, oligo-peptides up to a molecular weight of 1000 g/mol and poly-peptides up to a molecular weight of 1000 g/mol; and $C_{12-24}$ fatty acids and ring opened epoxidized fatty acid based polyols.

4. The polymeric liquid hyperbranched polysiloxane material according to claim 1, wherein (v) the degree of polymerization of the Q-type siloxane moieties $DP_{Q\text{-}type}$ is in the range of 1.6 to 2.4 and the atomic ratio of T- to Q-species in the material is in the range of 0.02:1 to 0.4:1 in all other cases than those defined in claim 1;

(vi) if the material comprises about or more than 5 mol-% M-type moieties, the degree of polymerization of the Q-type siloxane moieties $DP_{Q\text{-}type}$ is in the range of 1.7 to 2.5 and the atomic ratio of T- to Q-species in the material is in the range of 0.02:1 to 0.4:1;

(vii) the degree of polymerization of the D-type siloxane moieties DPD-type is in the range of 1.25 to 1.75; and/or (viii) the degree of polymerization of the T-type siloxane moieties DPT-type is in the range of 1.3 to 2.2.

5. The polymeric liquid polysiloxane material according to claim 1, wherein if at least 5 mol-% of the $R^5$ residues of the material are $-L-Z^1$ and/or $L-Y^1$, excluding —SH,

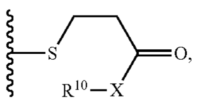

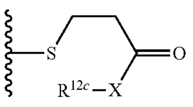

and

-continued

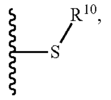

then the polysiloxane material comprises less than 750 mol-ppm of a rearrangement catalyst;

the polysiloxane material comprises 0 to 1500 mol-ppm of a rearrangement catalyst based on the total molar silicon content present in the material; and/or at least 1 mol-% of the sum of all $R^{5U}$ and $R^{5S}$ moieties in the material are $R^{5S}$ moieties.

6. A hydrolysis or emulsion product obtainable by reacting at least one polymeric liquid material according to claim 1 with a predetermined amount of water or with a predetermined amount of a water-solvent mixture, a predetermined amount of water for the hydrolysis product or with a predetermined amount of a water-solvent mixture in the presence of at least one surfactant for the hydrolysis product, or a predetermined amount of water in the presence of at least one surfactant for the emulsion product.

7. A method for functionalizing a polymeric liquid material according to claim 1, the method comprising the following steps:

providing a polymeric liquid material according to claim 1, wherein at least 1 mol-%, at least 3 mol-% of all $R^5$ moieties in the material are $R^{5U}$ moieties;

functionalizing the $R^{5U}$ residues of the polymeric liquid material to obtain at least 1 mol-% $R^{5S}$ residues relative to the sum of all $R^{5U}$ and $R^{5S}$ residues;

retrieving, isolating and/or purifying the polymeric liquid material.

8. A method for preparing a polymeric liquid material according to claim 1, the method comprising the following steps:

(a) providing a precursor comprising non-organofunctional Q-type siloxane moieties selected from the group consisting of:

$Q^1$

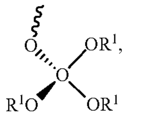

$Q^2$

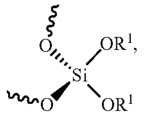

$Q^3$

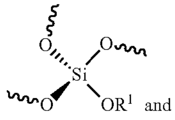 and $Q^4$

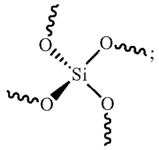

wherein $R^1$ is selected from the group consisting of methyl, ethyl, and propyl, and  indicates a covalent siloxane bond to a silicon atom of another Q-type siloxane moiety, wherein the precursor comprises at least 28 mol-% four-membered combined $Q^{2r}$-type and $Q^{3s,d}$-type siloxane ring species relative to the total Q-type siloxane species; and/or wherein the precursor comprises at least 60%, four-membered combined $Q^{3s,3d}$-type siloxane ring species relative to all $Q^3$-type siloxane species; and wherein degree of polymerization of the Q-type polysiloxane $DP_{Q\text{-}type}$ is in the range of 1.5 to 2.5;

(b) adding at least one of a (b1) tri-organofunctional M-type silane $Si(OR^1)(Me)_3$ in mono- or oligomeric form; and/or (b2) di-organofunctional D-type silane $Si(OR^1)_2(R^2)(R^3)$ in mono- or oligomeric form; and/or (b3) mono-organofunctional T-type silane $Si(OR^1)_3(R^5)$, wherein $R^5$ is selected from the group consisting of $R^{5N}$, $R^{5U}$ and $R^{5S}$;

to the polysiloxane of (a);

(c) optionally adding a rearrangement catalyst to the mixture of step (b);

(d) heating the mixture of (c);

(g) retrieving, isolating and/or purifying the polymeric liquid material;

with the proviso that at least one of:

the precursor of step (a) comprises mono-organofunctional T-type siloxane moieties, wherein $R^5$ is selected from the group consisting of $R^{5U}$ and $R^{5S}$, a mono-organofunctional T-type silane $Si(OR^1)_3(R^5)$, wherein $R^5$ is selected from the group consisting of $R^{5U}$ and $R^{5S}$; is added in mono- or oligomeric form during step (b), or a combination thereof, and with the proviso that a rearrangement catalyst is present in at least one of steps (a) or (c).

9. The method according to claim 8, wherein in step (a), the precursor further comprises mono-organofunctional T-type siloxane moieties, wherein $R^5$ is $R^{5N}$ and/or $R^{5U}$;

in step (b), the $R^5$ of the T-type silane is $R^{5N}$ and/or $R^{5U}$; and the method comprises the step (f) of substituting the $R^{5U}$ residues of the polymeric liquid material with $R^{5S}$ residues to obtain at least 1 mol-% $R^{5S}$ residues relative to the sum of all $R^{5U}$ and $R^{5S}$ residues.

10. The method according to claim 8, wherein in step (a), the precursor further comprises mono-organofunctional T-type siloxane moieties, wherein is $R^{5U}$;

in step (b), the $R^5$ of at least one T-type silane is $R^{55}$; and wherein the method further comprises step (e) of repeating steps (b) to (d) at least once, wherein in step (e), the $R^5$ of the T-type silane is selected from the group consisting of $R^{5U}$ and $R^{5S}$.

11. The method according to claim 8, wherein the rearrangement catalyst is selected from the group consisting of $Ti(IV)(OR^{13})_4$ and $Zr(IV)(OR^{13})_4$;

$Ti(IV)X_4$ and $Zr(IV)X_4$;

$O{=}Ti(IV)X_2$ and $O{=}Zr(IV)X_2$);

$Ti(IV)X_2(OR^{13})_2$ and $Zr(IV)X_2(OR^{13})_2$;

$Ti(IV)X_2(OAcAc)_2$ and $Zr(IV)X_2(OAcAc)_2$;

$Ti(IV)(OSi(CH_3)_3)_4$ and $Zr(IV)(OSi(CH_3)_3)_4$;

$(R^{13}O)_2Ti(IV)(OAcAc)_2$ and $(R^{13}O)_2Zr(IV)(OAcAc)_2$;

$O{=}Ti(IV)(OAcAc)_2$ and $O{=}Zr(IV)(OAcAc)_2$;

$Ti(IV)(OAc)_4$ and $Zr(IV)(OAc)_4$;

$Ti(IV)(OAc)_2\ (OR^{13})_2$ and $Zr(IV)(OAc)_2\ (OR^{13})_2$; and $O{=}Ti(IV)(OAc)_2$ and $O{=}Zr(IV)(OAc)_2$;

wherein $R^{13}$ is selected from the group consisting of $—CH_3$, $—CH_2CH_3$, $—CH(CH_3)_2$, $—CH_2CH_2CH_3$, $—C(CH_3)_3$, $—CH_2CH_2CH_2CH_3$ and $CH_2CH_2CH(CH_3)_2$ and wherein X is a halide, a pseudohalide, nitrate, chlorate or perchlorate anion.

12. A product obtained by the method of claim 7.

13. The polymeric liquid polysiloxane material according to claim 1, further comprising at least one of:

(ii) tri-organofunctional M-type siloxane moieties selected from the group consisting of:

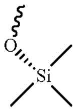, or (iii) di-organofunctional D-type siloxane moieties selected from the group consisting of:

$D^1$

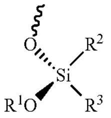 and $D^2$

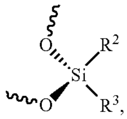, wherein

 indicates a covalent siloxane bond to a silicon atom of another Q-, M-, D- and/or T-type moiety as defined in (i), (ii), (iii) and/or (iv);

the degree of polymerization of the D-type siloxane moieties $DP_{D\text{-}type}$ is in the range of 1.0 to 1.9;

the total content of tri-organofunctional M-type siloxane moieties (ii) in the polysiloxane material does not exceed 20 mol-%, 10 mol-% or 5 mol-%; and the total content of di-organofunctional D-type siloxane moieties (iii) in the polysiloxane material does not exceed 5, 10, or 15 mol-%.

14. The polymeric liquid polysiloxane material according to claim 1, wherein $R^{5N}$ is selected from the group consisting of linear or branched hexyl, linear or branched octyl, linear or branched dodecyl, linear or branched hexadecyl, (3,3,3-trifluoro) propyl, (1H,1H,2H,2H-perfluoro) octyl, cyclohexyl, cyclopentadienyl, cyclopentyl, (1H,1H,2H,2H-perfluoro) dodecyl and (1H,1H,2H,2H-perfluoro) hexadecyl.

15. The polymeric liquid polysiloxane material according to claim 1, wherein $R^6$ is selected from the group consisting of $-(CH_2)_5CH_3$, $-(CH_2)_6CH_3$, $-(CH_2)_7CH_3$, $-(CH_2)_8CH_3$, $-(CH_2)_9CH_3$, $-(CH_2)_{11}CH_3$ and $-(CH_2)_{13}CH_3$.

16. The polymeric liquid polysiloxane material according to claim 1, wherein $R^{12b}$ is selected from the group consisting of substituted poly(ethylene oxide), unsubstituted poly(ethylene oxide), substituted poly(propylene oxide), unsubstituted poly(propylene oxide), substituted polytetrahydrofuran and unsubstituted polytetrahydrofuran; and poly D-glucose, Oligo-D-glucose, chitosan, deacetylated oligo-chitin, oligo-beta-D-galactopyranuronic acid, poly alginic acid, oligo-alginic acid, poly amylose, oligo amylose, poly-galactose, and oligo-galactose, each with a molecular weight up to 5000 g/mol.

17. The polymeric liquid polysiloxane material according to claim 1, wherein $R^{12c}$ is selected from the group consisting of oligo-peptides made of naturally occurring amino acids up to a molecular weight of 5000 g/mol and polypeptides made of naturally occurring amino acids up to a molecular weight of 5000 g/mol;

naturally occurring $C_{12\text{-}24}$ fatty acids;

naturally occurring unsaturated fatty acids;

$C_{12\text{-}24}$ naturally occurring unsaturated fatty acids with 1 to 3 double bonds;

epoxidized fatty acids;

epoxidized castor oil, epoxidized soybean oil, and epoxidized sunflower oil;

ring opened epoxidized fatty acid based polyols;

natural oil based polyols (NOPs); and castor oil triglycerides, soybean oil triglycerides, and sunflower oil triglycerides.

18. The polymeric liquid polysiloxane material according to claim 1, wherein when the sum of all $Z^3$ and $Y^3$ and/or the sum of all $-L\text{-}Z^2$ and $-L'\text{-}Y^2$ amounts to at least 50 mol-% of all $R^5$ residues of the T-type siloxane moieties in the polysiloxane material, and the material further comprises $R^5$ residues being $-L\text{-}Z^1$, the sum of $R^5$ residues being $-L'\text{-}Y^1$ and $-L\text{-}Z^1$ being less than 20 mol-%, the degree of polymerization of the Q-type siloxane moieties $DP_{Q\text{-}type}$ is in the range of 1.85 to 2.2, and the atomic ratio of T- to Q-species in the material is in the range of 0.02:1 to 0.3:1.

19. The polymeric liquid polysiloxane material according to claim 1, wherein when the sum of all $-L\text{-}Z^1$, $-L'\text{-}Y^1$ and $R^{5N}$ amounts to at least 90 mol-% of all $R^5$ residues of the T-type siloxane moieties in the polysiloxane material, at least 30 mol-% of the $R^5$ residues of the material being $-L\text{-}Z^1$ and/or $-L'\text{-}Y^1$ and at least 10 mol-% of the $R^5$ residues of the material being $R^{5N}$, the degree of polymerization of the Q-type siloxane moieties $DP_{Q\text{-}type}$ is in the range of 1.8 to 2.4, and the atomic ratio of T- to Q-species in the material is in the range of 0.05:1 to 0.4:1.

20. The polymeric liquid polysiloxane material according to claim 1, wherein when the sum of all $R^{5N}$, $z^3$, $Y^3$, $-L'\text{-}Y^2$ and $-L\text{-}Z^2$ amounts to at least 90 mol-% of all $R^5$ residues of the T-type siloxane moieties in the polysiloxane material, the sum of all $Z^3$, $Y^3$, $-L'\text{-}Y^2$ and $-L\text{-}Z^2$ amounts to at least 20 mol-% of the $R^5$ residues of the material, at least 20 mol-% of the $R^5$ residues of the material being $R^{5N}$, the degree of polymerization of the Q-type siloxane moieties $DP_{Q\text{-}type}$ is in the range of 1.7 to 2.25, and the atomic ratio of T- to Q-species in the material is in the range of 0.05:1 to 0.25:1.

* * * * *